US012683329B2

(12) United States Patent
Brandt et al.

(10) Patent No.: US 12,683,329 B2
(45) **Date of Patent: *Jul. 14, 2026**

(54) ELECTRICAL CONNECTOR ASSEMBLY HAVING FLOATING MATING INTERFACE

(71) Applicant: TE Connectivity Solutions GmbH, Schaffhausen (CH)

(72) Inventors: Christian Perry Brandt, York, PA (US); James Michael Raudenbush, Middletown, PA (US)

(73) Assignee: TE Connectivity Solutions GmbH (CH)

(*) Notice: Subject to any disclaimer, the term of this patent is extended or adjusted under 35 U.S.C. 154(b) by 305 days.

This patent is subject to a terminal disclaimer.

(21) Appl. No.: 18/481,215

(22) Filed: Oct. 4, 2023

(65) Prior Publication Data

US 2025/0047037 A1 Feb. 6, 2025

Related U.S. Application Data

(60) Provisional application No. 63/582,000, filed on Sep. 12, 2023, provisional application No. 63/530,000, filed on Jul. 31, 2023.

(51) Int. Cl.

| | |
|---|---|
| ***H01R 13/631*** | (2006.01) |
| ***H01R 13/428*** | (2006.01) |
| ***H01R 13/627*** | (2006.01) |

(52) U.S. Cl.
CPC ....... *H01R 13/6315* (2013.01); *H01R 13/428* (2013.01); *H01R 13/6271* (2013.01)

(58) Field of Classification Search
CPC .............. H01R 13/428; H01R 13/6271; H01R 13/6315
See application file for complete search history.

(56) References Cited

U.S. PATENT DOCUMENTS

| | | | | |
|---|---|---|---|---|
| 5,964,621 A * | 10/1999 | Wolla ................. | H01R 13/4364 | 439/744 |
| 6,174,185 B1 * | 1/2001 | Cecil, Jr. .............. | H01R 13/743 | 439/248 |
| 6,450,834 B1 * | 9/2002 | Polgar ..................... | H01R 13/74 | 439/546 |
| 7,168,978 B1 * | 1/2007 | Trout ................... | H01R 13/743 | 439/545 |
| 7,597,587 B1 * | 10/2009 | Duesterhoeft ....... | H01R 13/745 | 439/545 |

(Continued)

*Primary Examiner* — Harshad C Patel

(57) ABSTRACT

A connector assembly is provided and includes an electrical connector that includes a housing having a contact channel and a contact held in the contact channel. The contact is terminated to an end of a cable. The cable extends from the housing. The electrical connector includes a terminal position assurance (TPA) device coupled to the housing and operably assuring proper positioning of the contact in the contact channel. The electrical connector includes a mating end. The connector assembly includes a support bracket configured to support the electrical connector. The support bracket includes an opening. The electrical connector is suspended from the support bracket and received in the opening with the mating end forward of the support bracket for mating with a mating electrical connector. The electrical connector has six mechanical degrees of freedom relative to the support bracket.

21 Claims, 34 Drawing Sheets

(56) References Cited

U.S. PATENT DOCUMENTS

| | | | | |
|---|---|---|---|---|
| 12,224,537 | B2 * | 2/2025 | Horning | H01R 25/16 |
| 12,413,028 | B2 * | 9/2025 | Horning | H01R 13/504 |
| 2010/0227494 | A1 * | 9/2010 | Tyler | H01R 13/62977 439/372 |
| 2023/0420896 | A1 * | 12/2023 | Horning | H01R 25/16 |
| 2025/0047027 | A1 * | 2/2025 | Brandt | H01R 13/428 |

* cited by examiner

ELECTRICAL CONNECTOR ASSEMBLY HAVING FLOATING MATING INTERFACE

CROSS REFERENCE TO RELATED APPLICATIONS

This application claims benefit to U.S. Provisional Application No. 63/530,000, filed 31 Jul. 2023, and U.S. Provisional Application No. 63/582,000, filed 12 Sep. 2023 the subject matter of which are herein incorporated by reference in their entirety.

BACKGROUND OF THE INVENTION

The subject matter herein relates generally to electrical connector assemblies.

Connector systems typically include two connector halves, such as a male connector and a female connector, which are mated together to create an electrical connection between various components of the system. Proper mating of the connector halves is important for proper functioning of the system. If the connectors are improperly mated, a degraded signal or, in some cases, no signal is transmitted between the components. For example, if the contacts are only partially mated, low quality signals may be transmitted. Proper mating may require the mating connectors to be perfectly aligned prior to mating. However, in some applications it may be difficult to properly align the connectors. For example, when blind mating the connectors it may not be possible to align the connectors prior to mating.

A need remains for an electrical connector system that allows for reliable mating of connector assemblies.

BRIEF DESCRIPTION OF THE INVENTION

In one embodiment, a connector assembly is provided and includes an electrical connector that includes a housing having a contact channel and a contact held in the contact channel. The contact is terminated to an end of a cable. The cable extends from the housing. The electrical connector includes a terminal position assurance (TPA) device coupled to the housing and operably assuring proper positioning of the contact in the contact channel. The electrical connector includes a mating end. The connector assembly includes a support bracket configured to support the electrical connector. The support bracket includes an opening. The electrical connector is suspended from the support bracket and received in the opening with the mating end forward of the support bracket for mating with a mating electrical connector. The electrical connector has six mechanical degrees of freedom relative to the support bracket.

In another embodiment, a connector assembly is provided and includes an electrical connector that includes a housing having a contact channel and a contact held in the contact channel. The contact is terminated to an end of a cable. The cable extends from the housing. The electrical connector includes a terminal position assurance (TPA) device coupled to the housing and operably assuring proper positioning of the contact in the contact channel. The electrical connector includes a mating end configured to be mated to a mating electrical connector. The connector assembly includes a support bracket configured to support the electrical connector. The support bracket includes a connector mount, a pivot frame, an X carriage, and a Y carriage. The connector mount holds the electrical connector. The pivot frame includes an opening that receives the connector mount and the electrical connector with the mating end forward of the pivot frame for mating with the mating electrical connector. The pivot frame holds the connector mount. The X carriage holds the pivot frame. The Y carriage holds the X carriage. The housing is axially movable relative to the connector mount in a Z direction parallel to a mating axis with the with the mating electrical connector. The connector mount is rotatably movable relative to the pivot frame in a yaw direction, a pitch direction, and a roll direction. The yaw, pitch and roll directions are mutually exclusive. The pivot frame is axially movable relative to the pivot frame in an X direction perpendicular to the Z direction. The X carriage is axially movable relative to the Y carriage in a Y direction perpendicular to the X direction and perpendicular to the Z direction.

In a further embodiment, an electrical connector system is provided and includes a first connector assembly that includes a first electrical connector including a first housing having a first contact channel and a first contact held in the first contact channel. The first contact is terminated to an end of a first cable. The first cable extends from the first housing. The first electrical connector includes a first terminal position assurance (TPA) device coupled to the first housing and operably assuring proper positioning of the first contact in the first contact channel. The first electrical connector includes a mating end. The first connector assembly includes a support bracket configured to support the first electrical connector. The support bracket includes an opening. The first electrical connector is suspended from the support bracket and received in the opening with the mating end forward of the support bracket. The electrical connector system includes a second connector assembly includes a second electrical connector including a second housing having a second contact channel and a second contact held in the second contact channel. The second contact is terminated to an end of a second cable. The second cable extends from the second housing. The second electrical connector includes a second TPA device coupled to the second housing and operably assuring proper positioning of the second contact in the second contact channel. The second electrical connector includes a mating end. The first electrical connector has six mechanical degrees of freedom relative to the support bracket to align with the second electrical connector during mating of the first electrical connector and the second electrical connector.

DETAILED DESCRIPTION OF THE INVENTION

Figure 1:
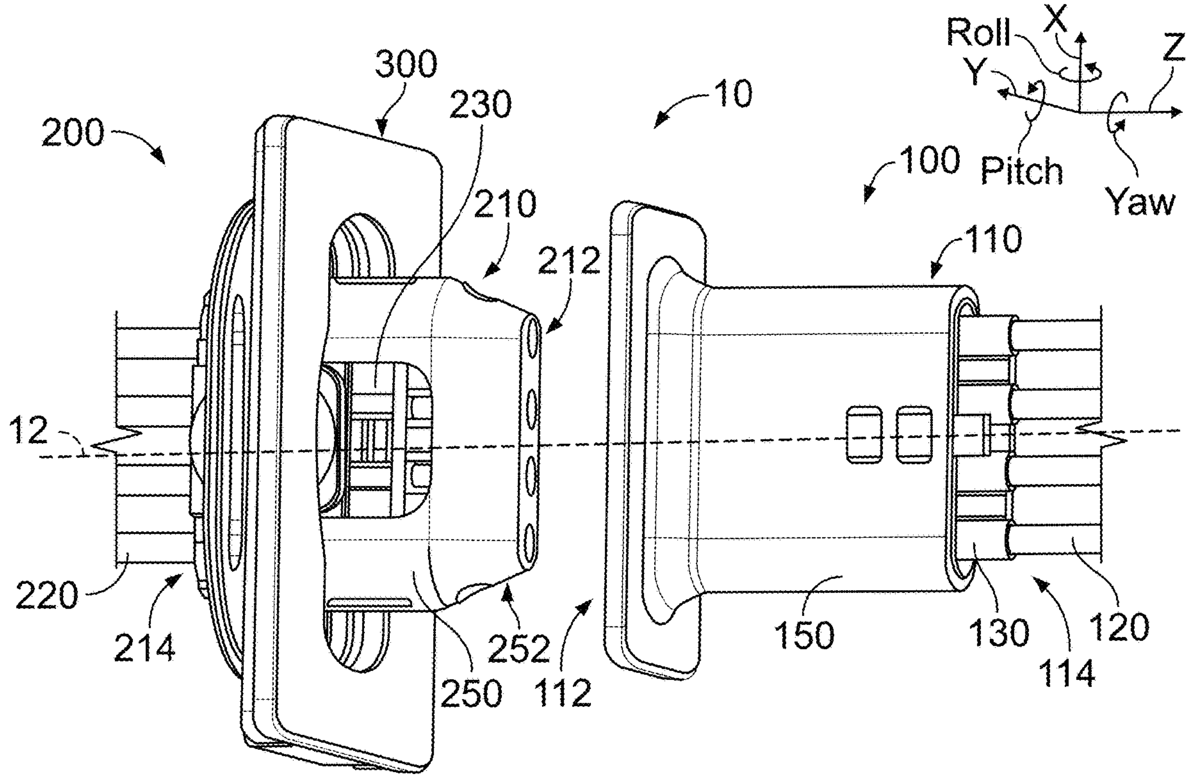
FIG. 1 is a front perspective view of an electrical connector system in accordance with an exemplary embodiment.
Figure 2:
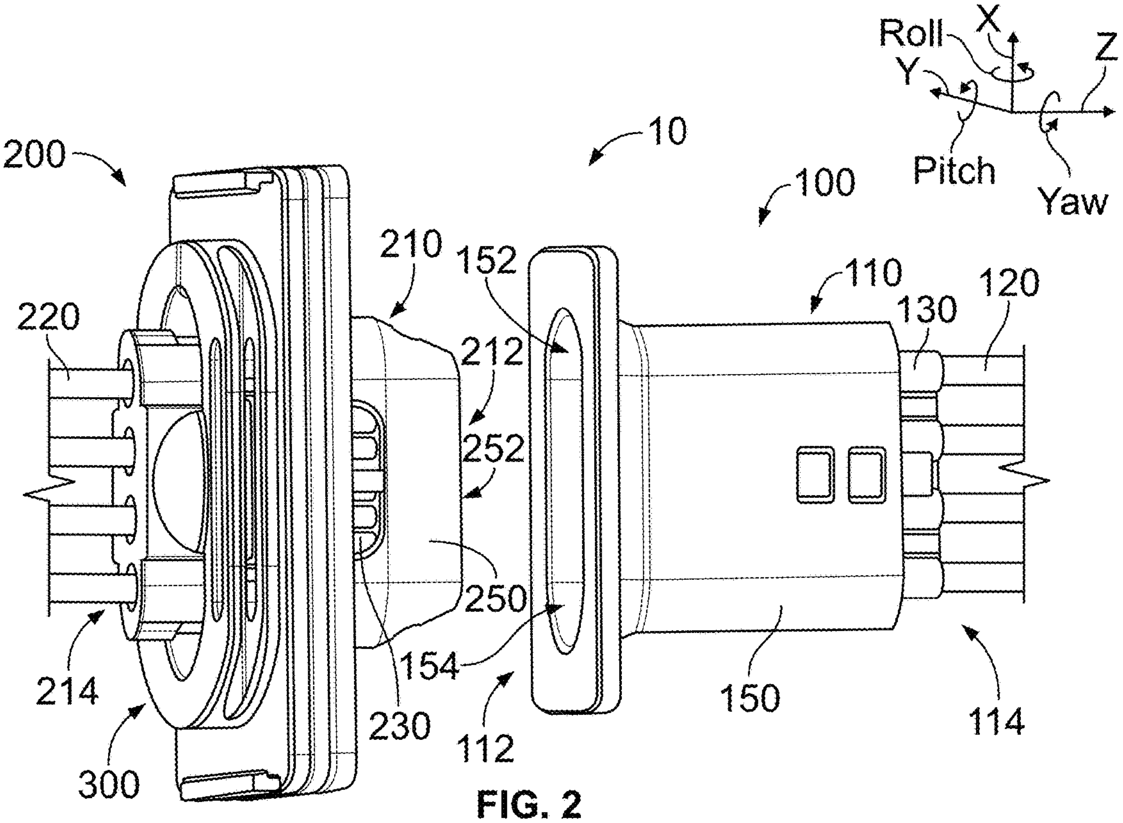
FIG. 2 is a rear perspective view of the electrical connector system in accordance with an exemplary embodiment.

FIG. 1 is a front perspective view of an electrical connector system 10 in accordance with an exemplary embodiment. FIG. 2 is a rear perspective view of the electrical connector system 10 in accordance with an exemplary embodiment. The electrical connector system 10 includes a first connector assembly 100 and a second connector assembly 200 configured to be mated with the first connector assembly 100 along a mating axis 12. The electrical connector system 10 is configured to transmit data and/or power through the first and second connector assemblies 100, 200.

In various embodiments, the electrical connector system 10 may be used in an automotive application. For example, the connector assemblies 100, 200 may be coupled to components, devices or systems of a vehicle, such as an electric vehicle. However, the electrical connector system 10 may be used in other applications in alternative embodiments, such as industrial applications, robotic applications, appliances, building wiring, computer systems, or other applications.

In an exemplary embodiment, the connector assemblies 100, 200 are designed for blind mating. For example, the connector assemblies 100, 200 include self aligning features having a tolerance range that allow self aligning of the mating interfaces of the connector assemblies 100, 200 during mating. In various embodiments, the connector assemblies 100, 200 may be mated by an automated mating process using robots or machines to mate the connector assemblies 100, 200. In various embodiments, one or both of the connector assemblies 100, 200 may be fixed to a module or component, such as a module or component of a vehicle, and mated during an automated vehicle assembly process. For example, the first connector assembly 100 may be fixed to a component and the second connector assembly 200 may be held by a robotic arm configured to mate the second connector assembly 200 with the first connector assembly 100 during an automated assembly process, or vice versa. In other various embodiments, both connector assemblies 100, 200 may be held by robotic arms used to mate the connector assemblies 100, 200 together during an automated assembly process.

In an exemplary embodiment, the second connector assembly 200 is equipped with features that allow it to move or float during mating to align with the first connector assembly 100 during the mating process. For example, the second connector assembly 200 may float in one or more axial directions to align with the first connector assembly 100. The second connector assembly 200 may float in one or more angular directions to align with the first connector assembly 100. In an exemplary embodiment, the second connector assembly 200 is equipped with features that allow it to move with six mechanical degrees of freedom relative to the first connector assembly 100. For example, the second connector assembly 200 has axial float in the X, Y, and Z directions as well as rotational float about a central pivot point in the yaw, pitch, and roll directions. The connector assemblies 100, 200 are able to compensate for some misalignment in virtually all orientations due to positional and physical variations (for example, tolerances). For example, the connector assemblies 100, 200 accommodate for X, Y, and Z tolerances as well as three angular tolerances in the X-Y, X-Z, and Y-Z planes to accommodate the blind mate. Successful mating of the connector assemblies 100, 200 is achieved when axial and angular alignment between the two assemblies is within a specified tolerances zone. The connector float in all axial and angular degrees of freedom ensures that the terminated cables of the connector assemblies 100, 200 can be successfully mated without sacrificing signal integrity. For example, the second connector assembly 200 is equipped with features that allow axial and rotational float such that the misalignment of the modules will not adversely affect the ability of the connector halves to mate, and subsequently, the terminated cables to align and transmit the quality RF signal. In an exemplary embodiment, all of the floating (for example, self aligning) features are integrated into the second connector assembly 200 to simplify the design and reduce manufacturing costs. For example, the first connector assembly 100 may be made with a simple, low cost design, which reduces the cost of the overall system. However, in alternative embodiments, the some or all of the floating features may be included in the first connector assembly 100.

In an exemplary embodiment, the first connector assembly 100 includes an electrical connector 110 having a mating end 112 configured to be mated with the second connector assembly 200 and a cable end 114 opposite the mating end 112. One or more cables 120 extend from the cable end 114. In the illustrated embodiment, the electrical connector 110 includes four cables 120; however, the electrical connector 110 may include greater or fewer cables 120 in alternative embodiments. The cables 120 are representative and may be rigid or flexible signal or power transmission cables in various embodiments.

The electrical connector 110 includes a housing 130 and a terminal position assurance (TPA) device 150 coupled to the housing 130. The housing 130 holds one or more contacts 122 (shown in FIG. 3) provided at the ends of the corresponding cables 120. In various embodiments, the contacts 122 may be standard contacts, such as MATE-Ax, FAKRA, mini-FAKRA, GEMnet, or other types of contacts. The housing 130 is designed to accept the particular type of contacts, such as by having a particular shape contact channel or latching feature to hold the contact. In various embodiments, the housing 130 may be designed to accept different types of contacts in different contact channels to provide a mating interface with different types and/or styles of contacts.

The TPA device 150 is operated to assure proper positioning of the contacts 122 in the housing 130. In an exemplary embodiment, the TPA device 150 is movable relative to the housing 130 between a preset position and a set position. The TPA device 150 is movable from the preset position to the set position after the contacts 122 are loaded in the housing 130. In various embodiments, the TPA device 150 is unable to move to the set position if the contacts 122 are improperly loaded into the housing 130 thus assuring proper positioning of the contacts 122 in the housing 130. In an exemplary embodiment, the TPA device 150 is used to retain the contacts 122 in the housing 130. For example, the TPA device 150 functions as a secondary securing means for the contacts 122 in the housing 130.

In an exemplary embodiment, the TPA device 150 includes a receptacle 152 at the front end configured to receive the second connector assembly 200. For example, the front end of the second connector assembly 200 may be plugged into the receptacle 152. In an exemplary embodiment, the TPA device 150 includes a funnel 154 at the front end of the receptacle 152 to guide the second connector assembly 200 into the receptacle 152. The funnel 154 has a large catch area to receive the second connector assembly 200 and accommodate misalignment of the second connector assembly 200 during mating.

In an exemplary embodiment, the second connector assembly 200 includes an electrical connector 210 and a support bracket 300 used to support the electrical connector 210. In an exemplary embodiment, the electrical connector 210 is movable relative to the support bracket 300 to compensate for misalignment of the electrical connector 210 relative to the electrical connector 110 during mating. For example, the electrical connector 210 has a limited amount of floating movement relative to the support bracket 300 to compensate for positional and orientational offset of the electrical connector 210 relative to the electrical connector 110. In an exemplary embodiment, the electrical connector 210 has six mechanical degrees of freedom relative to the support bracket 300. For example, the electrical connector 210 has axial float in the X, Y, and Z directions as well as rotational float about a central pivot point in the yaw, pitch, and roll directions relative to the support bracket 300. In an exemplary embodiment, the support bracket 300 allows a limited amount of floating axial movement of the electrical connector 210 in an X direction; the support bracket 300 allows a limited amount of floating axial movement of the electrical connector 210 in a Y direction; the support bracket 300 allows a limited amount of floating axial movement of the electrical connector 210 in a Z direction; the support bracket 300 allows a limited amount of floating rotational movement of the electrical connector 210 in a yaw direction; the support bracket 300 allows a limited amount of floating rotational movement of the electrical connector 210 in a pitch direction; and the support bracket 300 allows a limited amount of floating rotational movement of the electrical connector 210 in a roll direction.

The electrical connector 210 has a mating end 212 configured to be mated with the second connector assembly 200 and a cable end 214 opposite the mating end 212. One or more cables 220 extend from the cable end 214. In the illustrated embodiment, the electrical connector 210 includes four cables 220; however, the electrical connector 210 may include greater or fewer cables 220 in alternative embodiments. The cables 220 are representative and may be rigid or flexible signal or power transmission cables in various embodiments.

The electrical connector 210 includes a housing 230 and a terminal position assurance (TPA) device 250 coupled to the housing 230. The housing 230 holds one or more contacts 222 (shown in FIG. 6) provided at the ends of the corresponding cables 220. In various embodiments, the contacts 222 may be standard contacts, such as MATE-Ax, FAKRA, mini-FAKRA, GEMnet, or other types of contacts. The housing 230 is designed to accept the particular type of contacts, such as by having a particular shape contact channel or latching feature to hold the contact. In various embodiments, the housing 230 may be designed to accept different types of contacts in different contact channels to provide a mating interface with different types and/or styles of contacts. The exterior features of the housing 230 could be the same for all of the contact types, however the cavity geometry could be changed to accept and retain the desired contacts 222.

The TPA device 250 is operated to assure proper positioning of the contacts 222 in the housing 230. In an exemplary embodiment, the TPA device 250 is movable relative to the housing 230 between a preset position and a set position. The TPA device 250 is movable from the preset position to the set position after the contacts 222 are loaded in the housing 230. In various embodiments, the TPA device 250 is unable to move to the set position if the contacts 222 are improperly loaded into the housing 230 thus assuring proper positioning of the contacts 222 in the housing 230. In an exemplary embodiment, the TPA device 250 is used to retain the contacts 222 in the housing 230. For example, the TPA device 250 functions as a secondary securing means for the contacts 222 in the housing 230.

In an exemplary embodiment, the TPA device 250 includes a plug end 252 at the front configured to be plugged into the receptacle 152 of the first connector assembly 100. In an exemplary embodiment, the TPA device 250 includes lead-in surfaces at the plug end 252 to guide the second connector assembly 200 into the receptacle 252. The lead-in surfaces are tapered inward toward the tip or nose to provide a large catch area to plug into the receptacle 152 and accommodate misalignment of the second connector assembly 200 during mating.

Figure 3:
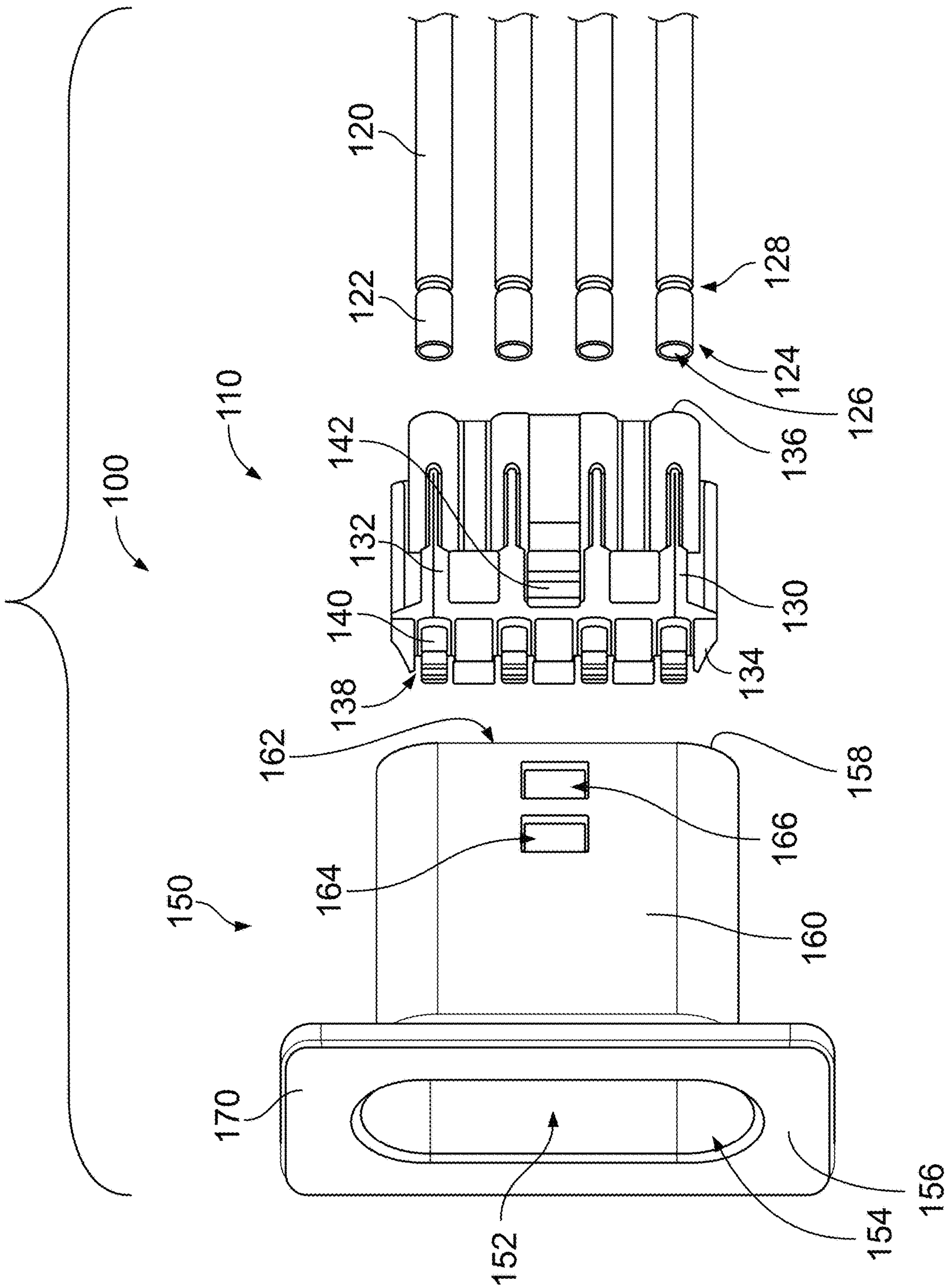
FIG. 3 is an exploded view of the first connector assembly in accordance with an exemplary embodiment.

FIG. 3 is an exploded view of the first connector assembly 100 in accordance with an exemplary embodiment. The first connector assembly 100 includes the electrical connector 110 having a plurality of the cables 120; however, the electrical connector 110 may include a single cable 120 in alternative embodiments. The first connector assembly 100 includes the housing 130 used to hold the contacts 122 and the cables 120 and the TPA device 150 used to assure proper positioning of the contacts 122 in the housing 130.

The contacts 122 are coupled to ends 124 of the cables 120. In various embodiments, the contacts 122 may be crimped to the ends 124 of the cables 120. However, the contacts 122 may be terminated to the cables 120 by other means or processes in alternative embodiments. In the illustrated embodiment, the contacts 122 are socket contacts having sockets 126 at mating ends of the contacts 122. Other types of contacts may be used in alternative embodiments, such as pin contacts, blade contacts, tuning fork contacts, spring beam contacts, or other types of contacts. The contacts 122 have separable mating interfaces at the mating ends of the contacts 122. In an exemplary embodiment, the contacts 122 include retention features 128 used to retain the contacts 122 in the housing 130. In the illustrated embodiment, the retention features 128 include flanges, grooves or pockets along the contacts 122. The retention features 128 may extend circumferentially around the contacts 122. The retention features 128 may be defined at the rear ends of the contacts 122. The retention features 128 have stop surfaces or shoulders configured to be engaged by the housing 130 to retain the contacts 122 in the housing 130.

The housing 130 includes a body 132 extending between a front 134 and a rear 136. The housing 130 includes one or more contact channels 138 passing through the body 132. The contact channels 138 receive the corresponding contacts 122. In the illustrated embodiment, the housing 130 includes four of the contact channels 138. However, the housing 130 may include greater or fewer contact channels 138 in alternative embodiments corresponding to the number of contacts 122 used in the electrical connector 110. In some alternative embodiments, the housing 130 may include a single contact channel 138.

In an exemplary embodiment, the housing 130 includes retention latches 140 used as primary securing means for securing the contacts 122 in the housing 130. In the illustrated embodiment, the retention latches 140 are provided at the front 134. However, the retention latches 140 may be located at other positions in alternative embodiments, such as interior of the housing 130 along an interior portion of the contact channels 138. The retention latches 140 are deflectable latches. Each retention latch 140 is configured to interface with the retention feature 128 of the corresponding contact 122 to hold the contact 122 in the housing 130. For example, the retention latch 140 may snap into the groove defining the retention feature 128 when the contact 122 is fully loaded into the housing 130. In various embodiments, the contact 122 may be rear loaded into the contact channel 138 and pushed forward to the front 134 of the housing 130. In various embodiments, the mating end of the contact 122 may be located forward of the front 134 of the housing 130 for mating with the second connector assembly 200.

In an exemplary embodiment, the housing 130 includes a housing latch 142 at an exterior of the housing 130. The housing latch 142 is used to secure the housing 130 to the TPA device 150. The housing latch 142 may be provided along one or more sides of the housing 130. In various embodiments, the housing latch 142 is deflectable. In alternative embodiments, the housing latch 142 is a fixed latch.

The TPA device 150 extends between a front 156 and a rear 158. In an exemplary embodiment, the TPA device 150 includes a shroud 160 surrounding a cavity 162. The cavity 162 receives the housing 130. In an exemplary embodiment, the cavity 162 is open at the rear 158 to receive the housing 130. The shroud 160 includes one or more latching features 164 for latchably coupling the TPA device 150 to the housing 130. In the illustrated embodiment, the latching feature 164 includes openings 166 along the shroud 160. The openings 166 are longitudinally offset from each other. The openings 166 are configured to receive the housing latch 142 of the housing 130. Multiple openings 166 are provided to allow uncoupling of the TPA device 150 to the housing 130 at different positions. For example, the housing latch 142 is initially received in the rearward opening 166 to position the TPA device 150 at an initial or pre-set position. The housing latch 142 is received in the forward opening 166 to position the TPA device 150 at a normal or set position. The TPA device 150 may be moved to the set position after the contacts 122 are loaded in the housing 130. In an exemplary embodiment, the TPA device 150 is used to block or hold the retention latches 140 in the set position to prevent deflection of the retention latches 140 when the TPA device 150 is in the set position. As such, the TPA device 150 operates as a secondary latching or securing feature for securing the contacts 122 in the housing 130. However, when the TPA device 150 is in the preset position, the retention latches 140 are free to deflect to allow the contacts 122 to be loaded into the housing 130.

In an exemplary embodiment, the TPA device 150 includes a flange 170 at the front 156. Optionally, the flange 170 may be mounted to a component of the vehicle. For example, the flange 170 may include mounting features, such as openings, latches, clips, or other types of mounting features for mounting the electrical connector 110 to the component of the vehicle. In alternative embodiments, rather than being mounted are fixed to a component of the vehicle, the flange 170 may be held by the robot or assembler during mating. The flange 170 provides a holding or pressing surface for mating the first connector assembly 100 with the second connector assembly 200. The flange 170 surrounds the funnel 154 of the receptacle 152. The funnel 154 is open at the front 156 to receive the second connector assembly 200.

Figure 4:
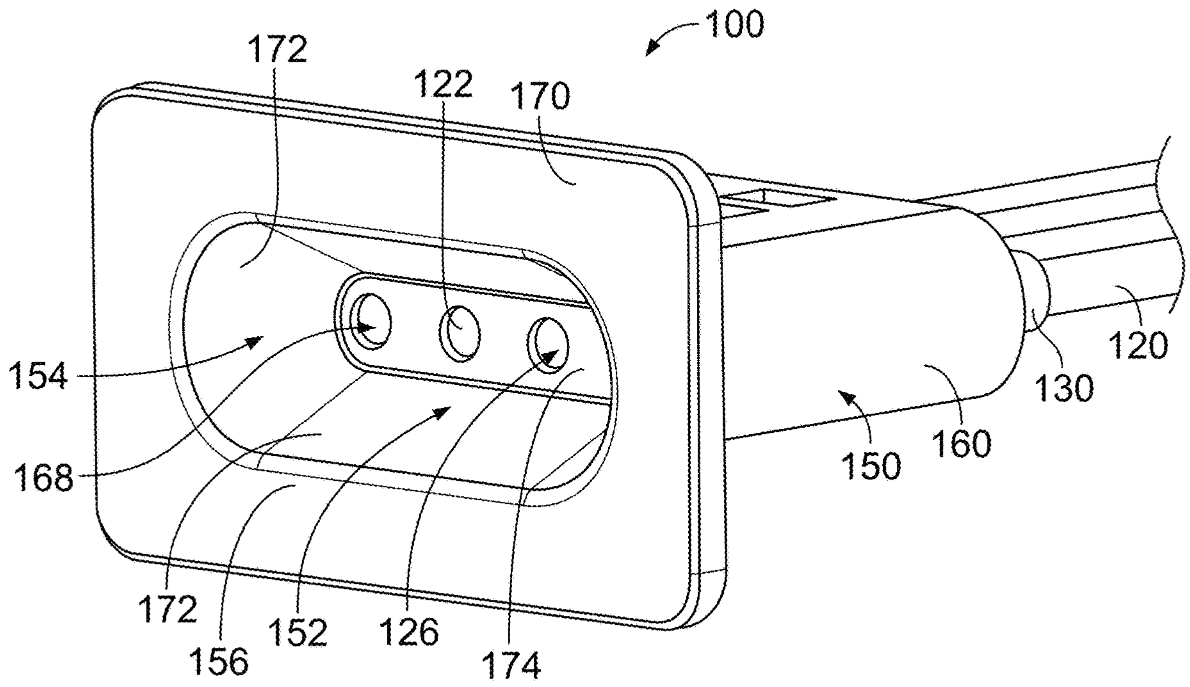
FIG. 4 is a front perspective view of the first connector assembly in accordance with an exemplary embodiment.
Figure 5:
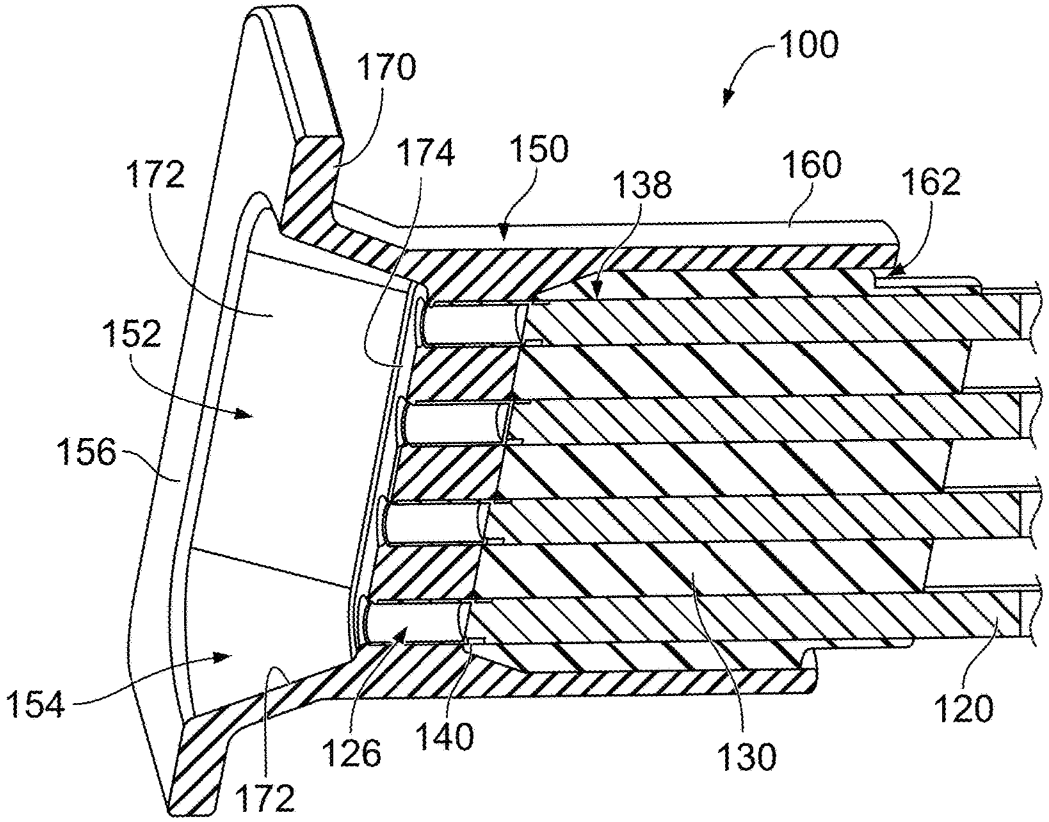
FIG. 5 is a sectional view of the first connector assembly in accordance with an exemplary embodiment.

FIG. 4 is a front perspective view of the first connector assembly 100 in accordance with an exemplary embodiment. FIG. 5 is a sectional view of the first connector assembly 100 in accordance with an exemplary embodiment. When assembled, the housing 130 is received in the cavity 162 of the TPA device 150. The shroud 160 surrounds the housing 130. The housing 130 positions the contacts 122 for mating with the second connector assembly 200. When assembled, the contacts 122 and the cables 120 are received in the corresponding contact channels 138. The retention latches 140 secure the contacts 122 in the housing 130. In an exemplary embodiment, the mating ends of the contacts 122 extend forward of the housing 130. In an exemplary embodiment, the mating ends of the contacts 122 are located in contact channels 168 of the TPA device 150. The sockets 126 are configured to receive the corresponding pins of the contacts 222 of the second connector assembly 200.

In an exemplary embodiment, the receptacle 152 is open at the front 156 of the TPA device 150 to receive the second connector assembly 200. The funnel 154 is used to guide the second connector assembly 200 into the receptacle 152. In an exemplary embodiment, the funnel 154 is tapered inward. The funnel 154 includes lead-in surfaces 172 that extend from the flange 170 to a base wall 174 at the bottom or rear of the receptacle 152. The contact channels 168 are open through the base wall 174. The sockets 126 of the contacts 122 are positioned in the base wall 174. The base wall 174 defines a stop wall to stop loading of the second connector assembly 200 into the receptacle 152. The base wall 174 is used to position the second connector assembly 200 for mating with the contacts 122. The lead in surfaces 172 guide the second connector assembly 200 to the base wall 174. In an exemplary embodiment, the lead in surfaces 172 provide lead-in at the top, the bottom, and both sides of the funnel 154 to accommodate misalignment of the second connector assembly 200 from any direction into the receptacle 152. In an exemplary embodiment, the second connector assembly 200 has a complementary shape as the funnel 154 to ultimately align (for example, axial and angular alignment) the second connector assembly 200 with the first connector assembly 100 within the receptacle 152.

Figure 6:
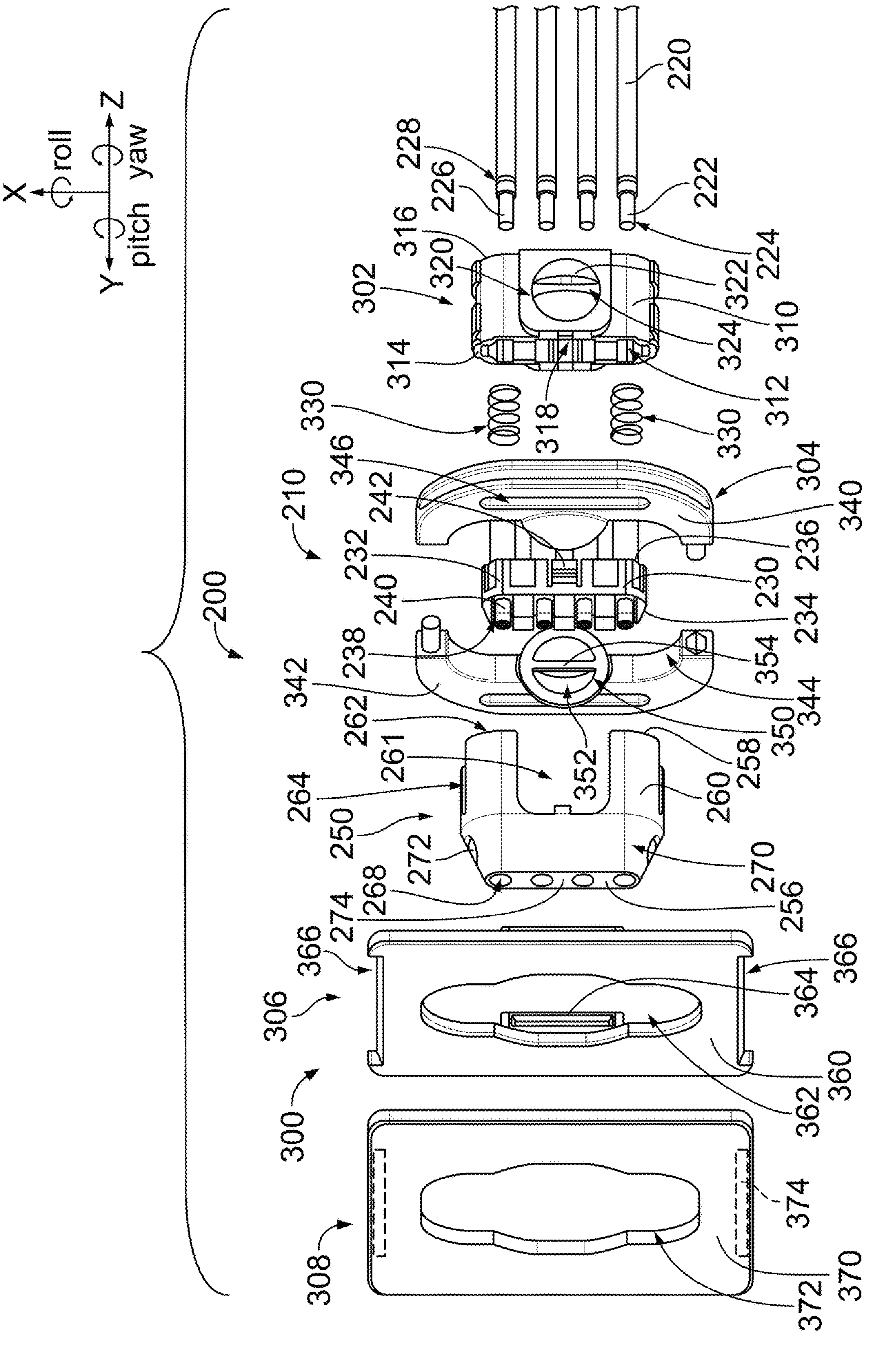
FIG. 6 is an exploded view of the second connector assembly in accordance with an exemplary embodiment.

FIG. 6 is an exploded view of the second connector assembly 200 in accordance with an exemplary embodiment. The second connector assembly 200 includes the electrical connector 210 having a plurality of the cables 220; however, the electrical connector 210 may include a single cable 220 in alternative embodiments. The second connector assembly 200 includes the housing 230 used to hold the contacts 222 and the cables 220 and the TPA device 250 used to assure proper positioning of the contacts 222 in the housing 230.

The contacts 222 are coupled to ends 224 of the cables 220. In various embodiments, the contacts 222 may be crimped to the ends 224 of the cables 220. However, the contacts 222 may be terminated to the cables 220 by other means or processes in alternative embodiments. In the illustrated embodiment, the contacts 222 are pin contacts having pins 226 at mating ends of the contacts 222. Other types of contacts may be used in alternative embodiments, such as socket contacts, blade contacts, tuning fork contacts, spring beam contacts, or other types of contacts. The contacts 222 have separable mating interfaces at the mating ends of the contacts 222. In an exemplary embodiment, the contacts 222 include retention features 228 used to retain the contacts 222 in the housing 230. In the illustrated embodiment, the retention features 228 include flanges, grooves, or pockets along the contacts 222. The retention features 228 may extend circumferentially around the contacts 222. The retention features 228 may be defined at the rear ends of the contacts 222. The retention features 228 have stop surfaces or shoulders configured to be engaged by the housing 230 to retain the contacts 222 in the housing 230.

The housing 230 includes a body 232 extending between a front 234 and a rear 236. The housing 230 includes one or more contact channels 238 passing through the body 232. The contact channels 238 receive the corresponding contacts 222. In the illustrated embodiment, the housing 230 includes four of the contact channels 238. However, the housing 230 may include greater or fewer contact channels 238 in alternative embodiments corresponding to the number of contacts 222 used in the electrical connector 210. In some alternative embodiments, the housing 230 may include a single contact channel 238. The housing 230 may include individual tubes forming portions of the contact channels 238, such as at the rear 236.

In an exemplary embodiment, the housing 230 includes contact retention latches 240 used as primary securing means for securing the contacts 222 in the housing 230. In the illustrated embodiment, the contact retention latches 240 are provided at the front 234. However, the contact retention latches 240 may be located at other positions in alternative embodiments, such as interior of the housing 230 along an interior portion of the contact channels 238. The contact retention latches 240 are deflectable latches. Each contact retention latch 240 is configured to interface with the retention feature 228 of the corresponding contact 222 to hold the contact 222 in the housing 230. For example, the contact retention latch 240 may snap into the groove defining the retention feature 228 when the contact 222 is fully loaded into the housing 230. In various embodiments, the contact 222 may be rear loaded into the contact channel 238 and pushed forward to the front 234 of the housing 230. In various embodiments, the mating end of the contact 222 may be located forward of the front 234 of the housing 230 for mating with the first connector assembly 100.

In an exemplary embodiment, the housing 230 includes a housing latch 242 at an exterior of the housing 230. The housing latch 242 is used to secure the housing 230 to the support bracket 300. The housing latch 242 may be used to secure the housing 230 to the TPA device 250 in alternative embodiments. The housing latch 242 may be provided along one or more sides of the housing 230. In various embodiments, the housing latch 242 is deflectable. In alternative embodiments, the housing latch 242 is a fixed latch.

The TPA device 250 extends between a front 256 and a rear 258. In an exemplary embodiment, the TPA device 250 includes a shroud 260 surrounding a cavity 262. The cavity 262 receives the housing 230. In an exemplary embodiment, the cavity 262 is open at the rear 258 to receive the housing 230. The shroud 260 may include openings 261, such as at the sides, which are configured to receive portions of the support bracket 300. The shroud 260 includes one or more latching features 264 for latchably coupling the TPA device 250 to the support bracket 300. The latching features 264 may be latchably coupled to the housing 230 in alternative embodiments. In the illustrated embodiment, the latching feature 264 includes a deflectable latch arranged along the ends of the TPA device 250. Other locations are possible in alternative embodiments. Other types of latching features may be used in alternative embodiments, such as openings that receive latches. In an exemplary embodiment, the latching features 264 are configured to be coupled to the support bracket 300 at different positions, such as to allow positioning of the TPA device 250 at an initial or pre-set position and at a normal or set position. The TPA device 250 may be moved axially, such as parallel to the mating axis, between the preset position and the set position. In an exemplary embodiment, the TPA device 250 is used to block or hold the contact retention latches 240 in the set position to prevent deflection of the contact retention latches 240 when the TPA device 250 is in the set position. As such, the TPA device 250 operates as a secondary latching or securing feature for securing the contacts 222 in the housing 230. However, when the TPA device 250 is in the preset position, the contact retention latches 240 are free to deflect to allow the contacts 222 to be loaded into the housing 230.

In an exemplary embodiment, the TPA device 250 includes a nose cone 270 at the front 256. In an exemplary embodiment, the nose cone 270 is tapered inward. The nose cone 270 includes guide surfaces 272 that extend from an end wall 274 at the front 256 of the TPA device 250 to the shroud 260. The contact channels 268 are open through the end wall 274. The end wall 274 defines a stop wall to stop loading of the second connector assembly 200 into the receptacle 152 of the first connector assembly 100. The end wall 274 is used to position the second connector assembly 200 for mating with the contacts 222 in the receptacle 152. The guide surfaces 272 guide the second connector assembly 200 into the funnel 154. In an exemplary embodiment, the guide surfaces 272 provide lead-in at the top, the bottom, and both sides of the nose cone 270 to accommodate misalignment of the second connector assembly 200 from any direction into the receptacle 152. In an exemplary embodiment, the nose cone 270 of the second connector assembly 200 has a complementary shape as the funnel 154 to ultimately align (for example, axial and angular alignment) the second connector assembly 200 with the first connector assembly 100 within the receptacle 152.

The support bracket 300 is used to support the electrical connector 210. In an exemplary embodiment, the electrical connector 210 has six mechanical degrees of freedom relative to the support bracket 300. For example, the electrical connector 210 has axial float in the X, Y, and Z directions as well as rotational float about a central pivot point in the yaw, pitch, and roll directions relative to the support bracket 300. In an exemplary embodiment, the support bracket 300 allows a limited amount of floating axial movement of the electrical connector 210 in an X direction; the support bracket 300 allows a limited amount of floating axial movement of the electrical connector 210 in a Y direction; the support bracket 300 allows a limited amount of floating axial movement of the electrical connector 210 in a Z direction; the support bracket 300 allows a limited amount of floating rotational movement of the electrical connector 210 in a yaw direction; the support bracket 300 allows a limited amount of floating rotational movement of the electrical connector 210 in a pitch direction; and the support bracket 300 allows a limited amount of floating rotational movement of the electrical connector 210 in a roll direction.

In an exemplary embodiment, the support bracket 300 includes a connector mount 302, a pivot frame 304, an X carriage 306, and a Y carriage 308. The connector mount 302 holds the electrical connector 210, such as the housing 230 of the electrical connector 210. The pivot frame 304 holds the connector mount 302. The X carriage 306 holds the pivot frame 304. The Y carriage 308 holds the X carriage 306. Other arrangements are possible in alternative embodiments, such as the Y carriage 308 holding the pivot frame 304 and/or the X carriage 306 holding the Y carriage 308. In an exemplary embodiment, the housing 230 of the electrical connector 210 is axially movable relative to the connector mount 302 in a Z direction parallel to the mating axis. The pivot frame 304 is axially movable relative to the X carriage 306 in an X direction. The X carriage 306 is axially movable relative to the Y carriage in a Y direction. The interaction between the housing 230, the connector mount 302, the pivot frame 304, the X carriage 306, and the Y carriage 308 compensate for misalignment of the second connector assembly 200 with the first connector assembly 100 due to positional and physical variations to accommodate X, Y, and Z mating tolerances. In an exemplary embodiment, the connector mount 302 is rotatably movable relative to the pivot frame 304 in a yaw direction, a pitch direction, and a roll direction to compensate for angular tolerances in the X-Y, Y-Z, and Y-Z planes.

The connector mount 302 includes a shell 310 having a cavity 312 configured to receive the housing 230. The shell 310 extends between a front 314 and a rear 316. The cavity 312 may be open at the front 314 to receive the housing 230. In an exemplary embodiment, the shell 310 includes a retention latch 318 at an exterior of the shell 310. The retention latch 318 is used to secure the TPA device 250 on the shell 310. Optionally, the shell 310 may include multiple retention latches 318 are axially offset from each other to allow positioning of the TPA device 250 at different positions such as a preset position and a set position. The shell 310 may include one or more retention features (not shown) within the cavity 312 that are used to secure the housing 230 in the cavity 312. For example, the retention features may be latches configured to be latchably coupled to the housing 230.

In an exemplary embodiment, the connector mount 302 includes a pivot element 320 configured to be pivotably coupled to the pivot frame 304. In the illustrated embodiment, the pivot element 320 includes a semispherical protrusion 322 at the exterior of the shell 310. Optionally, the connector mount 302 may include a pair of the pivot elements 320 on opposite sides of the shell 310. The pivot element 320 is sized and shaped to allow rotation of the connector mount 302 relative to the pivot frame 304. In an exemplary embodiment, the pivot element 320 includes a control slot 324 in the semispherical protrusion 322. The control slot 324 is used to control an amount of angular rotation of the connector mount 302 relative to the pivot frame 304. For example, the control slot 324 may have an hourglass shape to allow rotation of the pivot element 320 within the pivot joint of the pivot frame 304. The control slot 324 may have other shapes in alternative embodiments.

In an exemplary embodiment, biasing elements 330 are configured be positioned between the connector mount 302 and the housing 230. The biasing elements 330 may be received in the cavity 312. In an exemplary embodiment, the biasing elements 330 are coil springs. However, other types of biasing elements may be used in alternative embodiments. The biasing elements 330 are compressible and are configured to exert a spring force on the connector mount 302 and/or the housing 230. For example, the biasing elements 330 are configured forward bias the housing 230 relative to the shell 310 of the connector mount 302. The biasing elements 330 holds the housing 230 in a forward biased position for mating with the first connector assembly 100. The biasing elements 330 may be compressed by the housing 230 during mating with the first connector assembly 100. The biasing elements 330 allow movement of the housing 230 relative to the connector mount 302 of the support bracket 300 in the Z direction, which is parallel to the mating axis.

In an exemplary embodiment, the pivot frame 304 is a multipiece frame having a first frame member 340 and a second frame member 342 configured to be mated together to form the pivot frame 304. The frame members 340, 342 extend along opposite sides of the connector mount 302. The pivot frame 304 includes an opening 344 between the frame members 340, 342. Optionally, the frame members 340, 342 may be identical or mirrored halves of each other.

In an exemplary embodiment, the pivot frame 304 includes slots 346 in the frame members 340, 342. The slots 346 are configured to receive mounting portions of the X carriage 306 that are used to mount the X carriage 306 to the pivot frame 304. Other types of mounting features may be used in alternative embodiments. In an exemplary embodiment, the slots 346 are elongated to allow axial movement of the X carriage 306 relative to the pivot frame 304.

The pivot frame 304 includes pivot elements 350 that receive the pivot elements 320 of the connector mount 302. The pivot elements 350 are provided on opposite sides of the opening 344. For example, each of the frame members 340, 342 includes a corresponding pivot element 350. In an exemplary embodiment, each pivot element 350 is a semispherical socket 352 configured to receive the corresponding semispherical protrusion 322 of the connector mount 302. The semispherical protrusion 322 is rotatable within the semispherical socket 352 to allow rotation of movement of the connector mount 302 and thus the electrical connector 210 relative to the pivot frame 304. In an exemplary embodiment, the pivot element 350 includes a control rib 354 extending into the semispherical socket 352. The control rib 354 is configured to be received in the corresponding control socket 324 of the semispherical protrusion 322. The control rib 354 is able to move in the control slot 324 as the connector mount 302 pivot or rotates relative to the pivot frame 304. The interaction between the control rib 354 and the semispherical protrusion 322 controls the amount of floating movement of the connector mount 302 relative to the pivot frame 304. For example, the control rib 354 is configured to bottom out or abut against the semispherical protrusion 322 to limit or control the amount of angular movement of the connector mount 302 relative to the pivot frame 304. In an exemplary embodiment, the pivot element 320 is able to rotate relative to the pivot element 350 in multiple directions, such as a yaw direction, a pitch direction, and a role direction.

In an exemplary embodiment, the X carriage 306 is configured to be coupled to the pivot frame 304. However, in alternative embodiments, the Y carriage 308 may be coupled to the pivot frame 304. The X carriage 306 includes a panel 360 having an opening 362 configured to receive the electrical connector 210. The opening 362 may be centered in the panel 360. The opening 362 may be oversized relative to the electrical connector 210 to allow movement of the electrical connector 210 relative to the X carriage 306, such as rotation and/or translation of the electrical connector 210 relative to the X carriage 306 in the opening 362.

In an exemplary embodiment, the X carriage 306 includes flanges 364 extending from the panel 360, such as the rear of the panel 360. The flanges 364 configured to be coupled to the pivot frame 304. For example, the flanges 364 are received in the slots 346 in the pivot frame 304. The flanges 364 may be clipped or latched to the pivot frame 304 to retain the pivot frame 304 on the panel 360. In an exemplary embodiment, the slots 346 are oversized relative to the flanges 364 to allow axial movement of the flanges 364 in the slots 346, such as in the X direction. As such, the pivot frame 304 is configured to move relative to the X carriage 306 in the X direction.

In an exemplary embodiment, the X carriage 306 includes slots 366 in the panel 360. The slots 366 are configured to receive mounting portions of the Y carriage 308 that are used to mount the Y carriage 308 to the X carriage 306. Other types of mounting features may be used in alternative embodiments. In an exemplary embodiment, the slots 366 are elongated to allow axial movement of the Y carriage 308 relative to the X carriage 306. In an exemplary embodiment, the slots 366 are oriented in a direction perpendicular to the slots 346.

In an exemplary embodiment, the Y carriage 308 is configured to be coupled to the X-carriage 306. However, in alternative embodiments, the Y carriage 308 may be coupled to the pivot frame 304. The Y carriage 308 includes a panel 370 having an opening 372 configured to receive the electrical connector 210. The opening 372 may be centered in the panel 370. The opening 372 may be oversized relative to the electrical connector 210 to allow movement of the electrical connector 210 relative to the Y carriage 308, such as rotation and/or translation of the electrical connector 210 relative to the Y carriage 308 in the opening 372.

In an exemplary embodiment, the Y carriage 308 includes flanges 374 extending from the panel 370, such as the rear of the panel 370. The flanges 374 configured to be coupled to the X carriage 306. For example, the flanges 374 are received in the slots 366 in the X carriage 306. The flanges 374 may be clipped or latched to the X carriage 306 to retain the X carriage 306 on the panel 370. In an exemplary embodiment, the slots 366 are oversized relative to the flanges 374 to allow axial movement of the flanges 374 in the slots 366, such as in the Y direction. As such, the Y carriage 308 is configured to move relative to the X carriage 306 in the Y direction.

Figure 7:
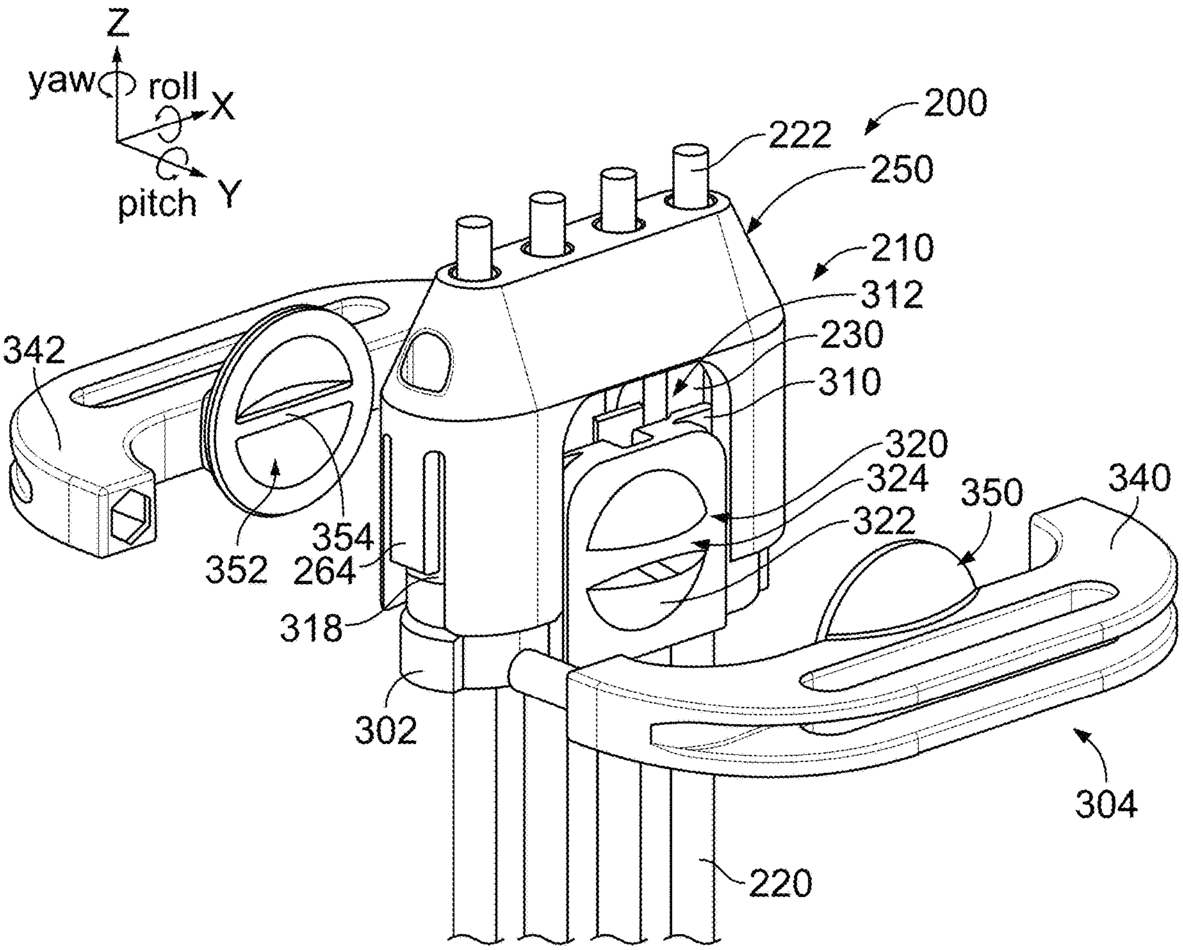
FIG. 7 is a partially assembled view of a portion of the second connector assembly showing the electrical connector coupled to the connector mount and showing the pivot frame poised for mounting to the connector mount in accordance with an exemplary embodiment.

FIG. 7 is a partially assembled view of a portion of the second connector assembly 200 showing the electrical connector 210 coupled to the connector mount 302 and showing the pivot frame 304 poised for mounting to the connector mount 302. During assembly, the housing 230 of the electrical connector 210 is received in the cavity 312 of the shell 310 of the connector mount 302.

In an exemplary embodiment, the TPA device 250 is configured to be coupled to the shell 310. For example, the latching features 264 are configured to be coupled to the retention latches 318 of the connector mount 302. The retention latches 318 hold the TPA device 250 at one or more predetermined positions. For example, multiple retention latches 318 may be provided at different axial positions to hold the TPA device 250 at different axial positions relative to the shell 310. The TPA device 250 may be initially held at a preset position where the TPA device 250 is only partially or initially coupled to the housing 230. The contacts 222 and the cables 220 are configured to be loaded into the housing 230 when the TPA device 250 is in the preset position. For example, the TPA device 250 does not block the retention latches of the housing 230, which allows the contacts 222 to be loaded into the housing 230 and engage the retention latches. After the contacts 222 are loaded in the housing 230, the TPA device 250 may be moved to the set position by pressing the TPA device 250 rearward relative to the housing 230 and or the connector mount 302. In the set position, the latching features 264 engage the rearward retention latches 318 to hold the TPA device 250 in the set position.

During assembly, the pivot frame 304 is coupled to the connector mount 302. For example, the pivot elements 350 are aligned with the pivot elements 320. The frame members 340, 342 are coupled together around the connector mount 302. During assembly, the control ribs 354 are received in the control slots 324. The semispherical protrusions 322 are received in the semispherical sockets 352. When assembled, the connector mount 302, and thus the electrical connector 210, are rotatable relative to the pivot frame 304 in one or more rotating directions, such as all three angular degrees of freedom.

Figure 8:
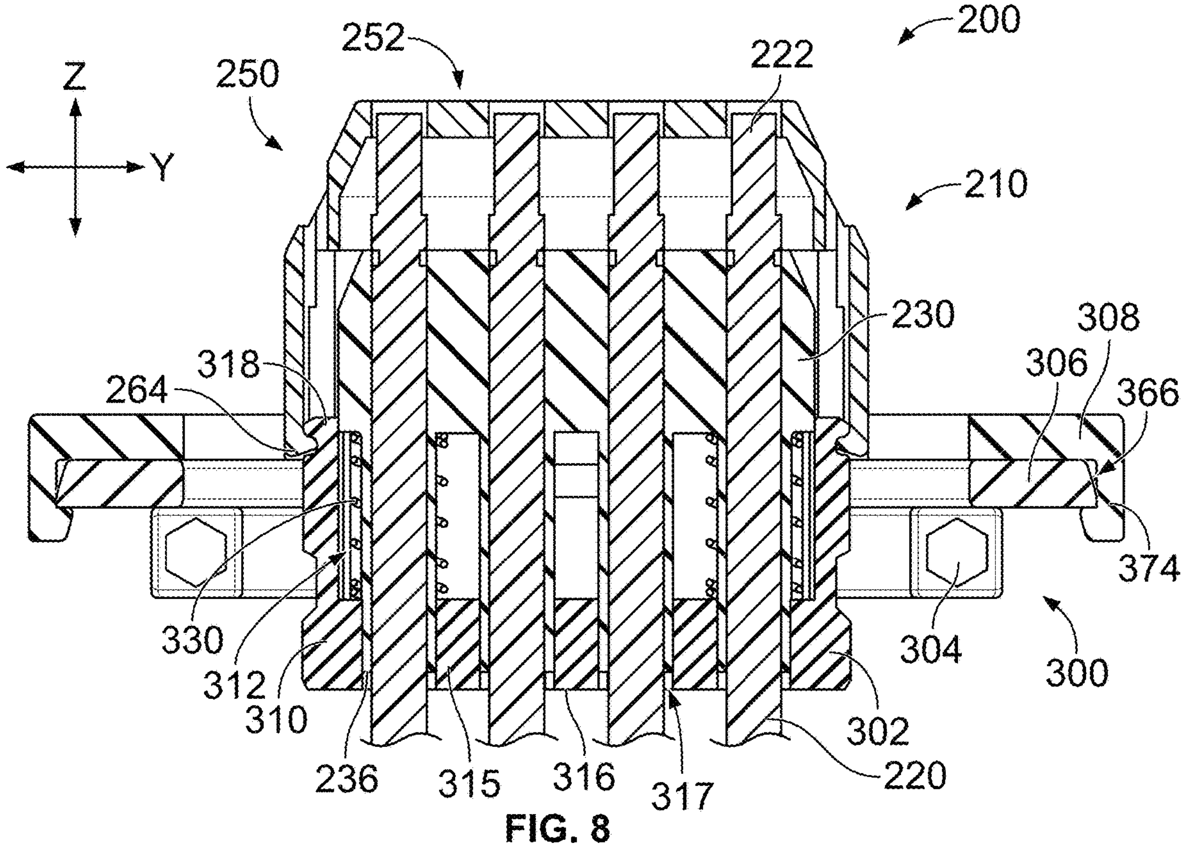
FIG. 8 is a cross-sectional view of the second connector assembly in accordance with an exemplary embodiment.
Figure 9:
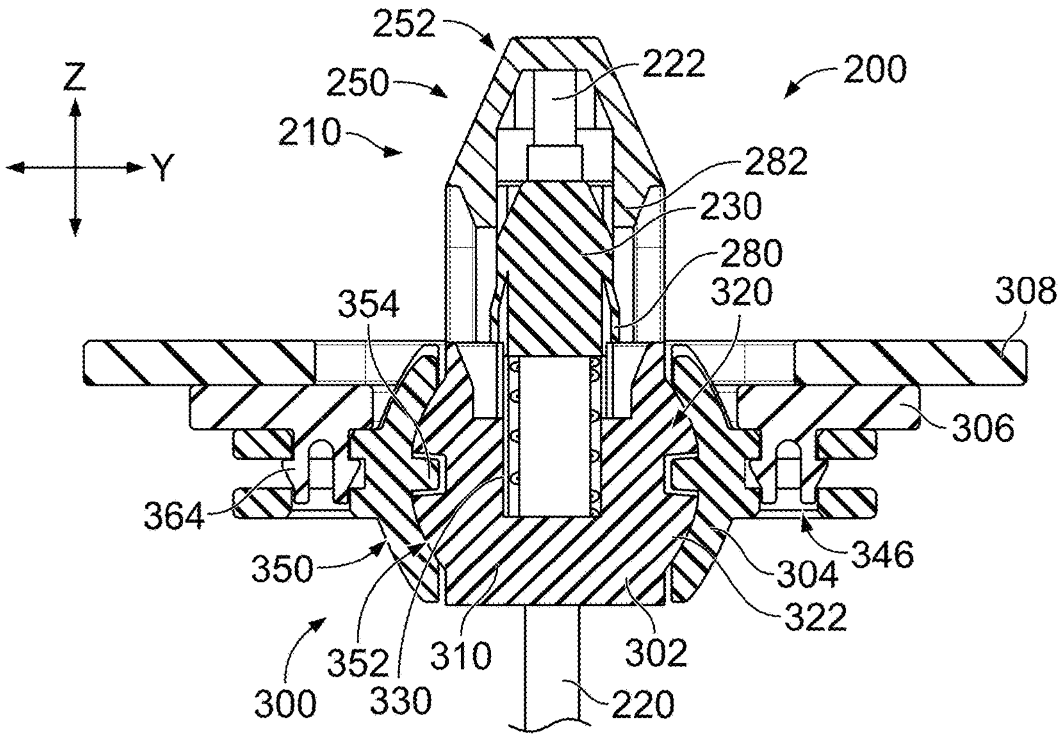
FIG. 9 is a cross-sectional view of the second connector assembly in accordance with an exemplary embodiment.

FIG. 8 is a cross-sectional view of the second connector assembly 200 in accordance with an exemplary embodiment. FIG. 9 is a cross-sectional view of the second connector assembly 200 in accordance with an exemplary embodiment. When assembled, the electrical connector 210 is coupled to the support bracket 300. The second connector assembly 200 is equipped with features that allow the electrical connector 210 to move with six mechanical degrees of freedom relative to the support bracket 300. For example, the electrical connector 210 has axial float in the X, Y, and Z directions as well as rotational float about a central pivot point in the yaw, pitch, and roll directions.

During assembly, the housing 230 of the electrical connector 210 is received in the cavity 312 of the shell 310 of the connector mount 302. The biasing elements 330 are coupled between the housing 230 and the connector mount 302. For example, forward ends of the biasing elements 330 engage the rear 236 of the housing 230 and rearward ends of the biasing elements 330 engage an end wall 315 at the rear 316 of the shell 310. In an exemplary embodiment, the end wall 315 includes cable channels 317 passing therethrough that receive the corresponding cables 220. Optionally, portions of the housing 230 may be received in the cable channels 317.

In an exemplary embodiment, retention latches 280 are provided between the housing 230 and the shell 310 that hold the housing 230 in an extended position relative to the shell 310. In the illustrated embodiment, the extended position is a forward position. The housing 230 is unable to move rearward into the cavity 312 when the retention latches 280 are engaged. In the illustrated embodiment, the retention latches 280 are part of the housing 230 and are configured to engage or seat on a portion of the shell 310. However, in alternative embodiments, the retention latches 280 may be part of the shell 310 and are configured to interface with the housing 230 to hold the housing 230 at the extended position. The retention latches 280 are releasable to allow the housing 230 to move into the cavity 312 in the Z direction, which is parallel to the mating direction. In an exemplary embodiment, the retention latches 280 are movable between latched positions and unlatched positions. The retention latches 280 support the housing 230 in the extended position when in the latched positions. The housing 230 is able to move from the extended position to the released position when the retention latches 280 are in the unlatched positions.

In an exemplary embodiment, the TPA device 250 includes release elements 282 that are configured to interface with the retention latches 280 to release the retention latches 280 and allow the axial movement of the housing 230 relative to the connector mount 302. For example, when the TPA device 250 is moved rearward, the release elements 282 engage the retention latches 280 and press the retention latches 280 inward to release the retention latches 280 from the support wall of the shell 310. When the TPA device 250 is in the rearward position, the release elements 282 and engage and hold the retention latches 280 in released positions. In an exemplary embodiment, when the electrical connector 210 is mated with the first connector assembly 100, the electrical connector 210 may be pushed rearward and the housing 230 may be moved rearward in the cavity 312 against the spring bias of the biasing elements 330. The biasing elements 330 forward bias the housing 230 and the contacts 222 to maintain a reliable electrical connection with the first connector assembly 100.

In an exemplary embodiment, the TPA device 250 is coupled to the shell 310. For example, the latching features 264 are coupled to the retention latches 318 of the connector mount 302. The TPA device 250 may be initially held at a preset position (FIGS. 8 and 9) where the TPA device 250 is only partially or initially coupled to the housing 230. The TPA device 250 may be moved rearward to a set position by pressing the TPA device 250 rearward relative to the housing 230 and/or the connector mount 302. The mating ends of the contact 222 may be located forward of the plug end 252 of the TPA device 250 in the set position to mate with the contacts of the first connector assembly 100.

During assembly, the pivot frame 304 is coupled to the connector mount 302, the X carriage 306 is coupled to the pivot frame 304, and the Y carriage 308 is coupled to the X carriage 306. The pivot elements 320 are coupled to the pivot elements 350. The pivot elements 320 are rotatable within the pivot elements 350. In an exemplary embodiment, the control ribs 354 controls an amount of angular movement of the semispherical protrusion 322 in the semispherical socket 352. Additionally, edges or end portions of the pivot elements 320, 350 may bottom out against each other to limit the amount of rotational movement of the connector mount 302, and thus the electrical connector 210, relative to the pivot frame 304. In various embodiments, the pivot frame 304 may allow ±5° of angular movement. However, the pivot frame 304 may be designed to allow greater or lesser angular movement in alternative embodiments.

When assembled, the flanges 364 of the X carriage 306 are coupled to the pivot frame 304. The flanges 364 are movable in the slot 346 to allow movement of the pivot frame 304 (and thus the connector mount 302 and the electrical connector 210) in the X direction. Similarly, the flanges 374 of the Y carriage 308 are coupled to the X carriage 306. The flanges 374 are movable in the slots 366 to allow movement of the X carriage 306 (and thus the pivot frame 304 and the connector mount 302 and the electrical connector 210) in the Y direction.

Figure 10:
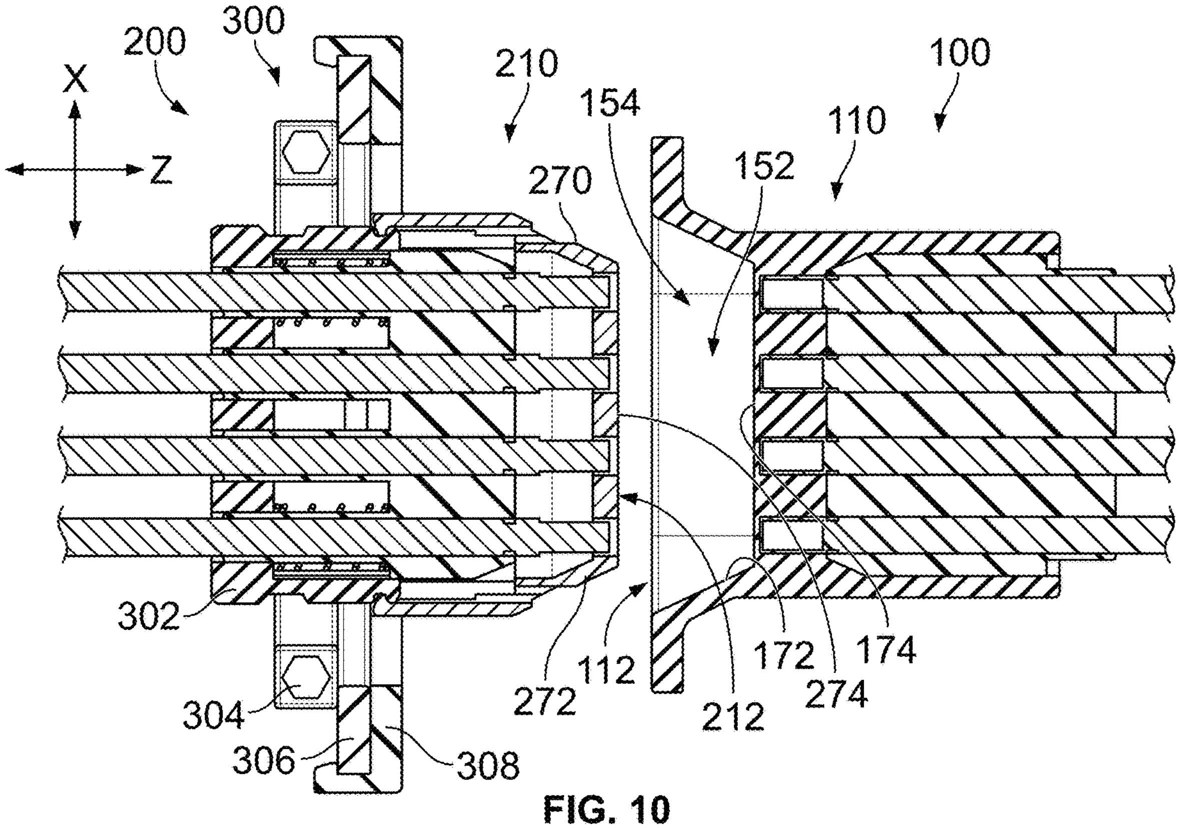
FIG. 10 illustrates the connector assemblies poised for mating in accordance with an exemplary embodiment.
Figure 11:
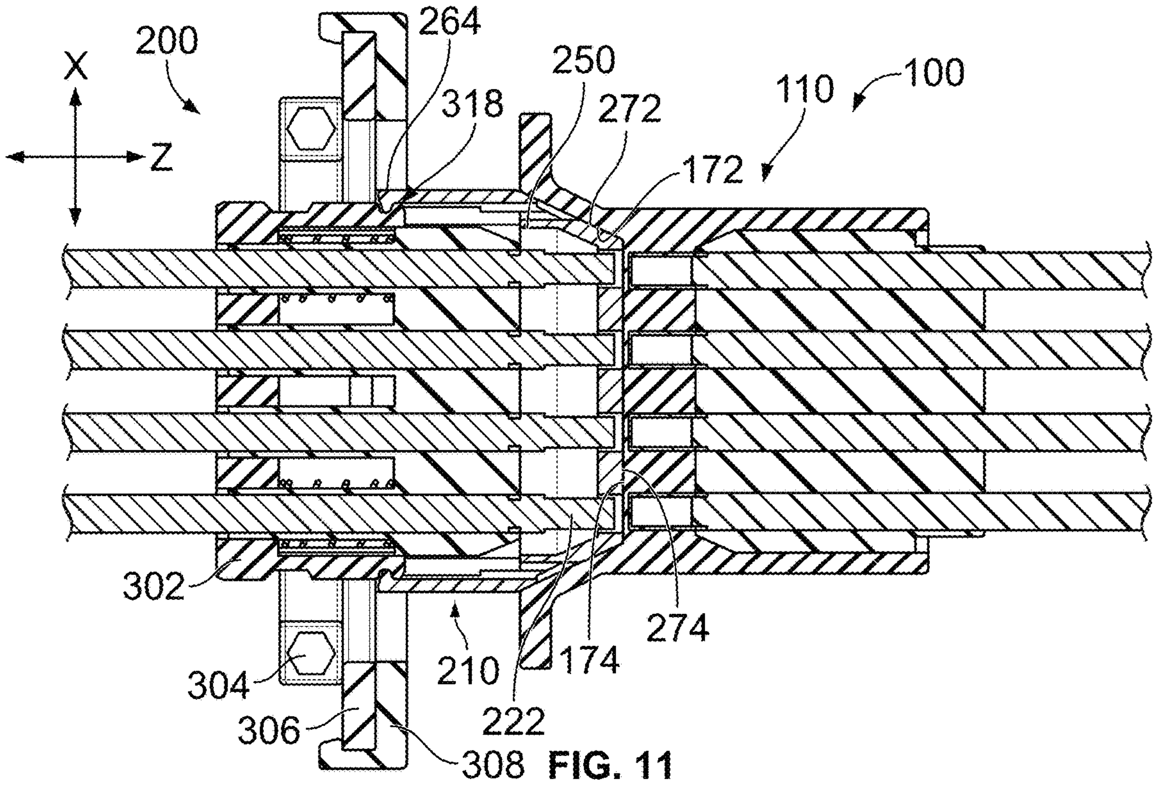
FIG. 11 illustrates the connector assemblies partially mated in accordance with an exemplary embodiment.
Figure 12:
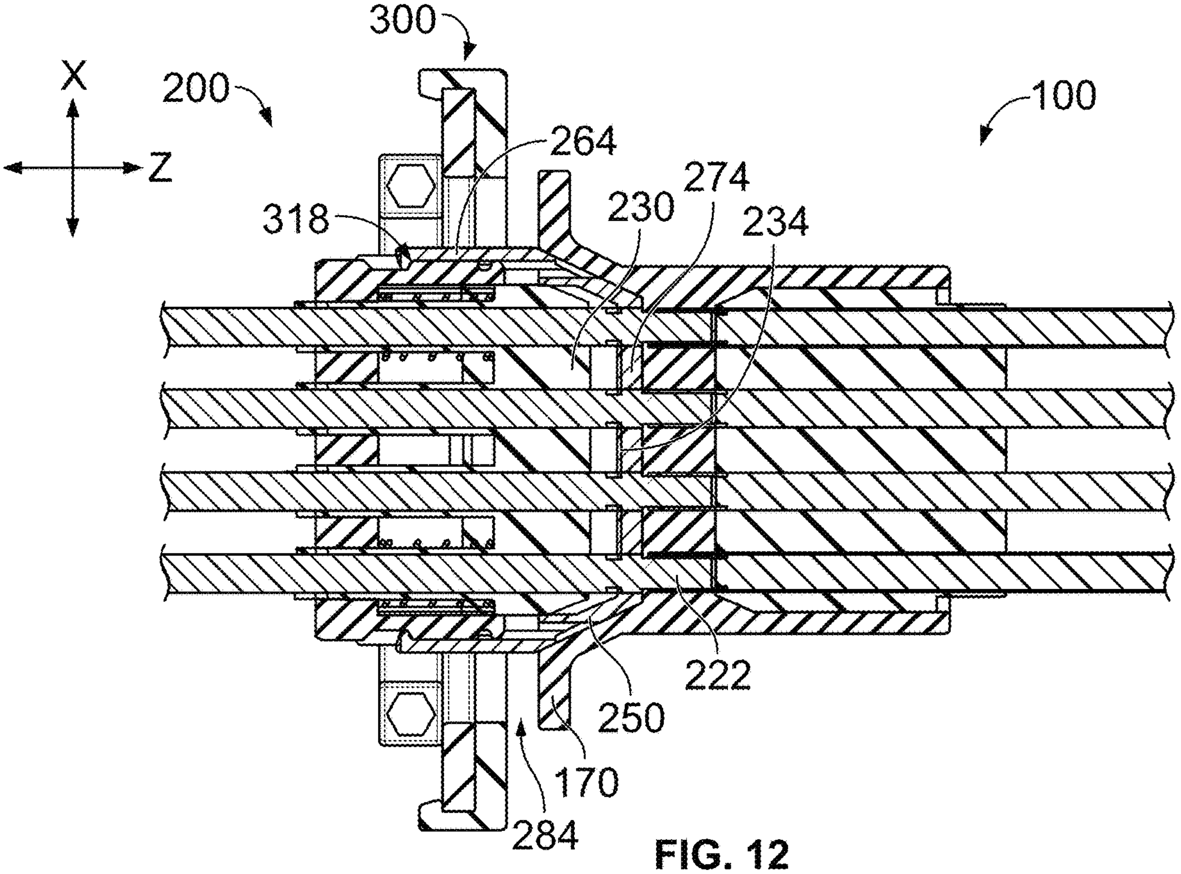
FIG. 12 illustrates the connector assemblies further mated in accordance with an exemplary embodiment.
Figure 13:
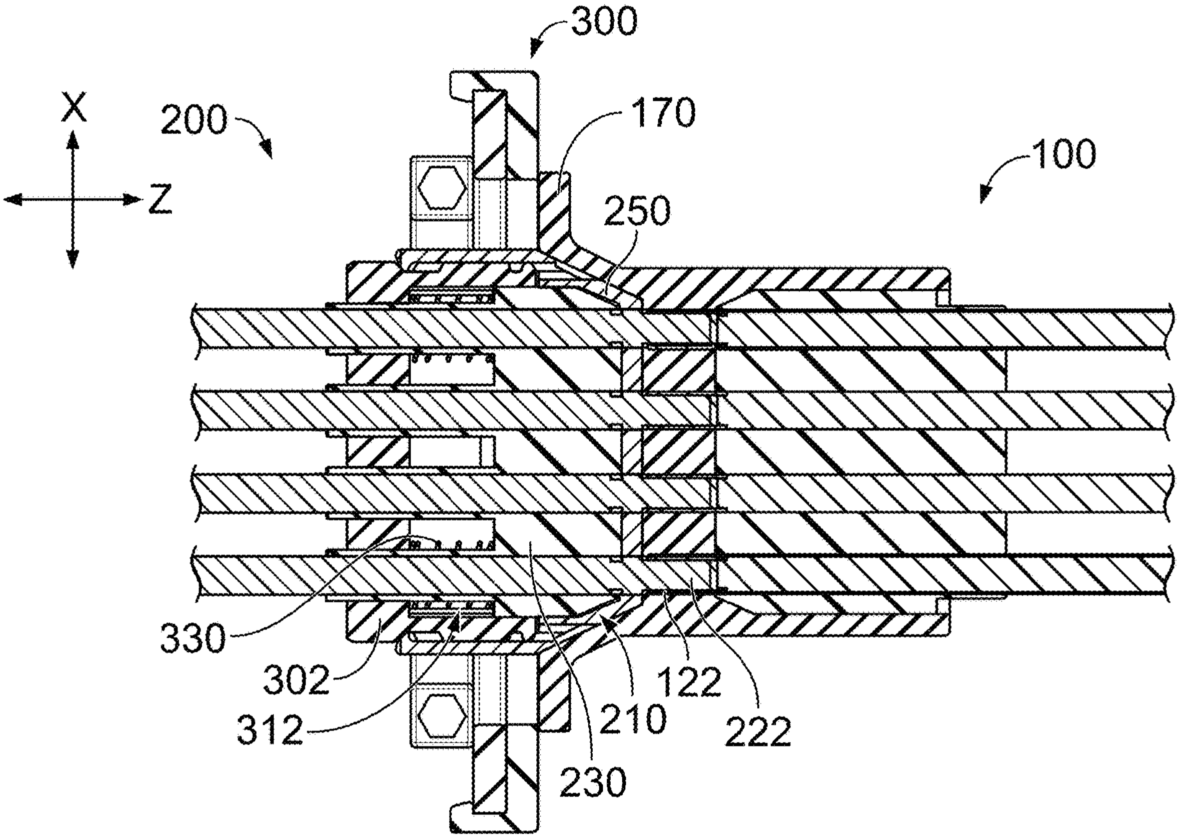
FIG. 13 illustrates the connector assemblies fully mated in accordance with an exemplary embodiment.

FIGS. 10-13 illustrate a mating sequence of the first and second connector assemblies 100, 200 in accordance with an exemplary embodiment. FIG. 10 illustrates the connector assemblies 100, 200 poised for mating. FIG. 11 illustrates the connector assemblies 100, 200 partially mated. FIG. 12 illustrates the connector assemblies 100, 200 further mated. FIG. 13 illustrates the connector assemblies 100, 200 fully mated.

In an exemplary embodiment, the connector assemblies 100, 200 are designed for blind mating. For example, the connector assemblies 100, 200 include self aligning features having a tolerance range that allow self aligning of the mating interfaces of the connector assemblies 100, 200 during mating. In various embodiments, the connector assemblies 100, 200 may be mated by an automated mating process using robots or machines to mate the connector assemblies 100, 200.

In an exemplary embodiment, the second connector assembly 200 is equipped with features that allow it to move or float during mating to align with the first connector assembly 100 during the mating process. For example, the second connector assembly 200 may float in one or more axial directions to align with the first connector assembly 100. The second connector assembly 200 may float in one or more angular directions to align with the first connector assembly 100. In an exemplary embodiment, the second connector assembly 200 is equipped with features that allow it to move with six mechanical degrees of freedom relative to the first connector assembly 100. For example, the second connector assembly 200 has axial float in the X, Y, and Z directions as well as rotational float about a central pivot point in the yaw, pitch, and roll directions. The connector assemblies 100, 200 are able to compensate for some misalignment in virtually all orientations due to positional in physical variations (for example, tolerances). For example, the connector assemblies 100, 200 accommodate for X, Y, and Z tolerances as well as three angular tolerances in the X-Y, X-Z, and Y-Z planes to accommodate the blind mate. The connector float in all axial and angular degrees of freedom ensures that the terminated cables of the connector assemblies 100, 200 can be successfully mated without sacrificing signal integrity. For example, the second connector assembly 200 is equipped with features that allow axial and rotational float such that the misalignment of the modules will not adversely affect the ability of the connector halves to mate, and subsequently, the terminated cables to align and transmit quality RF signal. The second connector assembly 200 may be equipped with features to load or forward bias the contacts in the mating direction so as to remove interface gaps between the contacts and the mating contacts that may detract from the system RF performance.

During mating, the mating end 212 of the electrical connector 210 is generally aligned with the mating end 112 of the electrical connector 110 (FIG. 10). The nose cone 270 is generally aligned with the funnel 154. The funnel 154 has an enlarged area to receive the nose cone 270. For example, the size of the opening to the funnel 154 is larger than the tip of the nose cone 270 to gather the nose cone 270 and guide the nose cone 270 into the funnel 154. Any axial or angular misalignment may be accommodated by the support bracket 300. For example, the electrical connector 210 may be moved in any of the X direction, the Y direction, or the Z direction and/or the electrical connector 210 may be moved in any of the yaw direction, the pitch direction, or the roll direction to properly align the electrical connectors 210, 110 during the mating sequence. For example, the pivot frame 304 may accommodate rotation of the electrical connector 210 in any of the rotational directions. The connector mount 302, the X carriage 306, and the Y carriage 308 may accommodate translation of the electrical connector 210 in any of the axial directions. The guide surfaces 272 of the nose cone 270 engage the lead in surfaces 172 to guide the nose cone 270 into proper alignment within the receptacle 152. The connector assemblies 100, 200 are mated along the mating axis until the end wall 274 bottoms out against the base wall 174 (FIG. 11). The guide surfaces 272 and the lead in surfaces 172 are used to self align the second connector assembly 200 in the proper axial or translational orientation (X/Y/Z) relative to the first connector assembly 100. After bottoming out, the second connector assembly 200 may self-align in the proper rotational orientation (yaw/pitch/roll) relative to the first connector assembly 100 by ensuring that the planar end wall 274 and planar base wall 174 are parallel to and abutting against each other.

During initial mating, the TPA device 250 is in the preset or forward position (FIG. 11). The TPA device 250 covers the contacts 222 to avoid damaging the contacts 222 during mating. After the end wall 274 bottoms out against the base wall 174, further mating of the connector assemblies 100, 200 causes the TPA device 250 to move rearward to the second position (FIG. 12). The latching features 264 of the TPA device 250 move from the forward retention latches 318 to the rearward retention latches 318. The end wall 274 is moved toward the housing 230. Optionally, in the set position, the end wall 274 abuts against the front 234 of the housing 230. When the TPA device 250 is moved to the set position, the mating ends of the contacts 222 protrude forward of the end wall 274 and are received in the electrical connector 110 and mated with the contacts 122. For example, the contacts 222 are pin contacts and the contacts 122 are socket contacts, wherein the pin contacts are received in the socket contacts to make electrical connection between the first and second connector assemblies 100, 200.

In an exemplary embodiment, the second connector assembly 200 may accommodate further mating (for example, over mating) in the mating direction. For example, when the first and second connector assemblies 100, 200 are initially mated (FIG. 12) a gap 284 may exist between the flange 170 and the support bracket 300. Further mating may close the gap until the flange 170 bottoms out against the support bracket 300 (FIG. 13). The electrical connector 210 is movable in the Z direction to accommodate the mating end closing of the gap 284. For example, the TPA device 250 may slide rearward along the connector mount 302. The housing 230 may move rearward in the cavity 312 and compress the biasing elements 330. The biasing element 330 are compressed, the biasing elements 330 impart a larger spring force in a forward direction against the housing 230, which presses the contacts 222 forward into the contacts 122 to maintain a reliable electrical connection and RF signal between the contacts 222, 122.

Figure 14:
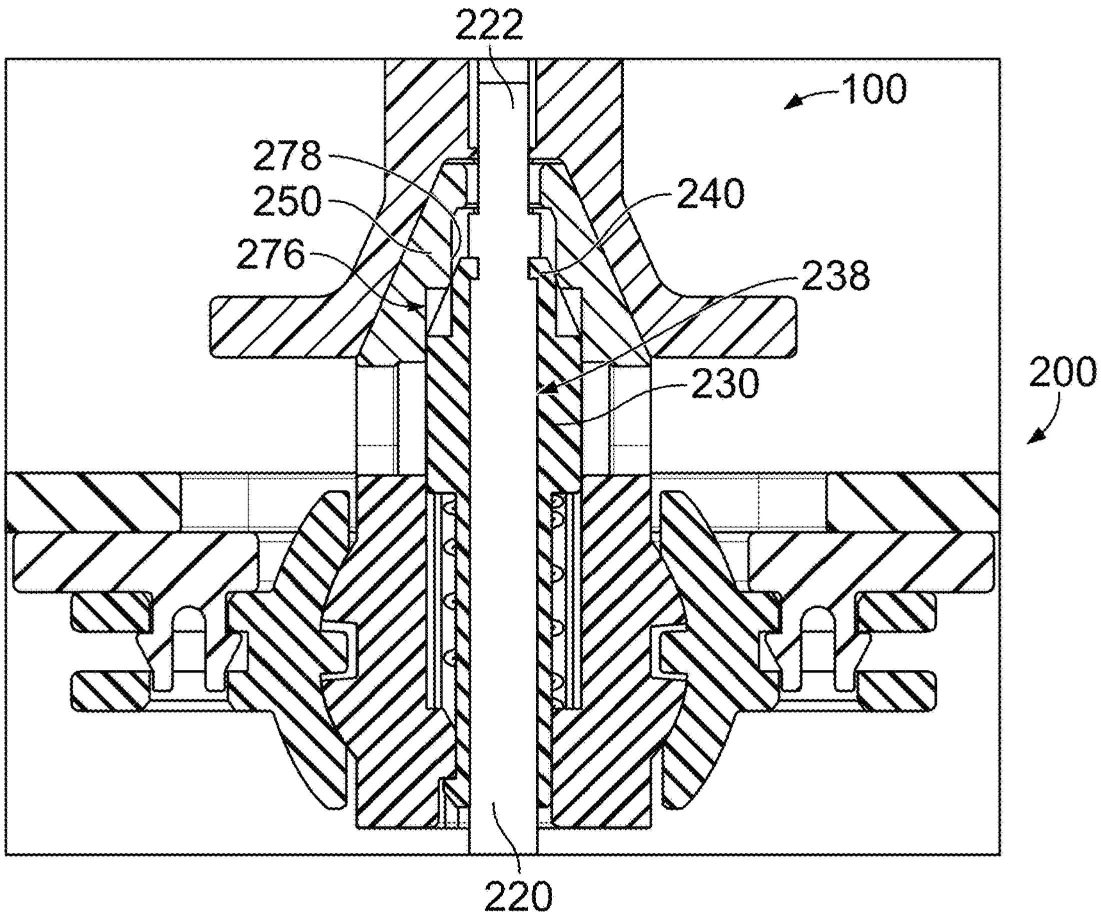
FIG. 14 is a cross-sectional view of the connector assemblies in a partially mated state corresponding to FIG. 12 in accordance with an exemplary embodiment.
Figure 15:
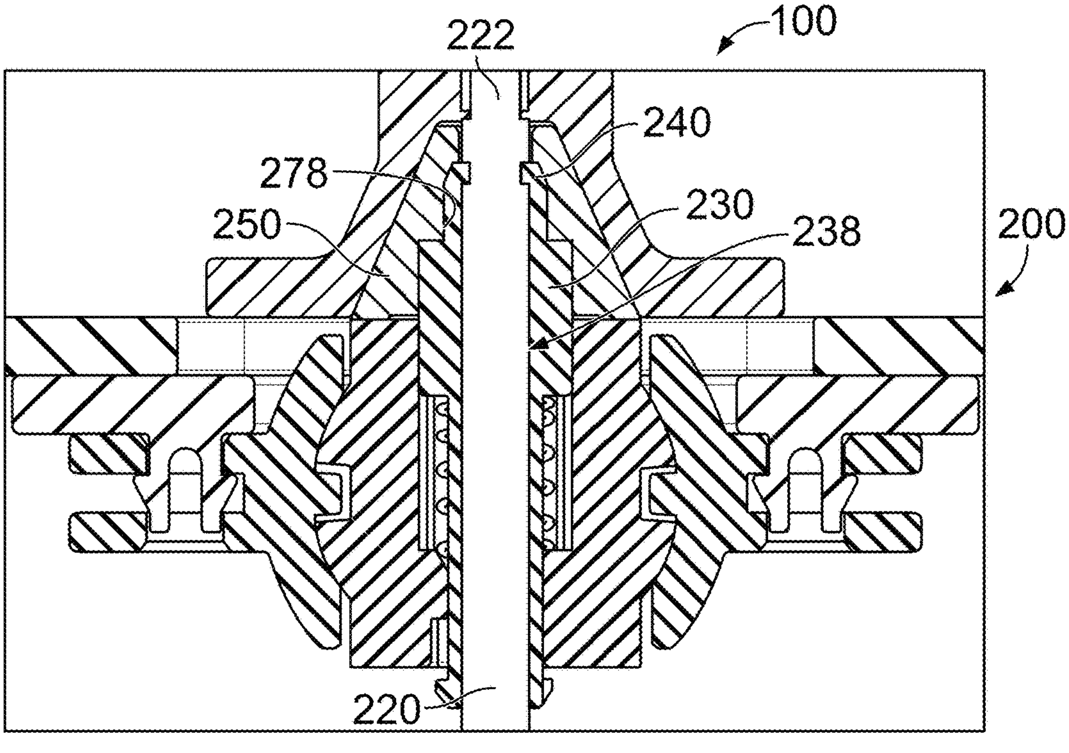
FIG. 15 is a cross-sectional view of the connector assemblies in a fully mated state corresponding to FIG. 13 in accordance with an exemplary embodiment.

FIG. 14 is a cross-sectional view of the connector assemblies 100, 200 in a partially mated state corresponding to FIG. 12. FIG. 15 is a cross-sectional view of the connector assemblies 100, 200 in a fully mated state corresponding to FIG. 13. When assembled, the contacts 222 and the cables 220 are loaded into the contact channels 238 of the housing 230. The contact retention latches 240 engage the retention features 228 of the contacts 222 to hold the contacts 222 in the housing 230. The contact retention latches 240 define primary retention features for the contacts 222. FIG. 14 shows the TPA device 250 in a preset position. FIG. 15 shows the TPA device 250 in a set position. When the TPA device 250 is in the preset position (FIG. 14), the contact retention latches 240 are able to be deflected outward, such as to load the contacts 222 into the housing 230. For example, the contact retention latches 240 are located in pockets 276 in the TPA device 250, which provide a space that allows movement or deflection of the contact retention latches 240 (for example, outward deflection). However, when the TPA device 250 is moved rearward to the set position (FIG. 15), blocking tabs 278 of the TPA device 250 are located outward of the contact retention latches 240. The blocking tabs 278 engage the contact retention latches 240 and prevent outward deflection of the contact retention latches 240. As such, the contact retention latches 240 are unable to release the contacts 222. The blocking tabs 278 operate as secondary retention features to prevent removal of the contacts 222 by blocking the contact retention latches 240.

Figure 16:
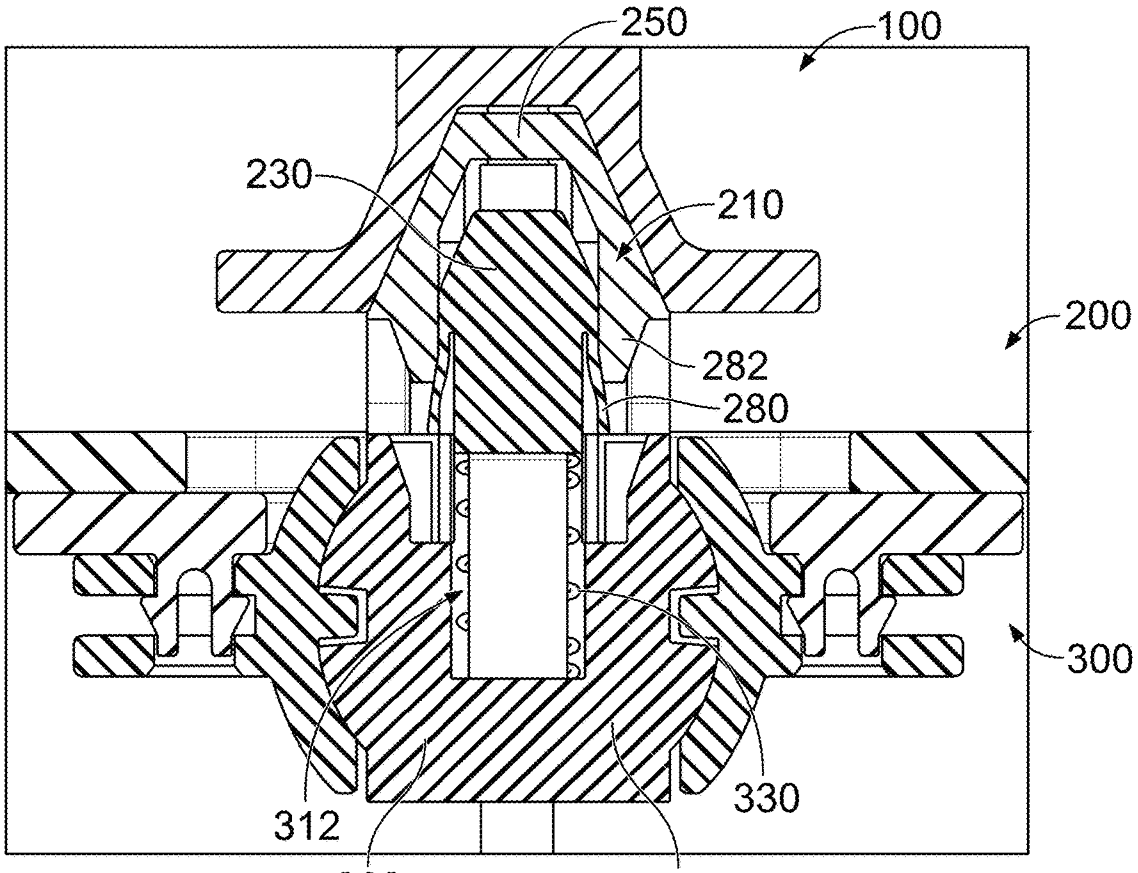
FIG. 16 is a cross-sectional view of the connector assemblies in a partially mated state corresponding to FIG. 12 in accordance with an exemplary embodiment.
Figure 17:
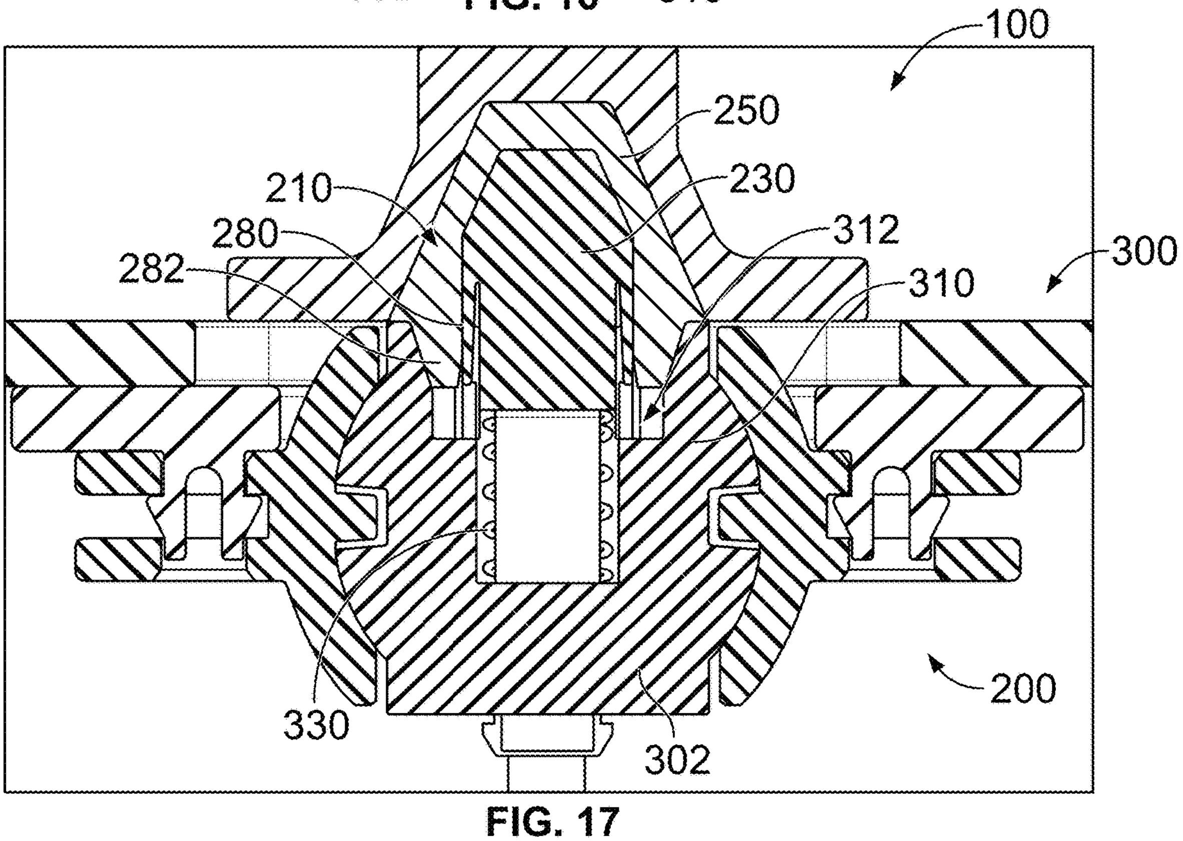
FIG. 17 is a cross-sectional view of the connector assemblies in a fully mated state corresponding to FIG. 13 in accordance with an exemplary embodiment.

FIG. 16 is a cross-sectional view of the connector assemblies 100, 200 in a partially mated state corresponding to FIG. 12. FIG. 17 is a cross-sectional view of the connector assemblies 100, 200 in a fully mated state corresponding to FIG. 13. FIGS. 16 and 17 illustrate the retention latches 280 between the housing 230 and the shell 310 that hold the housing 230 in an extended position relative to the shell 310. The housing 230 is unable to move rearward into the cavity 312 when the retention latches 280 are engaged. In the illustrated embodiment, the retention latches 280 are part of the housing 230 and are configured to engage or seat on a portion of the shell 310.

The retention latches 280 are releasable to allow the housing 230 to move into the cavity 312 in the Z direction, which is parallel to the mating direction. FIGS. 16 and 17 show movement of the electrical connector 210 relative to the support bracket 300 in the Z direction. For example, FIG. 16 shows the electrical connector 210 in a forward position relative to the support bracket 300 and FIG. 17 shows the electrical connector 210 in a rearward position relative to the support bracket 300. In an exemplary embodiment, the release elements 282 of the TPA device 250 are configured to interface with the retention latches 280 to release the retention latches 280 and allow the axial movement of the housing 230 relative to the connector mount 302. For example, when the TPA device 250 is moved rearward to the set position, the release elements 282 engage the retention latches 280 and press the retention latches 280 inward to release the retention latches 280 from the support wall of the shell 310. When the TPA device 250 is in the rearward position, the release elements 282 engage and hold the retention latches 280 in released positions. In an exemplary embodiment, with the retention latches 280 released, when the electrical connector 210 is mated with the first connector assembly 100, the electrical connector 210 may be pushed rearward and the housing 230 may be moved rearward in the cavity 312 against the spring bias of the biasing elements 330.

Figure 18:
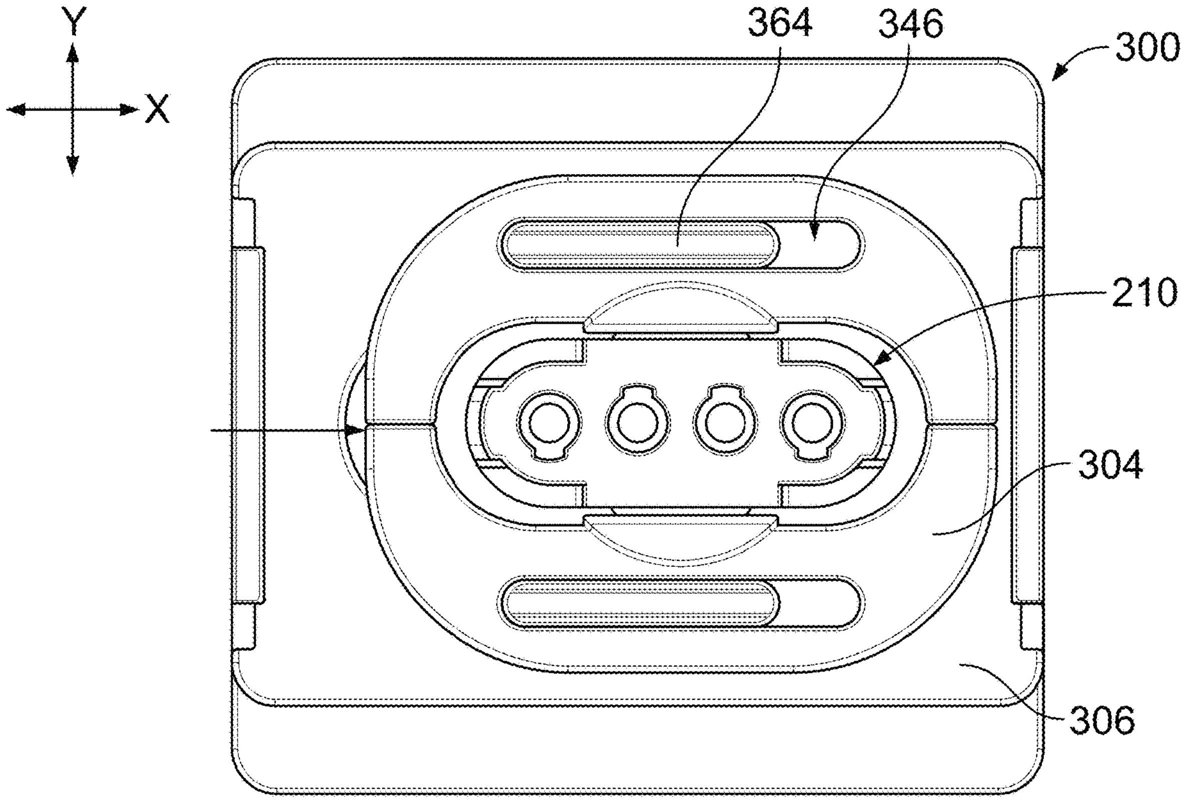
FIG. 18 illustrates axial movement of the electrical connector relative to the support bracket in the X direction in accordance with an exemplary embodiment.
Figure 19:
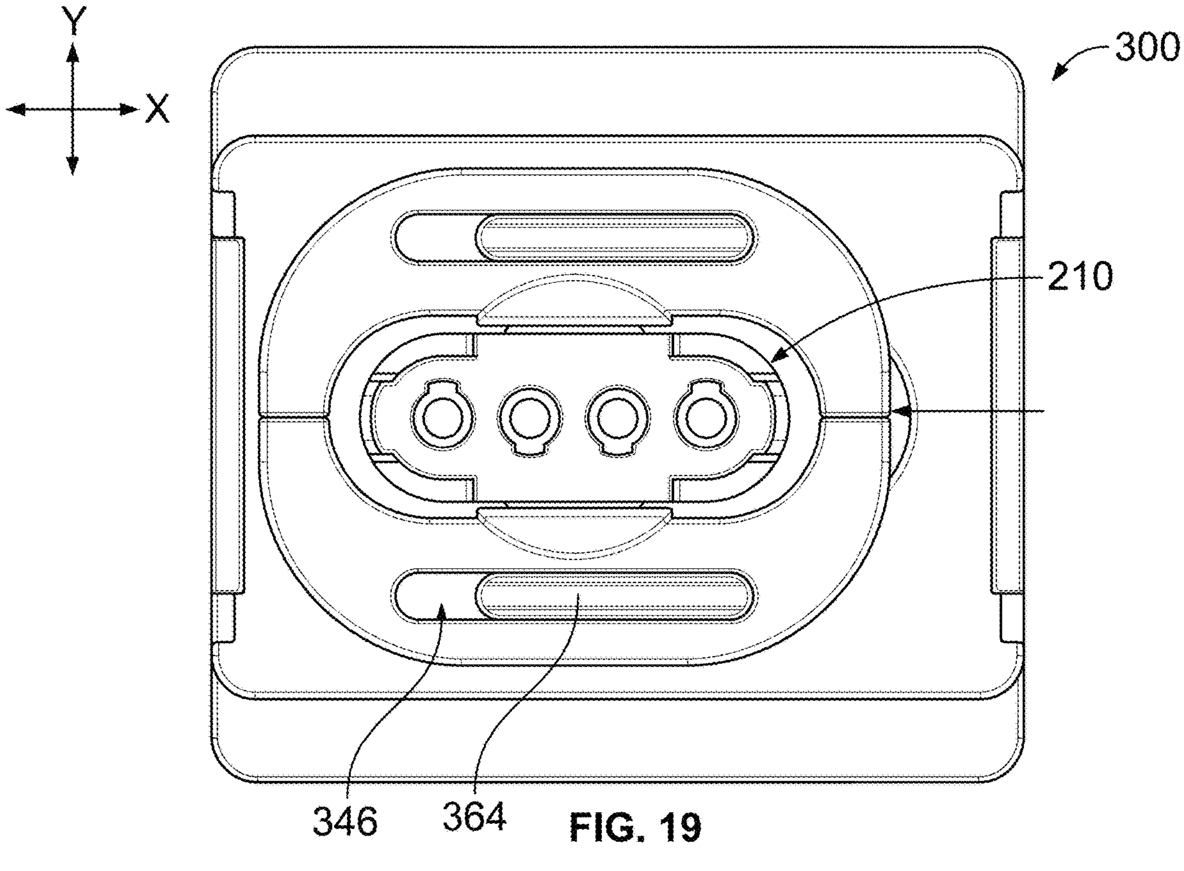
FIG. 19 illustrates axial movement of the electrical connector relative to the support bracket in the X direction in accordance with an exemplary embodiment.

FIGS. 18 and 19 illustrate axial movement of the electrical connector 210 relative to the support bracket 300 in the X direction. For example, FIG. 18 shows the electrical connector 210 shifted to the right relative to the support bracket 300 and FIG. 19 shows the electrical connector 210 shifted to the left relative to the support bracket 300. The X carriage 306 accommodates the movement of the electrical connector 210 in the X direction. For example, the flanges 364 are configured to move axially within the slots 346 of the pivot frame 304 to allow movement in the X direction.

Figure 20:
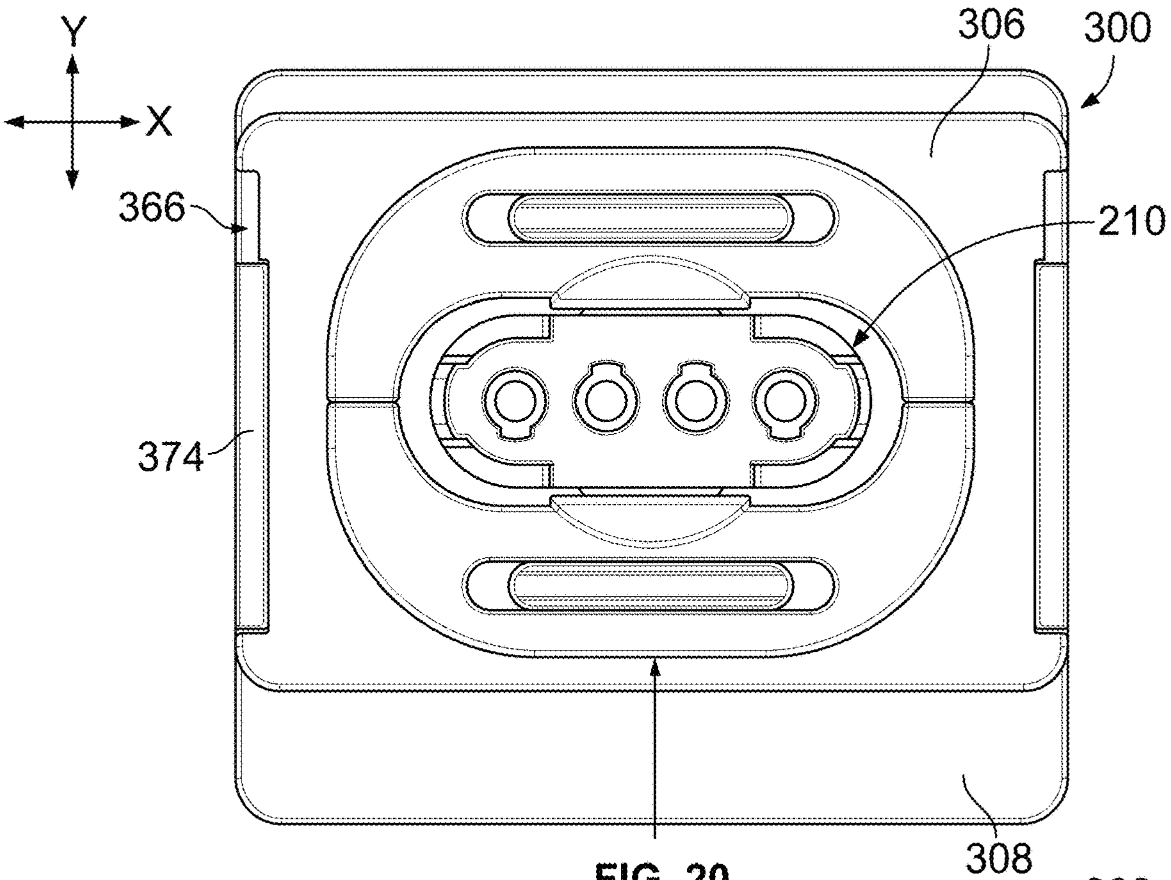
FIG. 20 illustrates axial movement of the electrical connector relative to the support bracket in the Y direction in accordance with an exemplary embodiment.
Figure 21:
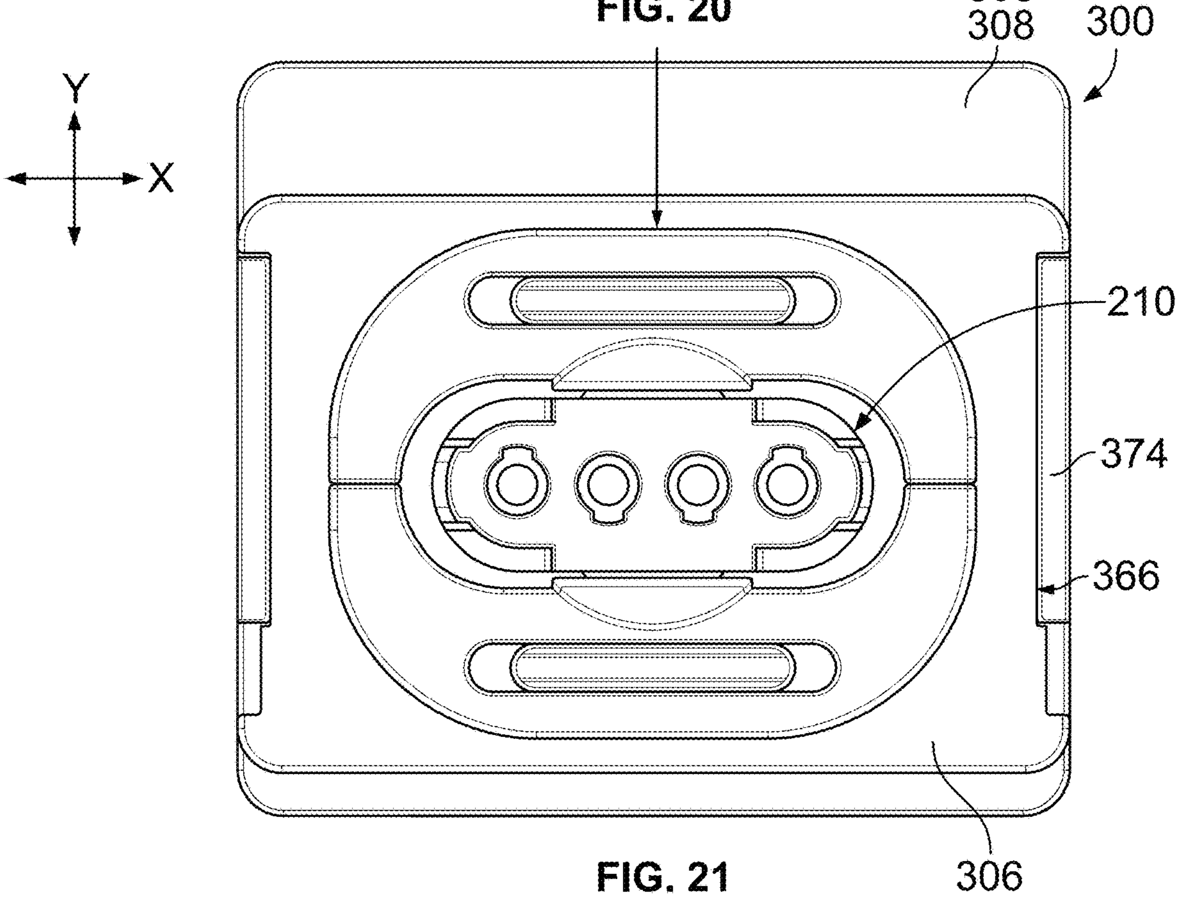
FIG. 21 illustrates axial movement of the electrical connector relative to the support bracket in the Y direction in accordance with an exemplary embodiment.

FIGS. 20 and 21 illustrate axial movement of the electrical connector 210 relative to the support bracket 300 in the Y direction. For example, FIG. 20 shows the electrical connector 210 shifted upward relative to the support bracket 300 and FIG. 21 shows the electrical connector 210 shifted downward relative to the support bracket 300. The Y carriage 308 accommodates the movement of the electrical connector 210 in the Y direction. For example, the flanges 374 are configured to move axially within the slots 366 of the X carriage 306 to allow movement in the Y direction.

Figure 22:
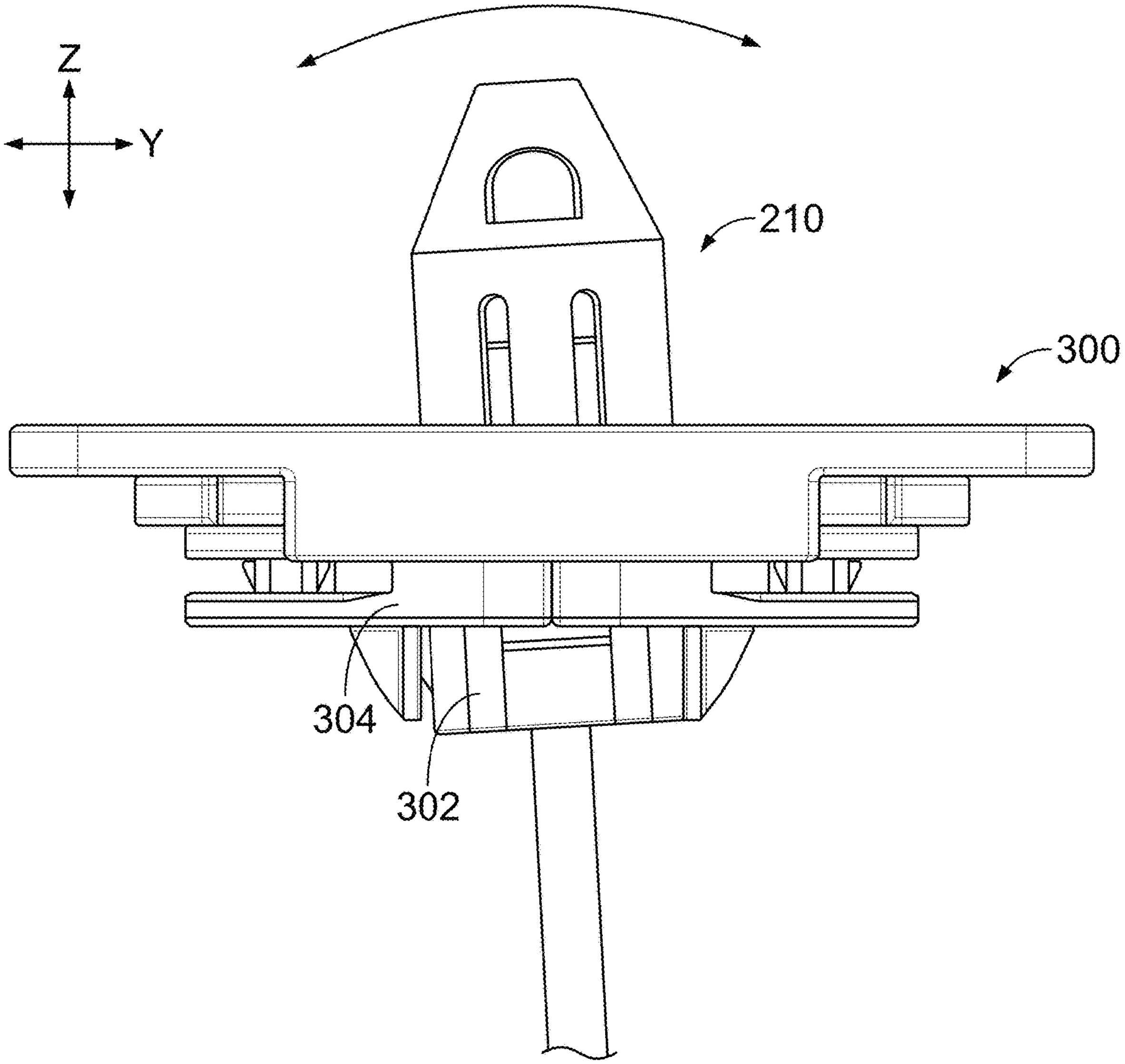
FIG. 22 illustrates rotation of the electrical connector relative to the support bracket in the yaw direction in accordance with an exemplary embodiment.
Figure 23:
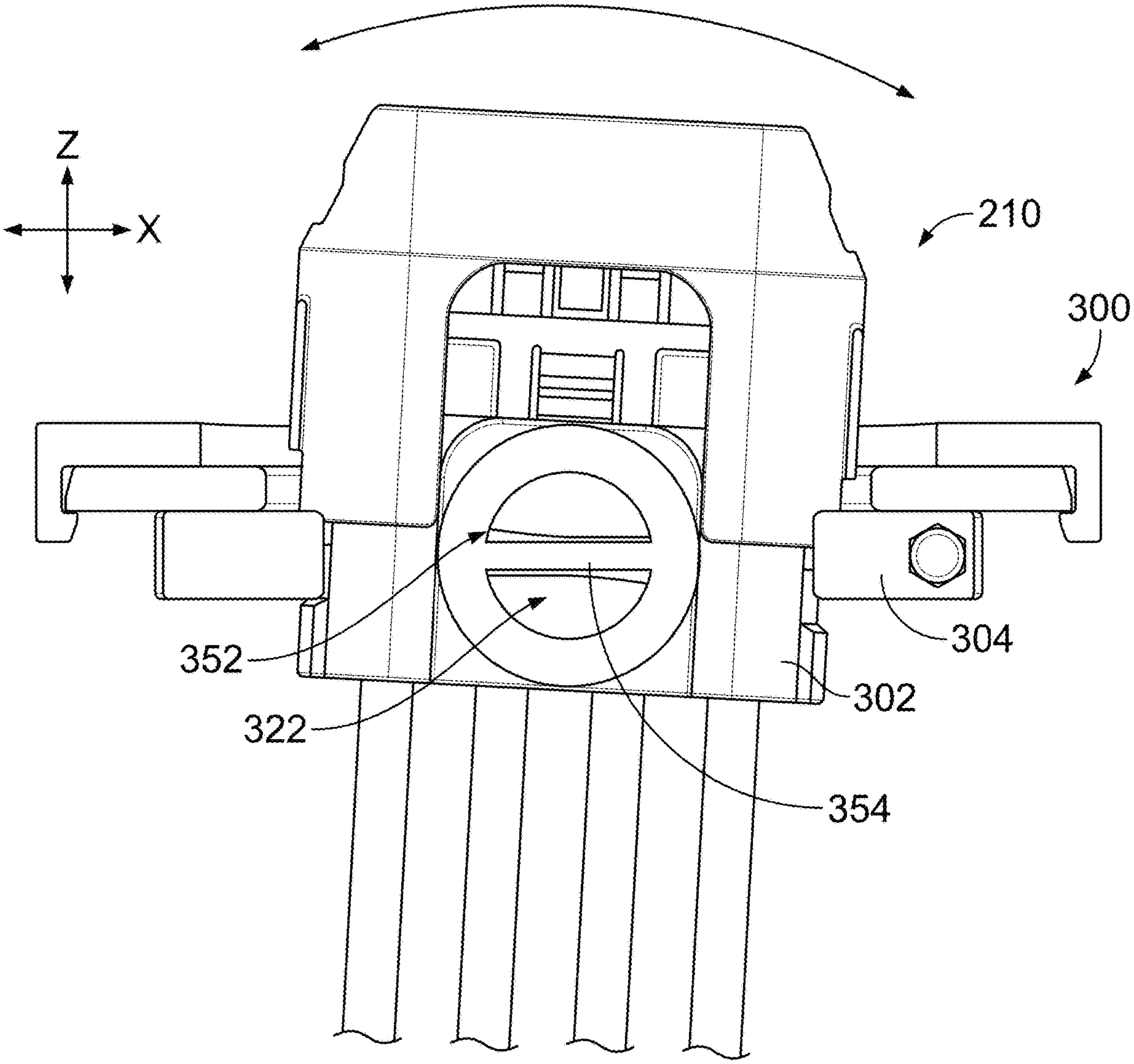
FIG. 23 illustrates rotation of the electrical connector relative to the support bracket in the pitch direction in accordance with an exemplary embodiment.
Figure 24:
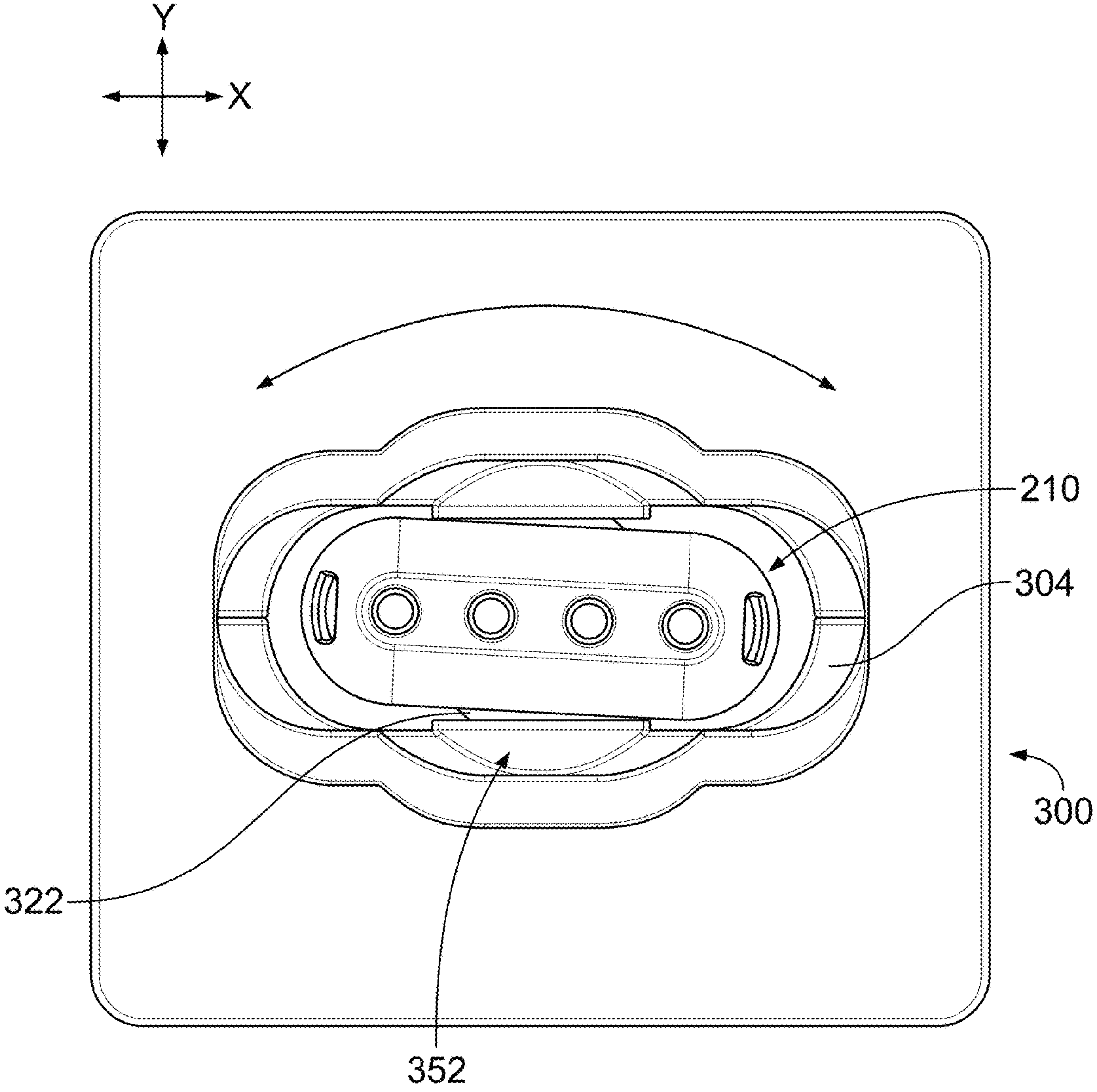
FIG. 24 illustrates rotation of the electrical connector relative to the support bracket in the roll direction in accordance with an exemplary embodiment.

FIGS. 22-24 illustrate rotation of the electrical connector 210 relative to the support bracket 300 at a pivot point. FIG. 22 illustrates rotation of the electrical connector 210 relative to the support bracket 300 in the yaw direction. FIG. 23 illustrates rotation of the electrical connector 210 relative to the support bracket 300 in the pitch direction. FIG. 24 illustrates rotation of the electrical connector 210 relative to the support bracket 300 in the roll direction. The pivot frame 304 accommodates the movement of the electrical connector 210 in the angular directions. For example, the semispherical protrusion 322 is able to pivot or rotate in the semispherical socket 352. The connector mount 302 may bottom out against the pivot frame 304 to limit the amount (for example, angle) of rotation (for example, nose up or down, nose side-to-side, or body rotation). For example, the control rib 354 may limit the amount of rotation (see, for example, FIG. 23). The sides or walls of the connector mount 302 may limit the amount of rotation when engaging the pivot frame 304 (see, for example, FIGS. 22 and 24).

Figure 25:
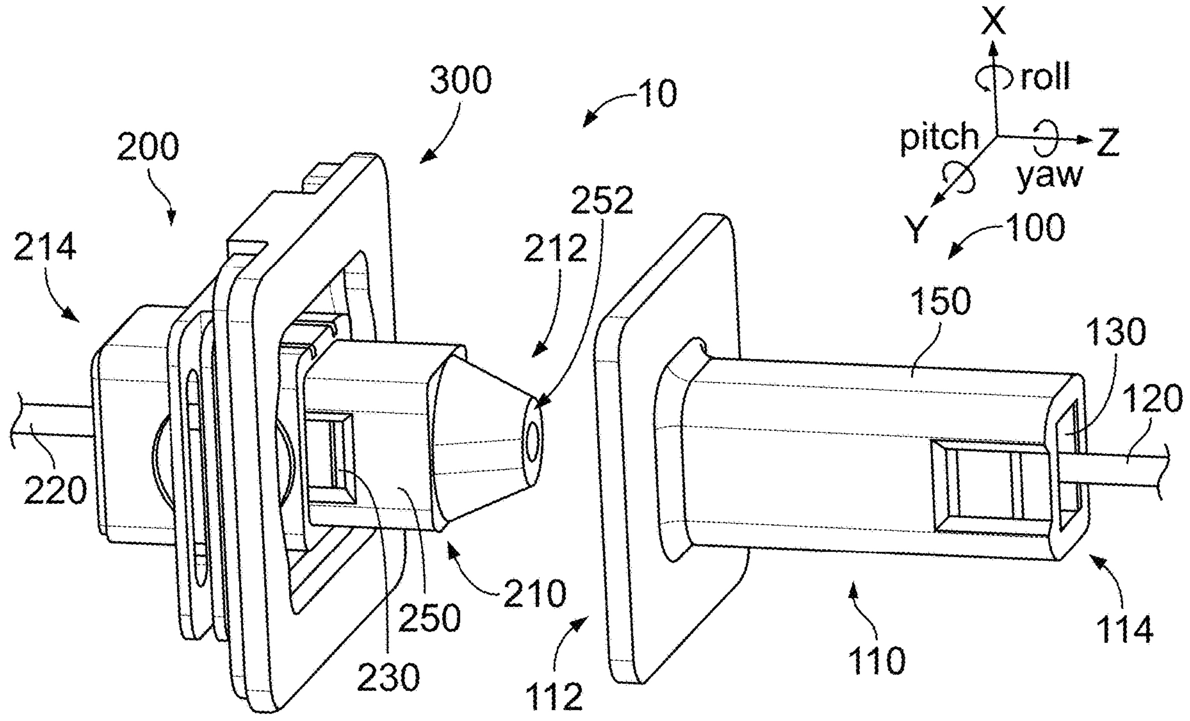
FIG. 25 is a front perspective view of the electrical connector system in accordance with an exemplary embodiment.
Figure 26:
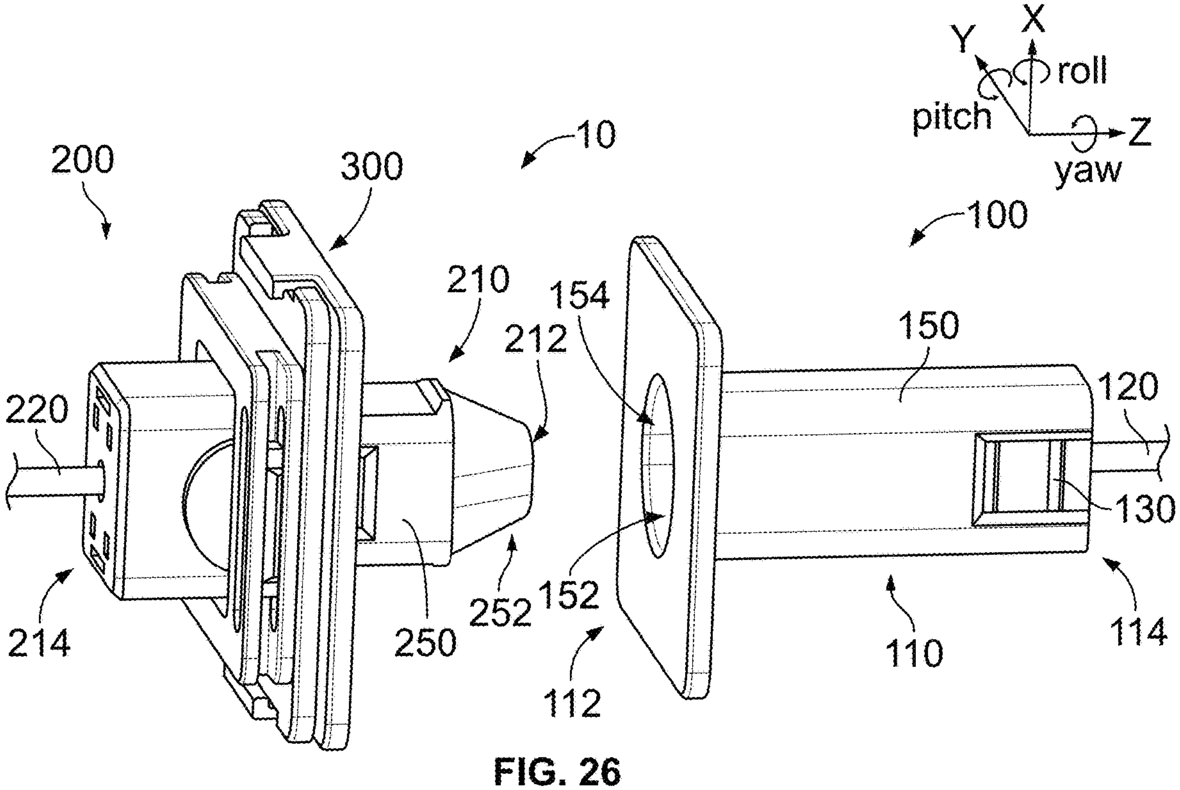
FIG. 26 is a rear perspective view of the electrical connector system in accordance with an exemplary embodiment.

FIG. 25 is a front perspective view of the electrical connector system 10 in accordance with an exemplary embodiment. FIG. 26 is a rear perspective view of the electrical connector system 10 in accordance with an exemplary embodiment. FIGS. 25 and 26 illustrate single position (for example, single contact and single cable) versions of the connector assemblies 100, 200 rather than the four position versions shown in FIGS. 1 and 2.

In an exemplary embodiment, the connector assemblies 100, 200 are designed for blind mating. For example, the connector assemblies 100, 200 include self aligning features having a tolerance range that allow self aligning of the mating interfaces of the connector assemblies 100, 200 during mating. In various embodiments, the connector assemblies 100, 200 may be mated by an automated mating process using robots or machines to mate the connector assemblies 100, 200.

In an exemplary embodiment, the second connector assembly 200 is equipped with features that allow it to move or float during mating to align with the first connector assembly 100 during the mating process. For example, the second connector assembly 200 may float in one or more axial directions to align with the first connector assembly 100. The second connector assembly 200 may float in one or more angular directions to align with the first connector assembly 100. In an exemplary embodiment, the second connector assembly 200 is equipped with features that allow it to move with six mechanical degrees of freedom relative to the first connector assembly 100. For example, the second connector assembly 200 has axial float in the X, Y, and Z directions as well as rotational float about a central pivot point in the yaw, pitch, and roll directions. The connector assemblies 100, 200 are able to compensate for some misalignment in virtually all orientations due to positional in physical variations (for example, tolerances). For example, the connector assemblies 100, 200 accommodate for X, Y, and Z tolerances as well as three angular tolerances in the X-Y, X-Z, and Y-Z planes to accommodate the blind mate. Successful mating of the connector assemblies 100, 200 is achieved when axial and angular alignment between the two assemblies is within a specified tolerances zone. The connector float in all axial and angular degrees of freedom ensures that the terminated cables of the connector assemblies 100, 200 can be successfully mated without sacrificing signal integrity. For example, the second connector assembly 200 is equipped with features that allow axial and rotational float such that the misalignment of the modules will not adversely affect the ability of the connector halves to mate, and subsequently, the terminated cables to align and transmit the quality RF signal. In an exemplary embodiment, all of the floating (for example, self aligning) features are integrated into the second connector assembly 200 to simplify the design and reduce manufacturing costs. For example, the first connector assembly 100 may be made with a simple, low cost design, which reduces the cost of the overall system.

In an exemplary embodiment, the first connector assembly 100 includes an electrical connector 110 having a mating end 112 configured to be mated with the second connector assembly 200 and a cable end 114 opposite the mating end 112. A cable 120 extends from the cable end 114.

The electrical connector 110 includes a housing 130 and a terminal position assurance (TPA) device 150 coupled to the housing 130. The TPA device 150 and the housing 130 are shaped differently for the one position application as opposed to the four position application (FIGS. 1-2). Additionally, the TPA device 150 and the housing 130 may have different shapes for other variations, such as a two position application, etc. The housing 130 holds a contact 122 (shown in FIG. 27) provided at the end of the cable 120. The TPA device 150 is operated to assure proper positioning of the contact 122 in the housing 130. In an exemplary embodiment, the TPA device 150 is movable relative to the housing 130 between a preset position and a set position. The TPA device 150 is movable from the preset position to the set position after the contact 122 is loaded in the housing 130. In various embodiments, the TPA device 150 is unable to move to the set position if the contact 122 is improperly loaded into the housing 130 thus assuring proper positioning of the contact 122 in the housing 130. In an exemplary embodiment, the TPA device 150 is used to retain the contact 122 in the housing 130. For example, the TPA device 150 functions as a secondary securing means for the contact 122 in the housing 130.

In an exemplary embodiment, the TPA device 150 includes a receptacle 152 at the front end configured to receive the second connector assembly 200. For example, the front end of the second connector assembly 200 may be plugged into the receptacle 152. In an exemplary embodiment, the TPA device 150 includes a funnel 154 at the front end of the receptacle 152 to guide the second connector assembly 200 into the receptacle 152. The funnel 154 has a large catch area to receive the second connector assembly 200 and accommodate misalignment of the second connector assembly 200 during mating.

In an exemplary embodiment, the second connector assembly 200 includes an electrical connector 210 and a support bracket 300 used to support the electrical connector 210. In an exemplary embodiment, the electrical connector 210 is movable relative to the support bracket 300 to compensate for misalignment of the electrical connector 210 relative to the electrical connector 110 during mating. For example, the electrical connector 210 has a limited amount of floating movement relative to the support bracket 300 to compensate for positional and orientational offset of the electrical connector 210 relative to the electrical connector 110. In an exemplary embodiment, the electrical connector 210 has six mechanical degrees of freedom relative to the support bracket 300. For example, the electrical connector 210 has axial float in the X, Y, and Z directions as well as rotational float about a central pivot point in the yaw, pitch, and roll directions relative to the support bracket 300. In an exemplary embodiment, the support bracket 300 allows a limited amount of floating axial movement of the electrical connector 210 in an X direction; the support bracket 300 allows a limited amount of floating axial movement of the electrical connector 210 in a Y direction; the support bracket 300 allows a limited amount of floating axial movement of the electrical connector 210 in a Z direction; the support bracket 300 allows a limited amount of floating rotational movement of the electrical connector 210 in a yaw direction; the support bracket 300 allows a limited amount of floating rotational movement of the electrical connector 210 in a pitch direction; and the support bracket 300 allows a limited amount of floating rotational movement of the electrical connector 210 in a roll direction.

The electrical connector 210 has a mating end 212 configured to be mated with the second connector assembly 200 and a cable end 214 opposite the mating end 212. A cable 220 extends from the cable end 214.

The electrical connector 210 includes a housing 230 and a terminal position assurance (TPA) device 250 coupled to the housing 230. The housing 230 holds a single contact 222 provided at the end of the cable 220. The TPA device 250 is operated to assure proper positioning of the contact 222 in the housing 230. In an exemplary embodiment, the TPA device 250 is movable relative to the housing 230 between a preset position and a set position. The TPA device 250 is movable from the preset position to the set position after the contact 222 is loaded in the housing 230. In various embodiments, the TPA device 250 is unable to move to the set position if the contact 222 is improperly loaded into the housing 230 thus assuring proper positioning of the contacts 222 in the housing 230. In an exemplary embodiment, the TPA device 250 is used to retain the contact 222 in the housing 230. For example, the TPA device 250 functions as a secondary securing means for the contact 222 in the housing 230.

In an exemplary embodiment, the TPA device 250 includes a plug end 252 at the front configured to be plugged into the receptacle 152 of the first connector assembly 100. In an exemplary embodiment, the TPA device 250 includes guide surfaces at the plug end 252 to guide the second connector assembly 200 into the receptacle 152. The guide surfaces are tapered inward toward the tip or nose to provide a large catch area to plug into the receptacle 152 and accommodate misalignment of the second connector assembly 200 during mating.

Figure 27:
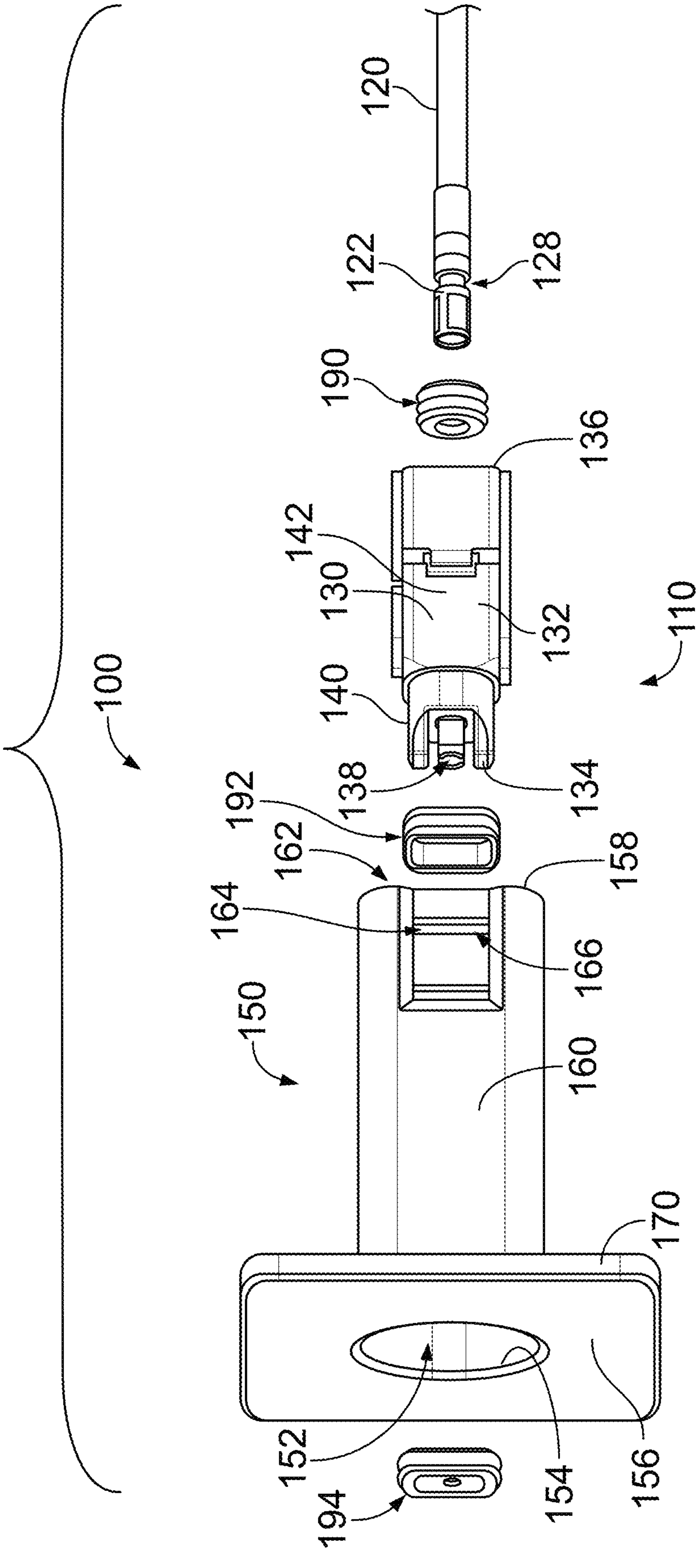
FIG. 27 is an exploded view of the first connector assembly in accordance with an exemplary embodiment.

FIG. 27 is an exploded view of the first connector assembly 100 in accordance with an exemplary embodiment. The first connector assembly 100 includes the electrical connector 110 having the cable 120 and the contact 122. The first connector assembly 100 includes the housing 130 used to hold the contact 122 and the cable 120 and the TPA device 150 used to assure proper positioning of the contact 122 in the housing 130.

The housing 130 includes a body 132 extending between a front 134 and a rear 136. The housing 130 includes a contact channel 138 passing through the body 132. The contact channel 138 receive the contact 122. In an exemplary embodiment, the housing 130 includes retention latches 140 used as primary securing means for securing the contact 122 in the housing 130. Each retention latch 140 is configured to interface with the retention feature 128 of the corresponding contact 122 to hold the contact 122 in the housing 130. In an exemplary embodiment, the housing 130 includes a housing latch 142 at an exterior of the housing 130. The housing latch 142 is used to secure the housing 130 to the TPA device 150.

The TPA device 150 extends between a front 156 and a rear 158. In an exemplary embodiment, the TPA device 150 includes a shroud 160 surrounding a cavity 162. The cavity 162 receives the housing 130. In an exemplary embodiment, the cavity 162 is open at the rear 158 to receive the housing 130. The shroud 160 includes one or more latching features 164 for latchably coupling the TPA device 150 to the housing 130. In the illustrated embodiment, the latching feature 164 includes openings 166 along the shroud 160 longitudinally offset from each other to receive the housing latch 142 of the housing 130 at different positions. For example, the housing latch 142 is initially received in the rearward opening 166 to position the TPA device 150 at an initial or pre-set position. The housing latch 142 is received in the forward opening 166 to position the TPA device 150 at a normal or set position. The TPA device 150 may be moved to the set position after the contact 122 is loaded in the housing 130 to block or hold the retention latches 140 in the set position.

In an exemplary embodiment, the TPA device 150 includes a flange 170 at the front 156. Optionally, the flange 170 may be mounted to a component of the vehicle. The flange 170 provides a holding or pressing surface for mating the first connector assembly 100 with the second connector assembly 200. The flange 170 surrounds the funnel 154 of the receptacle 152. The funnel 154 is open at the front 156 to receive the second connector assembly 200.

In an exemplary embodiment, the first connector assembly 100 includes a cable seal 190 configured to be sealed between the housing 130 and the cable 120. The cable seal 190 may be received in the contact channel 138 to engage and seal against the housing 130. In an exemplary embodiment, the first connector assembly 100 includes a housing seal 192 configured to be sealed between the housing 130 and the TPA device 150. The housing seal 192 may be received in the cavity 162 to engage and seal against the TPA device 150. In an exemplary embodiment, the first connector assembly 100 includes an interface seal 194 configured to seal the interface between the first and second connector assemblies 100, 200. The interface seal 194 may be received in the receptacle 152 to engage and seal against the second connector assembly 200 when the second connector assembly 200 is plugged into the receptacle 152.

Figure 28:
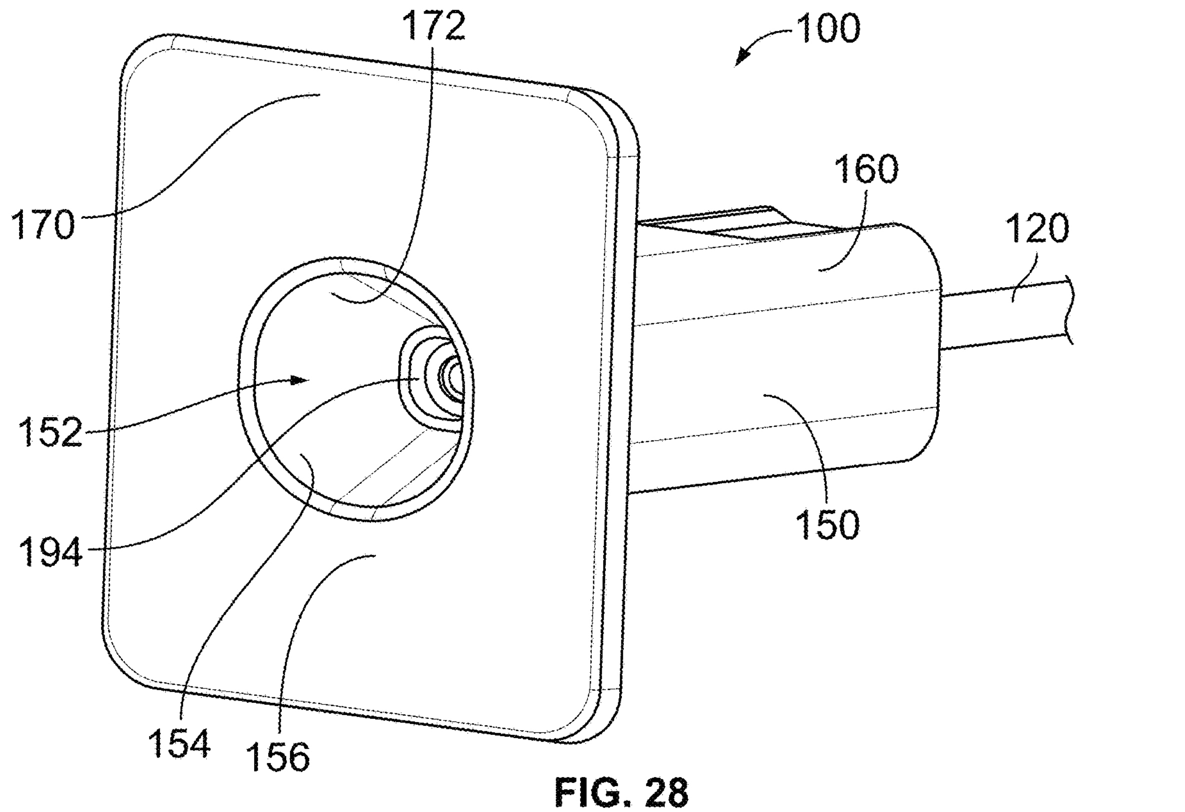
FIG. 28 is a front perspective view of the first connector assembly in accordance with an exemplary embodiment.
Figure 29:
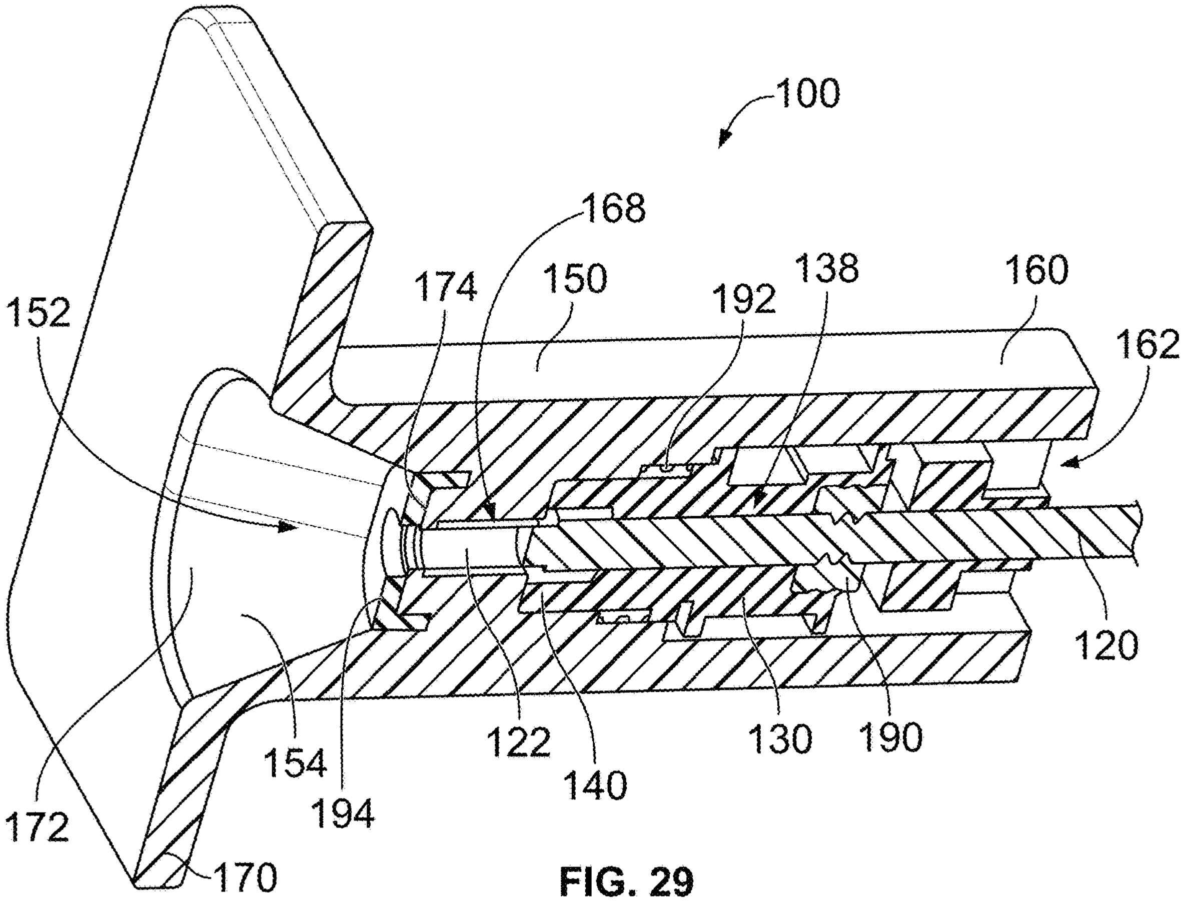
FIG. 29 is a sectional view of the first connector assembly in accordance with an exemplary embodiment.

FIG. 28 is a front perspective view of the first connector assembly 100 in accordance with an exemplary embodiment. FIG. 29 is a sectional view of the first connector assembly 100 in accordance with an exemplary embodiment. When assembled, the housing 130 is received in the cavity 162 of the TPA device 150. The shroud 160 surrounds the housing 130. The housing 130 positions the contact 122 for mating with the second connector assembly 200. When assembled, the contact 122 and the cable 120 are received in the contact channel 138. The retention latches 140 secure the contact 122 in the housing 130. In an exemplary embodiment, the mating end of the contact 122 extends forward of the housing 130 into a contact channel 168 of the TPA device 150.

In an exemplary embodiment, the receptacle 152 is open at the front 156 of the TPA device 150 to receive the second connector assembly 200. The funnel 154 is used to guide the second connector assembly 200 into the receptacle 152. In an exemplary embodiment, the funnel 154 is tapered inward. The funnel 154 includes lead-in surfaces 172 that extend from the flange 170 to a base wall 174 at the bottom or rear of the receptacle 152. The contact channels 168 are open through the base wall 174. The base wall 174 defines a stop wall to stop loading of the second connector assembly 200 into the receptacle 152. The base wall 174 is used to position the second connector assembly 200 for mating with the contacts 122. The lead in surfaces 172 guide the second connector assembly 200 to the base wall 174. In an exemplary embodiment, the lead in surfaces 172 provide lead-in at the top, the bottom, and both sides of the funnel 154 to accommodate misalignment of the second connector assembly 200 from any direction into the receptacle 152. In an exemplary embodiment, the second connector assembly 200 has a complementary shape as the funnel 154 to ultimately align (for example, axial and angular alignment) the second connector assembly 200 with the first connector assembly 100 within the receptacle 152.

The cable seal 190 is shown in the contact channel 138 to engage and seal against the cable 120 and the housing 130. The housing seal 192 is shown in the cavity 162 to engage and seal against the housing 130 and the TPA device 150. The interface seal 194 is shown in the receptacle 152 sealed to the TPA device 150 and configured to engage and seal against the second connector assembly 200 when the second connector assembly 200 is plugged into the receptacle 152.

Figure 30:
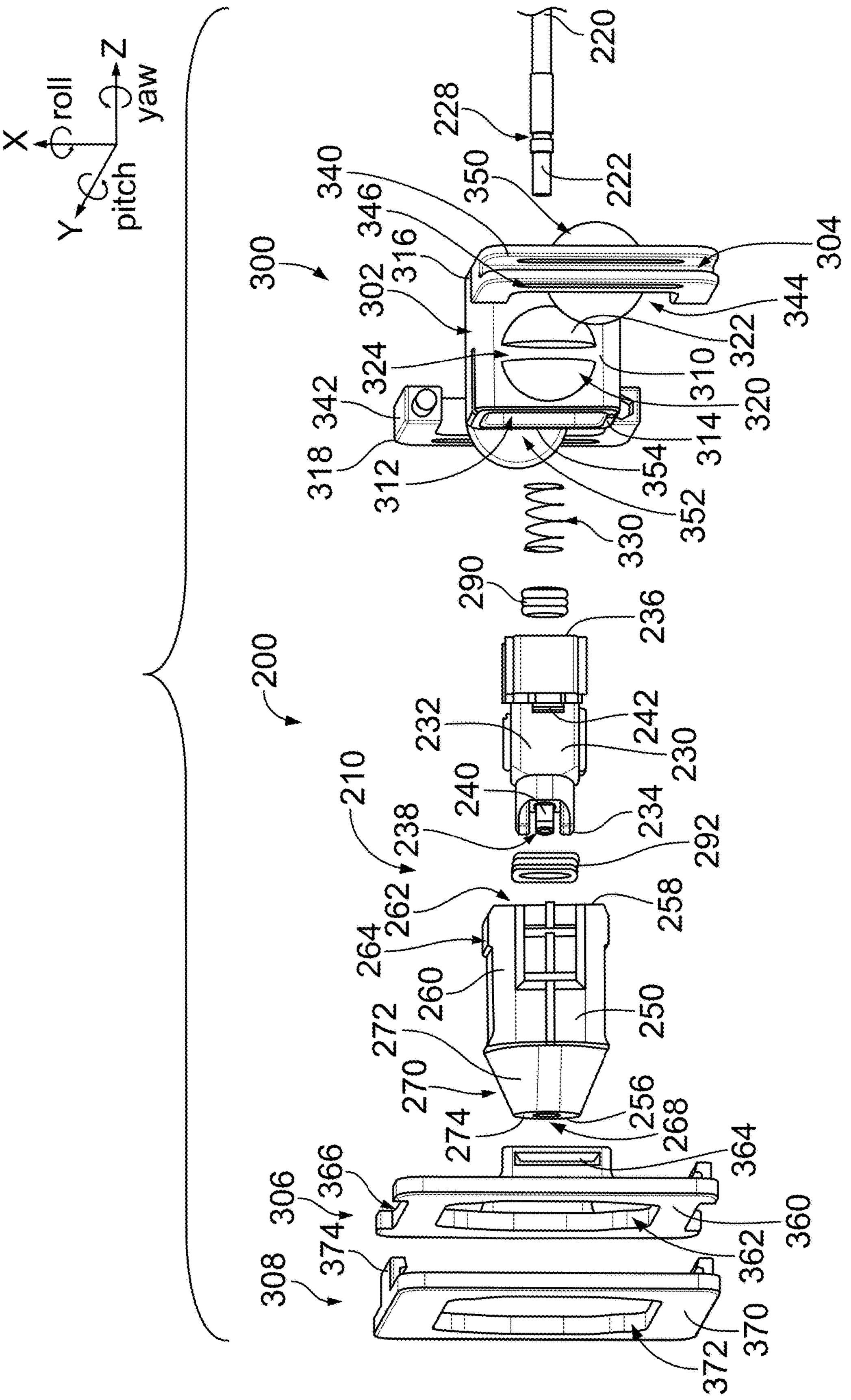
FIG. 30 is an exploded view of the second connector assembly in accordance with an exemplary embodiment.

FIG. 30 is an exploded view of the second connector assembly 200 in accordance with an exemplary embodiment. The second connector assembly 200 includes the electrical connector 210 having the cable 220 and the contact 222 terminated to the end of the cable 220. The second connector assembly 200 includes the housing 230 used to hold the contact 222 and the cable 220 and the TPA device 250 used to assure proper positioning of the contact 222 in the housing 230.

The housing 230 includes a body 232 extending between a front 234 and a rear 236. The housing 230 includes a contact channel 238 passing through the body 232 to receive the contact 222. In an exemplary embodiment, the housing 230 includes contact retention latches 240 used as primary securing means for securing the contact 222 in the housing 230. Each contact retention latch 240 is configured to interface with the retention feature 228 of the contact 222 to hold the contact 222 in the housing 230. In an exemplary embodiment, the housing 230 includes a housing latch 242 used to secure the housing 230 to the support bracket 300 and/or the TPA device 250.

The TPA device 250 extends between a front 256 and a rear 258. In an exemplary embodiment, the TPA device 250 includes a shroud 260 surrounding a cavity 262 that receives the housing 230. In an exemplary embodiment, the cavity 262 is open at the rear 258 to receive the housing 230. The shroud 260 includes one or more latching features 264 for latchably coupling the TPA device 250 to the support bracket 300. In an exemplary embodiment, the latching features 264 are configured to be coupled to the support bracket 300 at different positions, such as to allow positioning of the TPA device 250 at an initial or pre-set position and at a normal or set position. The TPA device 250 may be moved axially, such as parallel to the mating axis, between the preset position and the set position. In an exemplary embodiment, the TPA device 250 is used to block or hold the contact retention latches 240 in the set position to prevent deflection of the contact retention latches 240 when the TPA device 250 is in the set position.

In an exemplary embodiment, the TPA device 250 includes a nose cone 270 at the front 256. In an exemplary embodiment, the nose cone 270 is tapered inward. The nose cone 270 includes guide surfaces 272 that extend from an end wall 274 at the front 256 of the TPA device 250 to the shroud 260. The contact channel 268 is open through the end wall 274. The end wall 274 defines a stop wall to stop loading of the second connector assembly 200 into the receptacle 152 of the first connector assembly 100. In an exemplary embodiment, the guide surfaces 272 provide lead-in at the top, the bottom, and both sides of the nose cone 270 to accommodate misalignment of the second connector assembly 200 from any direction into the first connector assembly 100. In an exemplary embodiment, the nose cone 270 of the second connector assembly 200 has a complementary shape as the funnel 154 of the first connector assembly 100 to align (for example, axial and angular alignment) the second connector assembly 200 with the first connector assembly 100 within the receptacle 152.

The support bracket 300 is used to support the electrical connector 210. In an exemplary embodiment, the electrical connector 210 has six mechanical degrees of freedom relative to the support bracket 300. For example, the electrical connector 210 has axial float in the X, Y, and Z directions as well as rotational float about a central pivot point in the yaw, pitch, and roll directions relative to the support bracket 300. In an exemplary embodiment, the support bracket 300 allows a limited amount of floating axial movement of the electrical connector 210 in an X direction; the support bracket 300 allows a limited amount of floating axial movement of the electrical connector 210 in a Y direction; the support bracket 300 allows a limited amount of floating axial movement of the electrical connector 210 in a Z direction; the support bracket 300 allows a limited amount of floating rotational movement of the electrical connector 210 in a yaw direction; the support bracket 300 allows a limited amount of floating rotational movement of the electrical connector 210 in a pitch direction; and the support bracket 300 allows a limited amount of floating rotational movement of the electrical connector 210 in a roll direction.

In an exemplary embodiment, the support bracket 300 includes a connector mount 302, a pivot frame 304, an X carriage 306, and a Y carriage 308. The connector mount 302 holds the electrical connector 210, such as the housing 230 of the electrical connector 210. The pivot frame 304 holds the connector mount 302. The X carriage 306 holds the pivot frame 304. The Y carriage 308 holds the X carriage 306. Other arrangements are possible in alternative embodiments, such as the Y carriage 308 holding the pivot frame 304 and/or the X carriage 306 holding the Y carriage 308. In an exemplary embodiment, the housing 230 of the electrical connector 210 is axially movable relative to the connector mount 302 in a Z direction parallel to the mating axis. The pivot frame 304 is axially movable relative to the X carriage 306 in an X direction. The X carriage 306 is axially movable relative to the Y carriage in a Y direction. The interaction between the housing 230, the connector mount 302, the pivot frame 304, the X carriage 306, and the Y carriage 308 compensate for misalignment of the second connector assembly 200 with the first connector assembly 100 due to positional and physical variations to accommodate X, Y, and Z mating tolerances. In an exemplary embodiment, the connector mount 302 is rotatably movable relative to the pivot frame 304 in a yaw direction, a pitch direction, and a roll direction to compensate for angular tolerances in the X-Y, Y-Z, and Y-Z planes.

The connector mount 302 includes a shell 310 having a cavity 312 configured to receive the housing 230. The shell 310 extends between a front 314 and a rear 316. The cavity 312 may be open at the front 314 to receive the housing 230. In an exemplary embodiment, the shell 310 includes a retention latch 318 used to secure the TPA device 250 to the shell 310. Optionally, the shell 310 may include multiple retention latches 318 that are axially offset from each other to allow positioning of the TPA device 250 at different positions such as a preset position and a set position.

In an exemplary embodiment, the connector mount 302 includes a pivot element 320 configured to be pivotably coupled to the pivot frame 304. In the illustrated embodiment, the pivot element 320 includes a semispherical protrusion 322 at the exterior of the shell 310. Optionally, the connector mount 302 may include a pair of the pivot elements 320 on opposite sides of the shell 310. The pivot element 320 is sized and shaped to allow rotation of the connector mount 302 relative to the pivot frame 304. In an exemplary embodiment, the pivot element 320 includes a control slot 324 in the semispherical protrusion 322. The control slot 324 is used to control an amount of angular rotation of the connector mount 302 relative to the pivot frame 304. For example, the control slot 324 may have an hourglass shape to allow rotation of the pivot element 320 within the pivot joint of the pivot frame 304. The control slot 324 may have other shapes in alternative embodiments.

In an exemplary embodiment, one or more biasing elements 330 are configured to be positioned between the connector mount 302 and the housing 230. The biasing element 330 may be received in the cavity 312. The biasing element 330 is compressible to exert a spring force on the connector mount 302 and/or the housing 230. For example, the biasing element 330 is configured to forward bias the housing 230 relative to the shell 310 of the connector mount 302. The biasing element 330 holds the housing 230 in a forward biased position for mating with the first connector assembly 100. The biasing element 330 may be compressed by the housing 230 during mating with the first connector assembly 100. The biasing element 330 allows movement of the housing 230 relative to the connector mount 302 of the support bracket 300 in the Z direction, which is parallel to the mating axis.

In an exemplary embodiment, the pivot frame 304 is a multipiece frame having a first frame member 340 and a second frame member 342 configured to be mated together to form the pivot frame 304. The frame members 340, 342 extend along opposite sides of the connector mount 302. The pivot frame 304 includes an opening 344 between the frame members 340, 342. Optionally, the frame members 340, 342 may be identical or mirrored halves of each other.

In an exemplary embodiment, the pivot frame 304 includes slots 346 in the frame members 340, 342. The slots 346 are configured to receive mounting portions of the X carriage 306 that are used to mount the X carriage 306 to the pivot frame 304. Other types of mounting features may be used in alternative embodiments. In an exemplary embodiment, the slots 346 are elongated to allow axial movement of the X carriage 306 relative to the pivot frame 304.

The pivot frame 304 includes pivot elements 350 that receive the pivot elements 320 of the connector mount 302. The pivot elements 350 are provided on opposite sides of the opening 344. For example, each of the frame members 340, 342 includes a corresponding pivot element 350. In an exemplary embodiment, each pivot element 350 is a semispherical socket 352 configured to receive the corresponding semispherical protrusion 322 of the connector mount 302. The semispherical protrusion 322 is rotatable within the semispherical socket 352 to allow rotation of movement of the connector mount 302 and thus the electrical connector 210 relative to the pivot frame 304. In an exemplary embodiment, the pivot element 350 includes a control rib 354 extending into the semispherical socket 352. The control rib 354 is configured to be received in the corresponding control socket 324 of the semispherical protrusion 322. The control rib 354 is able to move in the control slot 324 as the connector mount 302 pivot or rotates relative to the pivot frame 304. The interaction between the control rib 354 and the semispherical protrusion 322 controls the amount of floating movement of the connector mount 302 relative to the pivot frame 304. For example, the control rib 354 is configured to bottom out or abut against the semispherical protrusion 322 to limit or control the amount of angular movement of the connector mount 302 relative to the pivot frame 304. In an exemplary embodiment, the pivot element 320 is able to rotate relative to the pivot element 350 in multiple directions, such as a yaw direction, a pitch direction, and a role direction.

In an exemplary embodiment, the X carriage 306 is configured to be coupled to the pivot frame 304. However, in alternative embodiments, the Y carriage 308 may be coupled to the pivot frame 304. The X carriage 306 includes a panel 360 having an opening 362 configured to receive the electrical connector 210. The opening 362 may be centered in the panel 360. The opening 362 may be oversized relative to the electrical connector 210 to allow movement of the electrical connector 210 relative to the X carriage 306, such as rotation and/or translation of the electrical connector 210 relative to the X carriage 306 in the opening 362.

In an exemplary embodiment, the X carriage 306 includes flanges 364 extending from the panel 360, such as the rear of the panel 360. The flanges 364 configured to be coupled to the pivot frame 304. For example, the flanges 364 are received in the slots 346 in the pivot frame 304. The flanges 364 may be clipped or latched to the pivot frame 304 to retain the pivot frame 304 on the panel 360. In an exemplary embodiment, the slots 346 are oversized relative to the flanges 364 to allow axial movement of the flanges 364 in the slots 346, such as in the X direction. As such, the pivot frame 304 is configured to move relative to the X carriage 306 in the X direction.

In an exemplary embodiment, the X carriage 306 includes slots 366 in the panel 360. The slots 366 are configured to receive mounting portions of the Y carriage 308 that are used to mount the Y carriage 308 to the X carriage 306. Other types of mounting features may be used in alternative embodiments. In an exemplary embodiment, the slots 366 are elongated to allow axial movement of the Y carriage 308 relative to the X carriage 306. In an exemplary embodiment, the slots 366 are oriented in a direction perpendicular to the slots 346.

In an exemplary embodiment, the Y carriage 308 is configured to be coupled to the X-carriage 306. However, in alternative embodiments, the Y carriage 308 may be coupled to the pivot frame 304. The Y carriage 308 includes a panel 370 having an opening 372 configured to receive the electrical connector 210. The opening 372 may be centered in the panel 370. The opening 372 may be oversized relative to the electrical connector 210 to allow movement of the electrical connector 210 relative to the Y carriage 308, such as rotation and/or translation of the electrical connector 210 relative to the Y carriage 308 in the opening 372.

In an exemplary embodiment, the Y carriage 308 includes flanges 374 extending from the panel 370, such as the rear of the panel 370. The flanges 374 configured to be coupled to the X carriage 306. For example, the flanges 374 are received in the slots 366 in the X carriage 306. The flanges 374 may be clipped or latched to the X carriage 306 to retain the X carriage 306 on the panel 370. In an exemplary embodiment, the slots 366 are oversized relative to the flanges 374 to allow axial movement of the flanges 374 in the slots 366, such as in the Y direction. As such, the Y carriage 308 is configured to move relative to the X carriage 306 in the Y direction.

In an exemplary embodiment, the second connector assembly 200 includes a cable seal 290 configured to be sealed between the housing 230 and the cable 220. The cable seal 290 may be received in the contact channel 238 to engage and seal against the housing 230. In an exemplary embodiment, the second connector assembly 200 includes a housing seal 292 configured to be sealed between the housing 230 and the TPA device 250. The housing seal 292 may be received in the cavity 262 to engage and seal against the TPA device 250.

Figure 31:
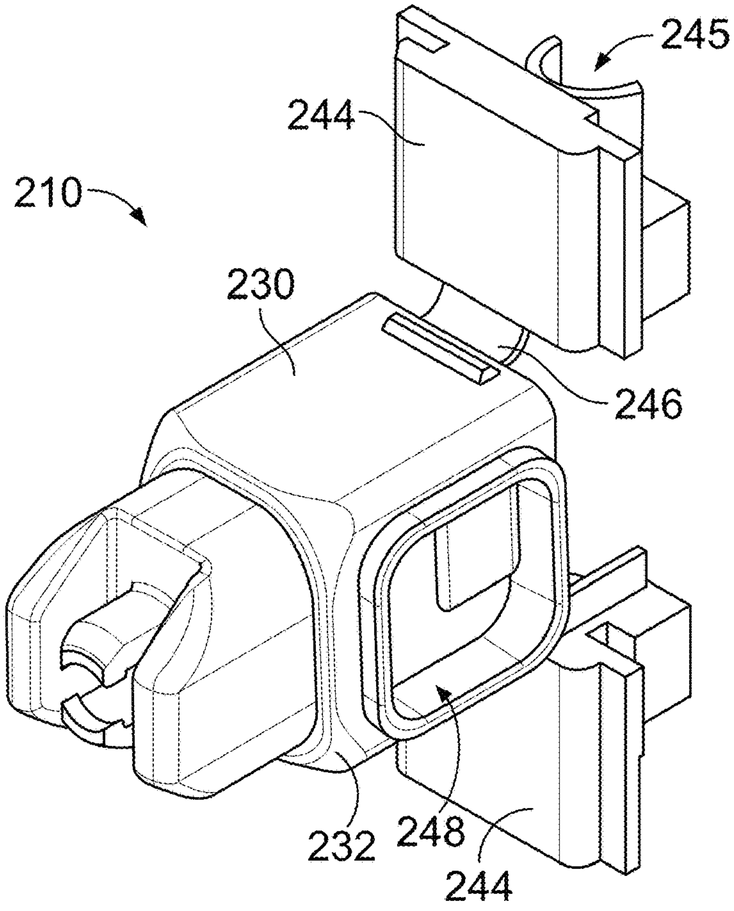
FIG. 31 is a front perspective view of the housing in accordance with an exemplary embodiment showing the housing in an open position.
Figure 32:
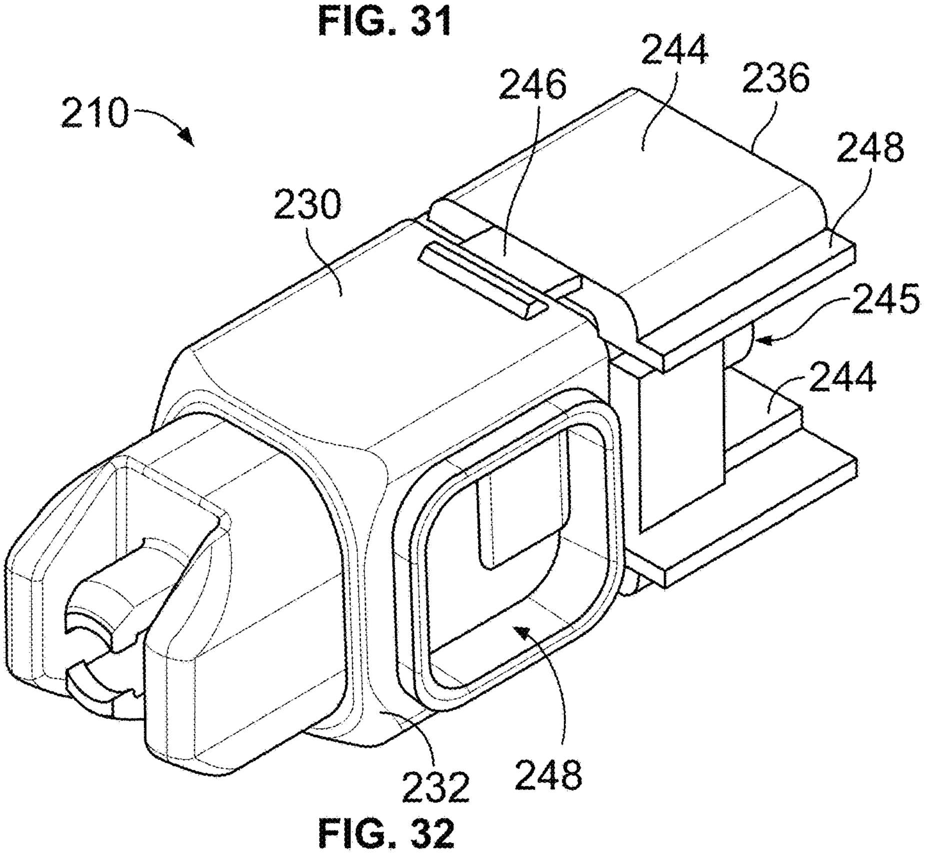
FIG. 32 is a front perspective view of the housing in accordance with an exemplary embodiment showing the housing in a closed position.
Figure 33:
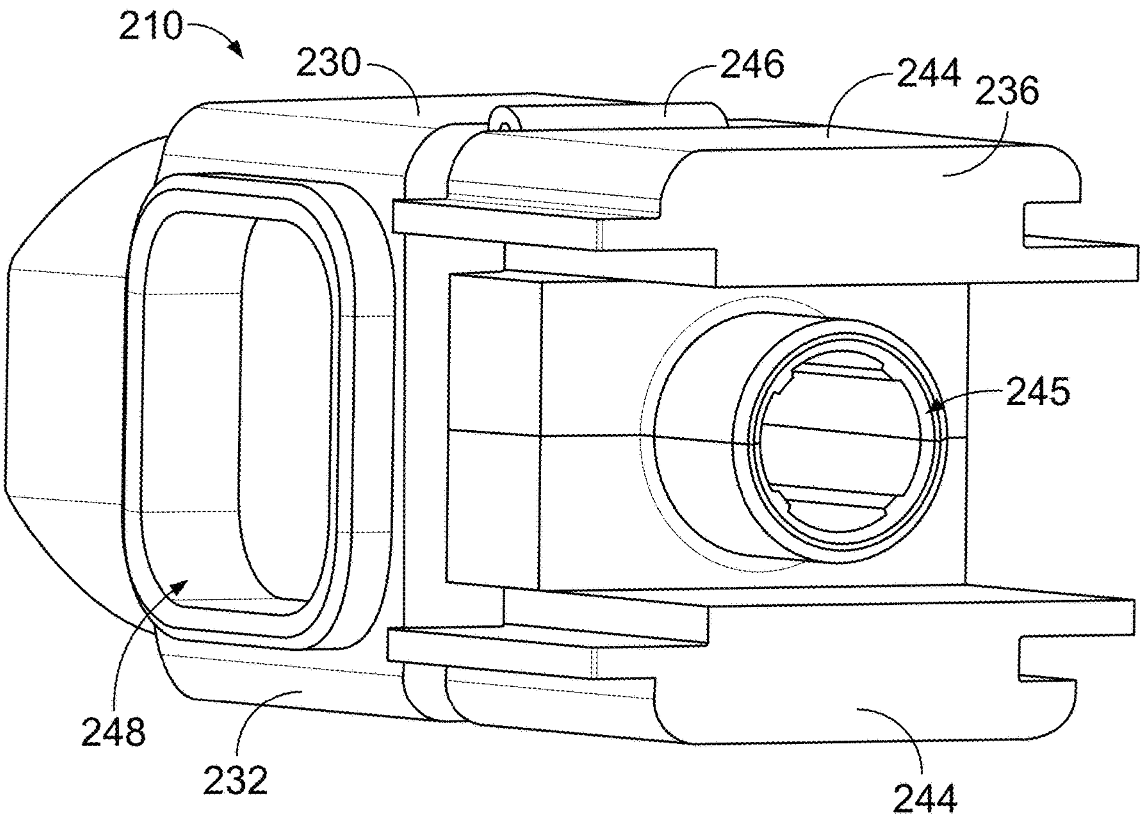
FIG. 33 is a rear perspective view of the housing in accordance with an exemplary embodiment showing the housing in the closed position.

FIG. 31 is a front perspective view of the housing 230 in accordance with an exemplary embodiment showing the housing 230 in an open position to receive the cable seal 290. FIG. 32 is a front perspective view of the housing 230 in accordance with an exemplary embodiment showing the housing 230 in a closed position. FIG. 33 is a rear perspective view of the housing 230 in accordance with an exemplary embodiment showing the housing 230 in the closed position.

In an exemplary embodiment, the housing 230 includes one or more clamping doors 244 at the rear 236. The clamping door(s) 244 are configured to be opened and closed. The clamping door(s) 244 are movable between open positions and closed positions. The clamping door(s) 244 are open to receive the cable seal 290, the contact 222 and the cable 220. The clamping door(s) 244 are closed to clamp onto the cable 220 and hold the cable 220 and the contact 222 in the housing 230. In various embodiments, the cable seal may be loaded into the housing 230 when the clamping doors 244 are fully opened. The contact 222 and the cable 220 may be loaded into the housing 230 when the clamping doors 244 are fully opened or partially opened. For example, prior to fully closing the clamping doors 244 a clearance gap is defined between the clamping doors 244 to receive the contact 222 and the cable 220. Once the contact 22 and the cable 220 are installed, the clamping doors 244 may be fully closed to hold the cable 220 in the housing 230. In various embodiments, the housing 230 may include a single clamping door at one side and a fixed cable support at the opposite side where the cable 220 is clamped between the fixed cable support and the clamping door 244. In alternative embodiments, the housing 230 includes a pair of clamping doors 244 arranged on opposite sides of the housing 230 that close together around the cable 220 to clamp the cable 220 in the housing 230. The clamping doors 244 can be splayed open for ease of assembly and then forced closed via a tapered wedge to "bite" into the cable 220 thereby providing additional retention and security for the cable 220.

In an exemplary embodiment, each of the clamping doors 244 include a cable channel 245 that receive the cable 220. The cable channel 245 may have a radius of curvature that matches the curvature of the cable 220. In an exemplary embodiment, the clamping doors 244 are connected to the main body 232 of the housing 230 by living hinges 246 that are formed integral with the body 232 and the clamping doors 244.

In an exemplary embodiment, the clamping doors 244 are configured to be pressed or clamped closed around the cable 220 by the TPA device 250. For example, when the housing 230 is loaded into the TPA device 250, the clamping doors 244 may be automatically closed when the clamping doors 244 engage the rear of the TPA device 250. Optionally, when the TPA device 250 is moved, for example, rearwardly, the TPA device 250 may slide along the clamping doors 244 to pinch or press the clamping doors 244 inward to clamp the clamping doors 244 to the cable 220.

In an exemplary embodiment, the housing 230 includes connecting elements 248 at the sides of the body 232 of the housing 230. The connecting elements 248 may include flanges, protrusions, tabs, grooves, openings, slots, or other type of connecting elements. In an exemplary embodiment, the connecting elements 248 are used for stacking the housing 230 with another identical housing to form a module or electrical connector 210 having multiple contacts 222 and cables 220. For example, the connecting element 248 at the left side of the housing may interface with a complementary connecting element at the right side of an adjacent housing, and vice versa.

Figure 34:
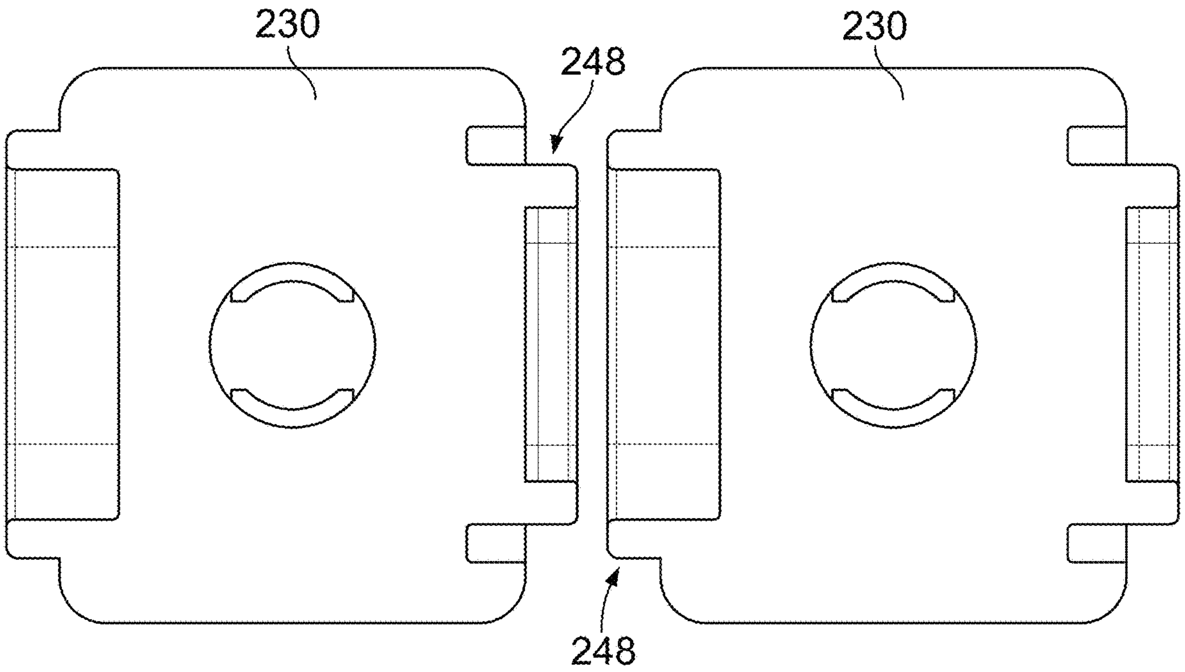
FIG. 34 is a sectional view of a pair of the housings poised for mating together to form a modular housing stack in accordance with an exemplary embodiment.

FIG. 34 is a sectional view of a pair of the housings 230 poised for mating together to form a modular housing stack. The connecting elements 248 of the adjacent housings 230 are configured to interface to stack the housings 230 in the stack. Any number of the housings 230 may be stacked together depending on the number of contacts 222 desired in the electrical connector. In various embodiments, the housings 230 may hold different types of contacts 222 to form a modular mating interface.

Figure 35:
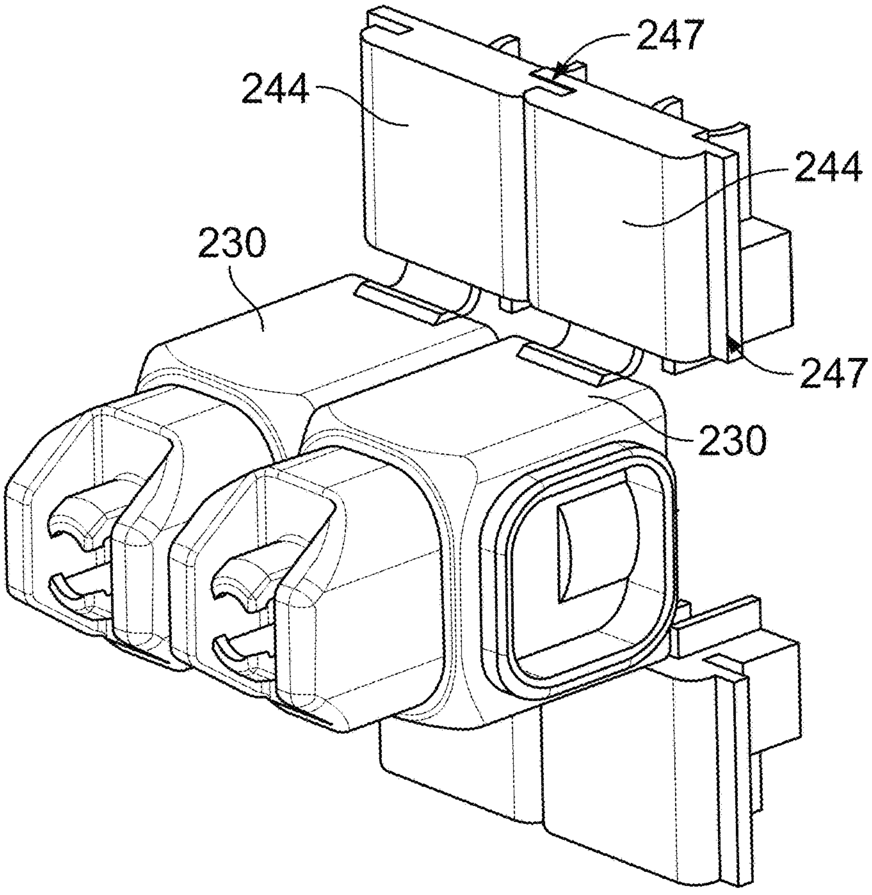
FIG. 35 is a front perspective view of a pair of the housings mated together showing the clamping doors in an open position in accordance with an exemplary embodiment.
Figure 36:
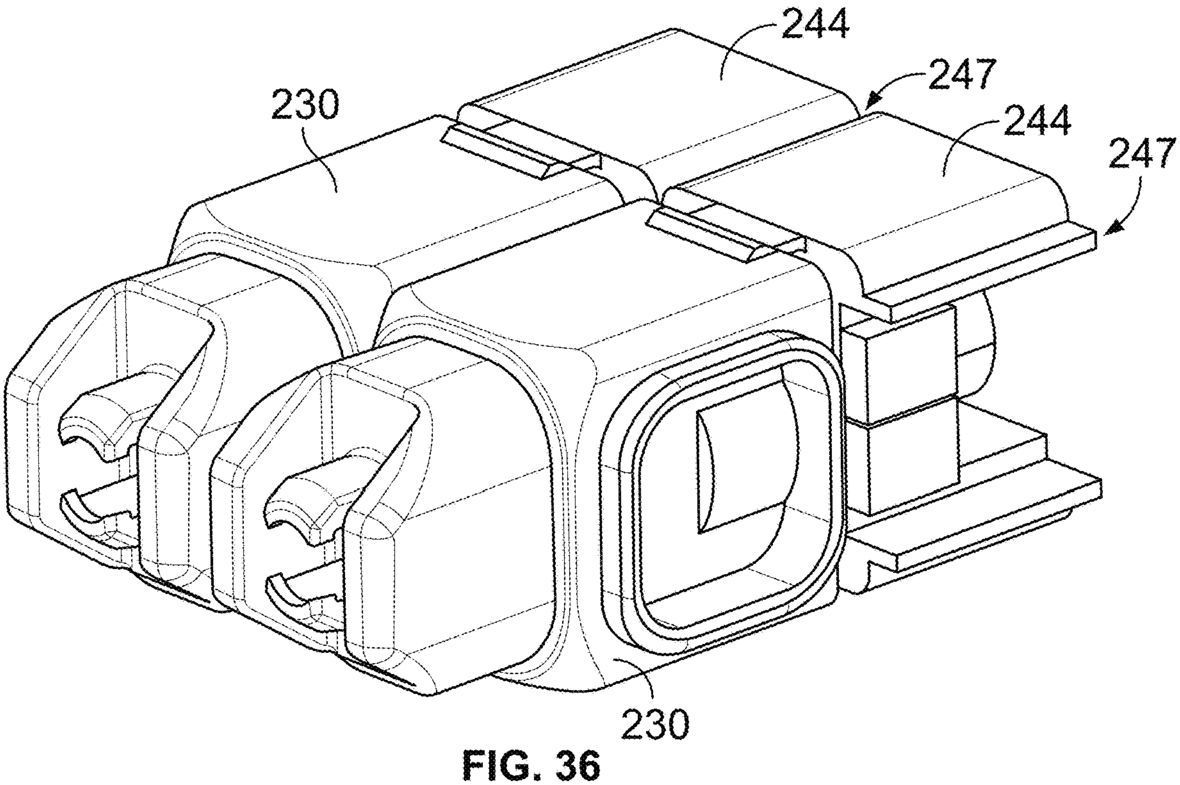
FIG. 36 is a front perspective view of a pair of the housings mated together showing the clamping doors in a closed position in accordance with an exemplary embodiment.

FIG. 35 is a front perspective view of a pair of the housings 230 mated together showing the clamping doors 244 in an open position. FIG. 36 is a front perspective view of a pair of the housings 230 mated together showing the clamping doors 244 in a closed position. In an exemplary embodiment, the clamping doors 244 include connecting features 247, such as tabs, flanges, slots, grooves, and the like, that interface with each other to allow opening and closing of the clamping doors 244 together as a group.

Figure 37:
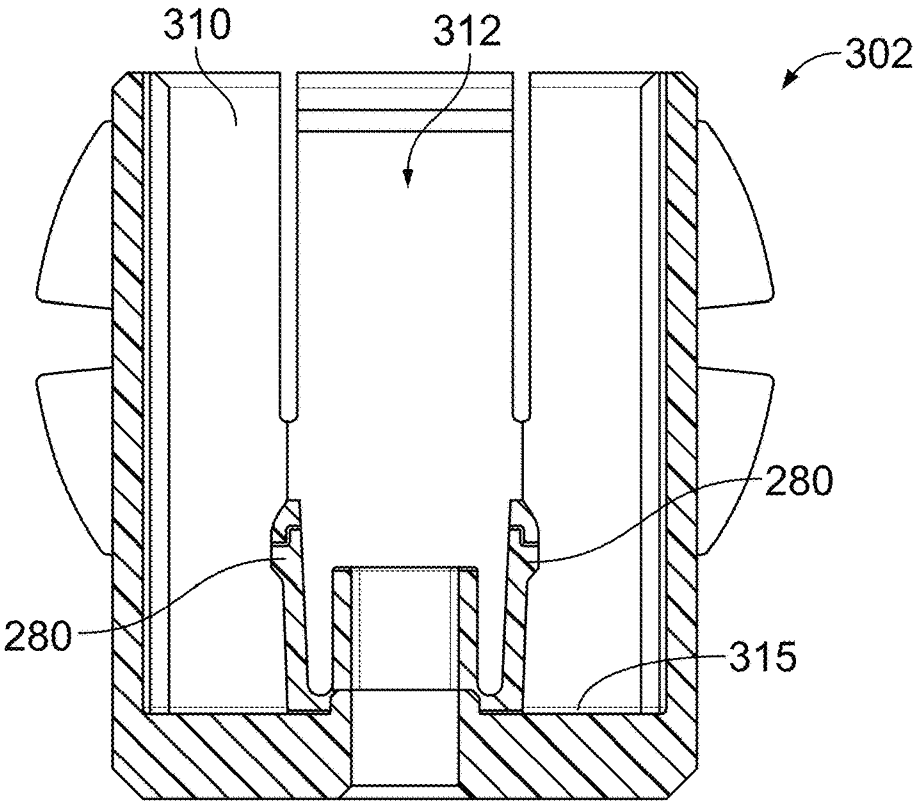
FIG. 37 is a sectional view of the connector mount in accordance with an exemplary embodiment.
Figure 38:
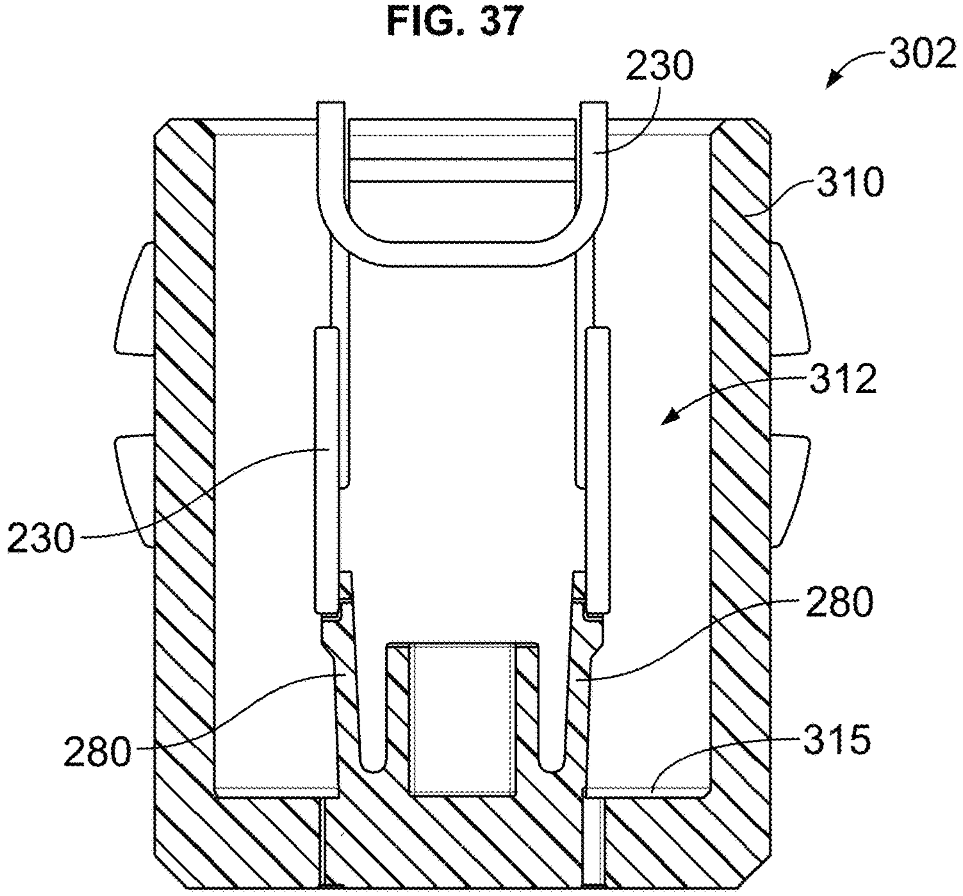
FIG. 38 is a sectional view of the connector mount showing a portion of the housing relative to the connector mount in accordance with an exemplary embodiment.
Figure 39:
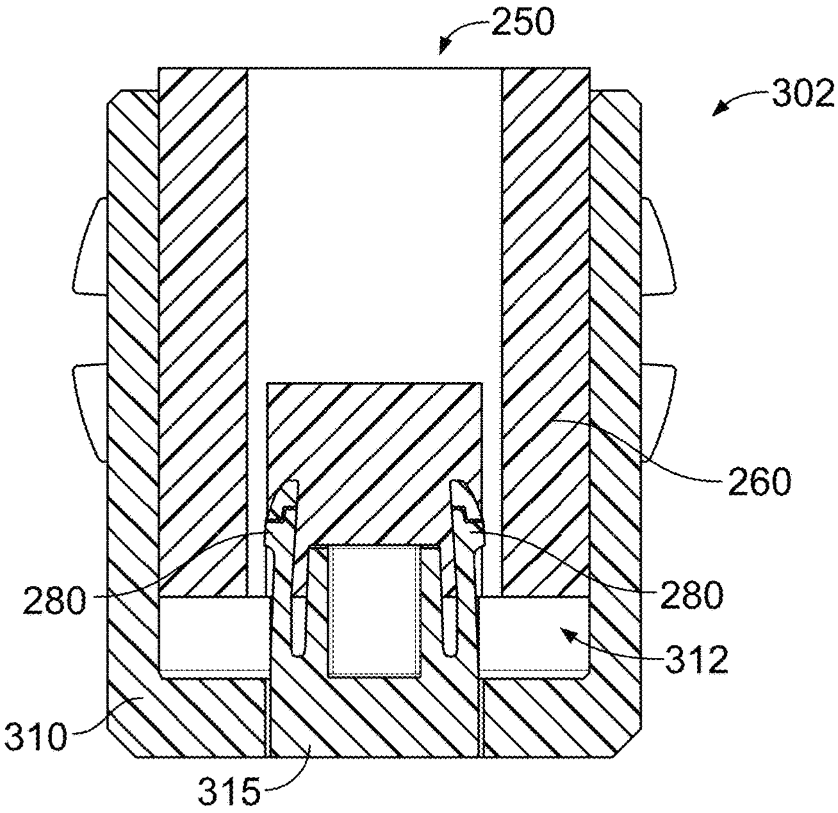
FIG. 39 is a sectional view of the connector mount showing a portion of the TPA device relative to the connector mount in accordance with an exemplary embodiment.

FIG. 37 is a sectional view of the connector mount 302 in accordance with an exemplary embodiment. FIG. 38 is a sectional view of the connector mount 302 showing a portion of the housing 230 relative to the connector mount 302. FIG. 39 is a sectional view of the connector mount 302 showing a portion of the TPA device 250 relative to the connector mount 302.

The connector mount 302 includes the shell 310 forming the cavity 312 that receives the housing 230 and the shroud 260 of the TPA device 250. The retention latch 318 is arranged along the side wall and extends into the cavity 312 to interface with the TPA device 250. In an exemplary embodiment, the connector mount 302 includes retention latches 280 that extend from the end wall 315 into the cavity 312. The retention latches 280 are used to position the housing 230 within the cavity 312. When the retention latches 280 engage the housing 230, the retention latches 280 hold the housing 230 at an extended or forward position. The retention latches 280 are configured to be released from the housing 230 to allow the housing 230 to move in the Z direction, such as rearwardly further into the cavity 312. In an exemplary embodiment, the retention latches 280 are movable between latched positions and unlatched positions. The retention latches 280 support the housing 230 in the extended position when in the latched positions. The housing 230 is able to move from the extended position to the released position when the retention latches 280 are in the unlatched positions. In an exemplary embodiment, the shroud 260 of the TPA device 250 is used to release the retention latches 280. For example, when the TPA device 250 is pressed rearwardly into the cavity 312, the rear end of the shroud 260 engages the retention latches 280 and presses the retention latches 280 inward to release the retention latches 280 from the housing 230.

Figure 40:
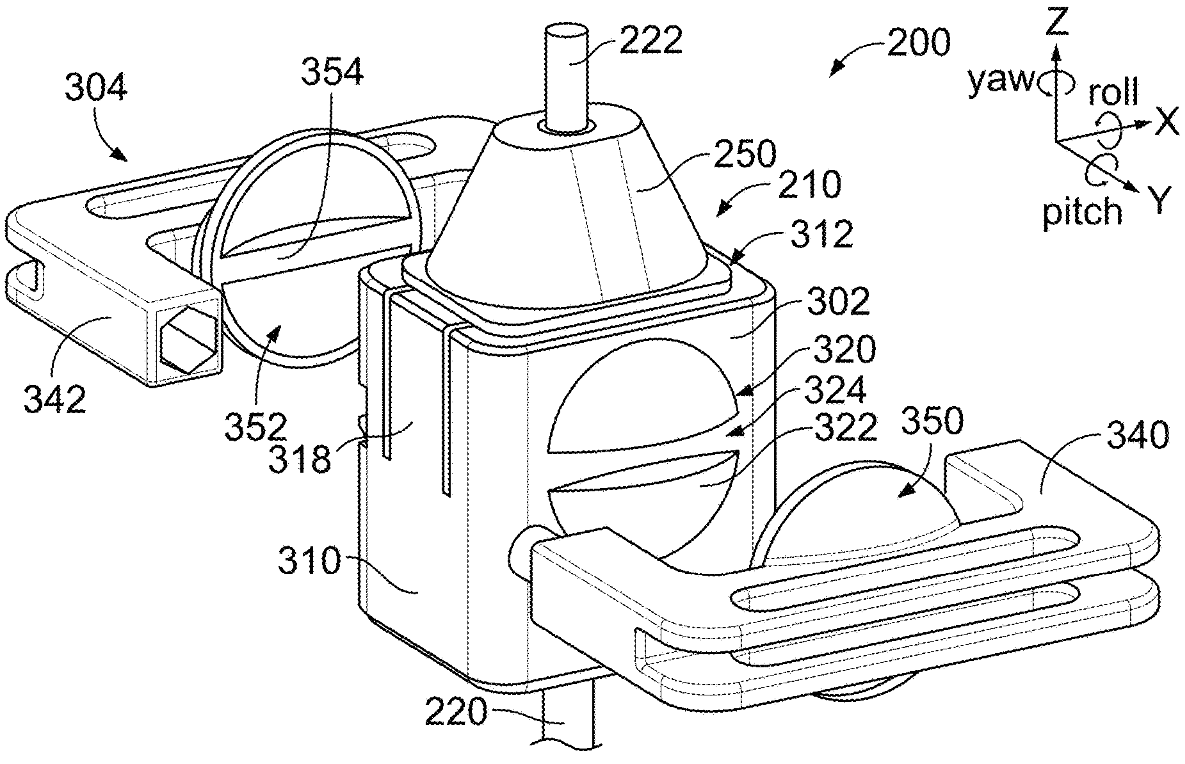
FIG. 40 is a partially assembled view of a portion of the second connector assembly showing the electrical connector coupled to the connector mount and showing the pivot frame poised for mounting to the connector mount in accordance with an exemplary embodiment.

FIG. 40 is a partially assembled view of a portion of the second connector assembly 200 showing the electrical connector 210 coupled to the connector mount 302 and showing the pivot frame 304 poised for mounting to the connector mount 302. During assembly, the housing 230 of the electrical connector 210 is received in the cavity 312 of the shell 310 of the connector mount 302.

In an exemplary embodiment, the TPA device 250 is configured to be coupled to the shell 310. For example, the latching features 264 are configured to be coupled to the retention latches 318 of the connector mount 302. The retention latches 318 hold the TPA device 250 at one or more predetermined positions. For example, multiple retention latches 318 may be provided at different axial positions to hold the TPA device 250 at different axial positions relative to the shell 310. The TPA device 250 may be initially held at a preset position where the TPA device 250 is only partially or initially coupled to the housing 230. The contact 222 and the cable 220 is configured to be loaded into the housing 230 when the TPA device 250 is in the preset position. For example, the TPA device 250 does not block the retention latches of the housing 230, which allows the contact 222 to be loaded into the housing 230 and engage the retention latches. After the contact 222 is loaded in the housing 230, the TPA device 250 may be moved to the set position by pressing the TPA device 250 rearward relative to the housing 230 and or the connector mount 302. In the set position, the latching features 264 engage the rearward retention latches 318 to hold the TPA device 250 in the set position.

During assembly, the pivot frame 304 is coupled to the connector mount 302. For example, the pivot elements 350 are aligned with the pivot elements 320. The frame members 340, 342 are coupled together around the connector mount 302. During assembly, the control ribs 354 are received in the control slots 324. The semispherical protrusions 322 are received in the semispherical sockets 352. When assembled, the connector mount 302, and thus the electrical connector 210, are rotatable relative to the pivot frame 304 in one or more rotating directions, such as all three angular degrees of freedom.

Figure 41:
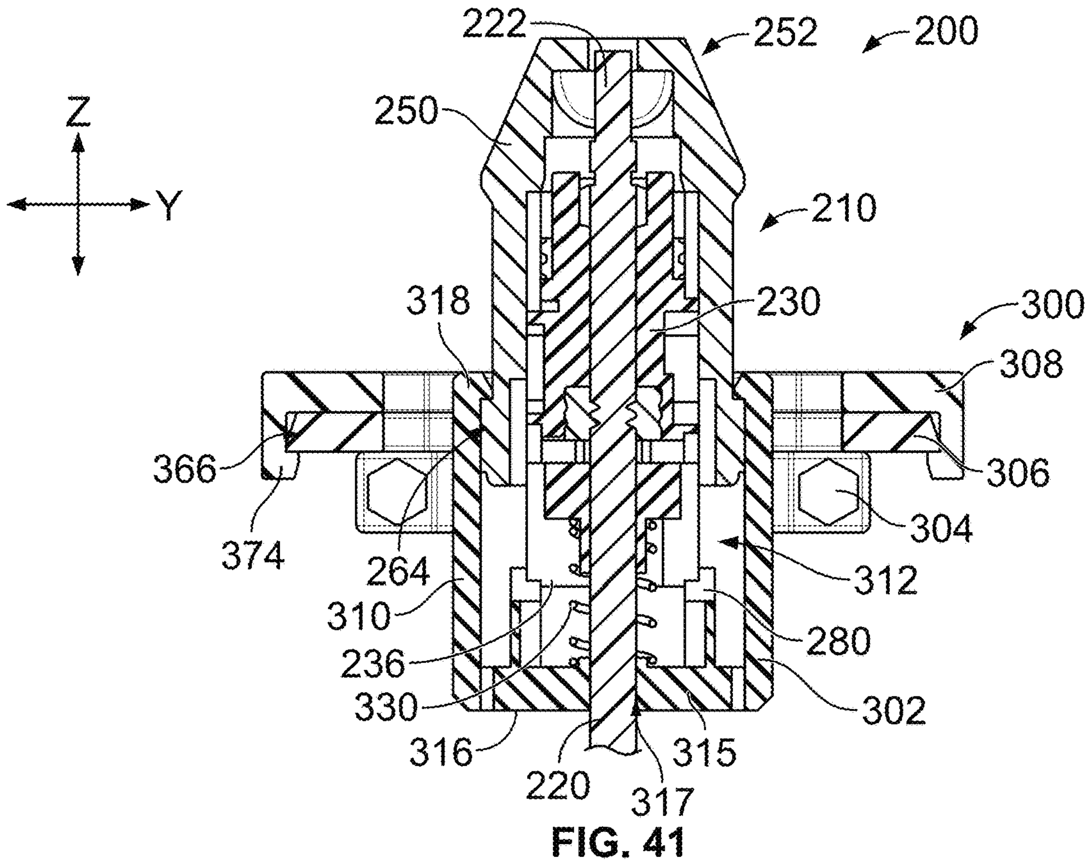
FIG. 41 is a cross-sectional view of the second connector assembly in accordance with an exemplary embodiment.
Figure 42:
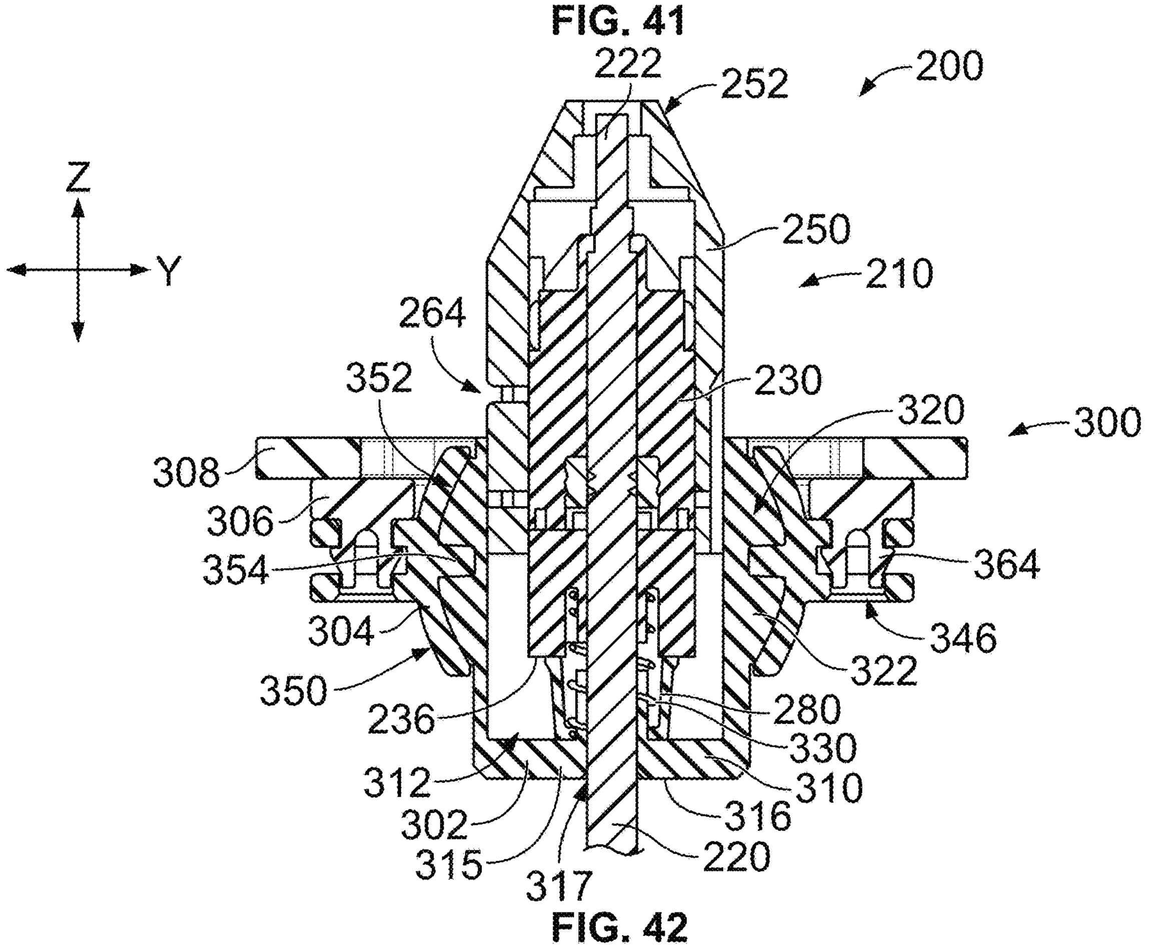
FIG. 42 is a cross-sectional view of the second connector assembly in accordance with an exemplary embodiment.

FIG. 41 is a cross-sectional view of the second connector assembly 200 in accordance with an exemplary embodiment. FIG. 42 is a cross-sectional view of the second connector assembly 200 in accordance with an exemplary embodiment. When assembled, the electrical connector 210 is coupled to the support bracket 300. The second connector assembly 200 is equipped with features that allow the electrical connector 210 to move with six mechanical degrees of freedom relative to the support bracket 300. For example, the electrical connector 210 has axial float in the X, Y, and Z directions as well as rotational float about a central pivot point in the yaw, pitch, and roll directions.

During assembly, the housing 230 of the electrical connector 210 is received in the cavity 312 of the shell 310 of the connector mount 302. The biasing element 330 is coupled between the housing 230 and the connector mount 302. For example, forward ends of the biasing elements 330 engage the rear 236 of the housing 230 and rearward ends of the biasing elements 330 engage an end wall 315 at the rear 316 of the shell 310. In an exemplary embodiment, the end wall 315 includes a cable channel 317 passing therethrough that receives the cable 220. Optionally, portions of the housing 230 may be received in the cable channels 317.

In an exemplary embodiment, the retention latches 280 are provided between the housing 230 and the shell 310 that hold the housing 230 in an extended position relative to the shell 310. In the illustrated embodiment, the extended position is a forward position. The housing 230 is unable to move rearward into the cavity 312 when the retention latches 280 are engaged. In the illustrated embodiment, the retention latches 280 are part of the shell 310 and are configured to engage or seat on the rear portion of the housing 230. However, in alternative embodiments, the retention latches 280 may be part of the housing 230. The retention latches 280 are releasable to allow the housing 230 to move into the cavity 312 in the Z direction, which is parallel to the mating direction. In an exemplary embodiment, the TPA device 250 includes release elements that are configured to interface with the retention latches 280 to release the retention latches 280 and allow the axial movement of the housing 230 relative to the connector mount 302. For example, when the TPA device 250 is moved rearward, the release elements engage the retention latches 280 and press the retention latches 280 inward to release the retention latches 280 from the support wall of the shell 310. When the TPA device 250 is in the rearward position, the release elements engage and hold the retention latches 280 in released positions. In an exemplary embodiment, when the electrical connector 210 is mated with the first connector assembly 100, the electrical connector 210 may be pushed rearward and the housing 230 may be moved rearward in the cavity 312 against the spring bias of the biasing elements 330. The biasing elements 330 forward bias the housing 230 and the contacts 222 to maintain a reliable electrical connection with the first connector assembly 100.

In an exemplary embodiment, the TPA device 250 is coupled to the shell 310. For example, the latching features 264 are coupled to the retention latches 318 of the connector mount 302. The TPA device 250 may be initially held at a preset position (FIGS. 41 and 42) where the TPA device 250 is only partially or initially coupled to the housing 230. The TPA device 250 may be moved rearward to a set position by pressing the TPA device 250 rearward relative to the housing 230 and/or the connector mount 302. The mating ends of the contact 222 may be located forward of the plug end 252 of the TPA device 250 in the set position to mate with the contacts of the first connector assembly 100.

During assembly, the pivot frame 304 is coupled to the connector mount 302, the X carriage 306 is coupled to the pivot frame 304, and the Y carriage 308 is coupled to the X carriage 306. The pivot elements 320 are coupled to the pivot elements 350. The pivot elements 320 are rotatable within the pivot elements 350. In an exemplary embodiment, the control ribs 354 controls an amount of angular movement of the semispherical protrusion 322 in the semispherical socket 352. Additionally, edges or end portions of the pivot elements 320, 350 may bottom out against each other to limit the amount of rotational movement of the connector mount 302, and thus the electrical connector 210, relative to the pivot frame 304. In various embodiments, the pivot frame 304 may allow ±5° of angular movement. However, the pivot frame 304 may be designed to allow greater or lesser angular movement in alternative embodiments.

When assembled, the flanges 364 of the X carriage 306 are coupled to the pivot frame 304. The flanges 364 are movable in the slot 346 to allow movement of the pivot frame 304 (and thus the connector mount 302 and the electrical connector 210) in the X direction. Similarly, the flanges 374 of the Y carriage 308 are coupled to the X carriage 306. The flanges 374 are movable in the slots 366 to allow movement of the X carriage 306 (and thus the pivot frame 304 and the connector mount 302 and the electrical connector 210) in the Y direction.

Figure 43:
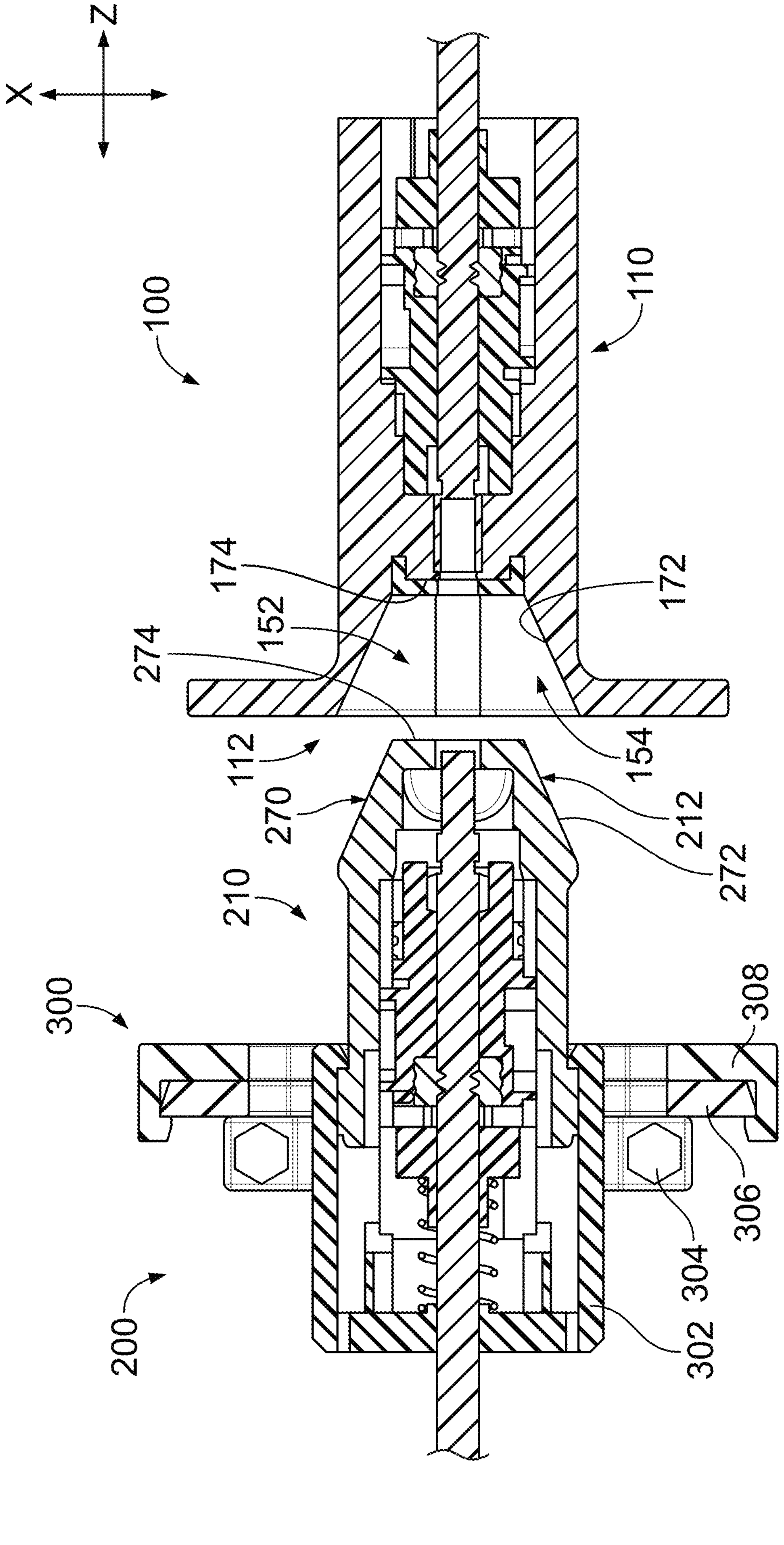
FIG. 43 illustrates the connector assemblies poised for mating in accordance with an exemplary embodiment.
Figure 44:
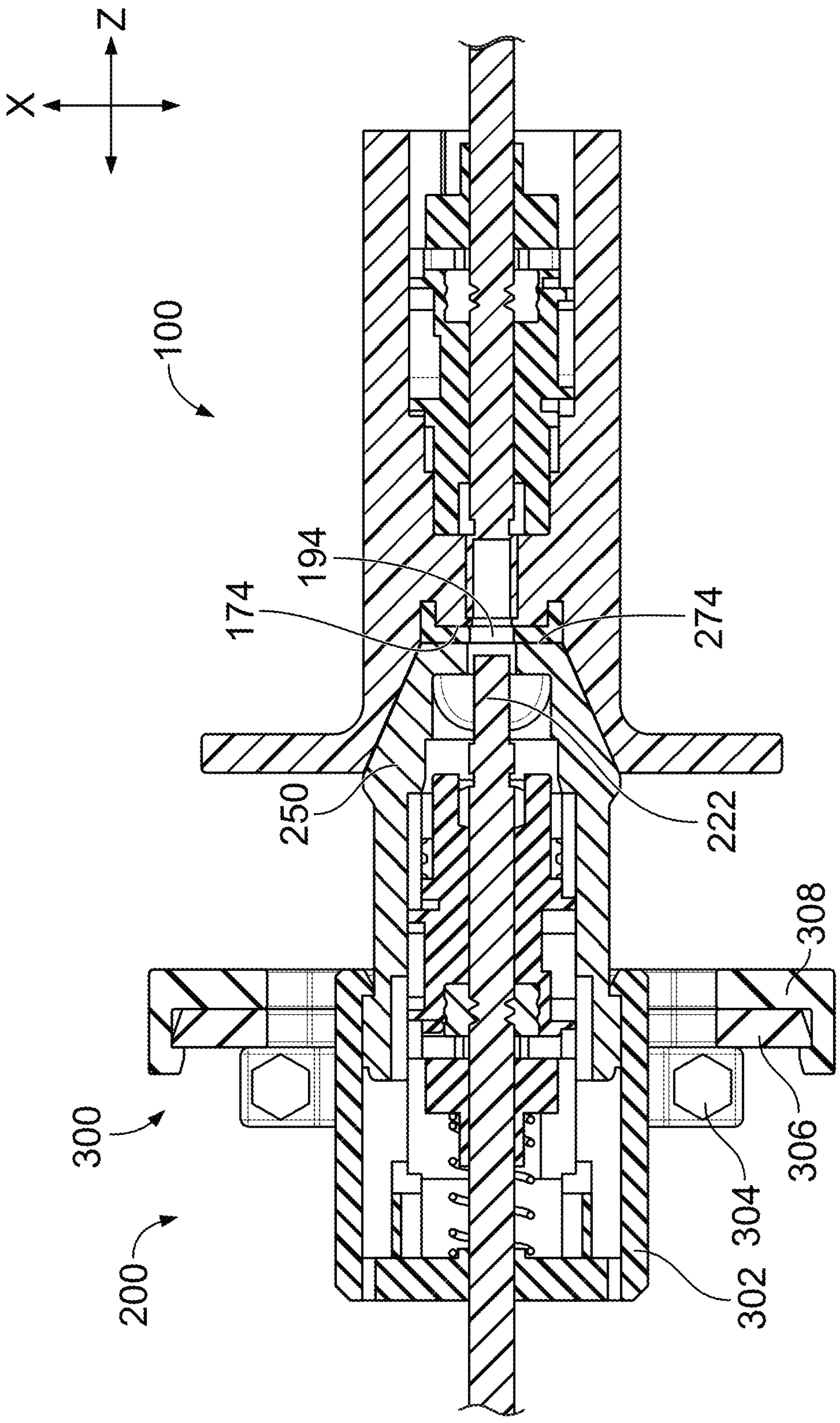
FIG. 44 illustrates the connector assemblies partially mated in accordance with an exemplary embodiment.
Figure 45:
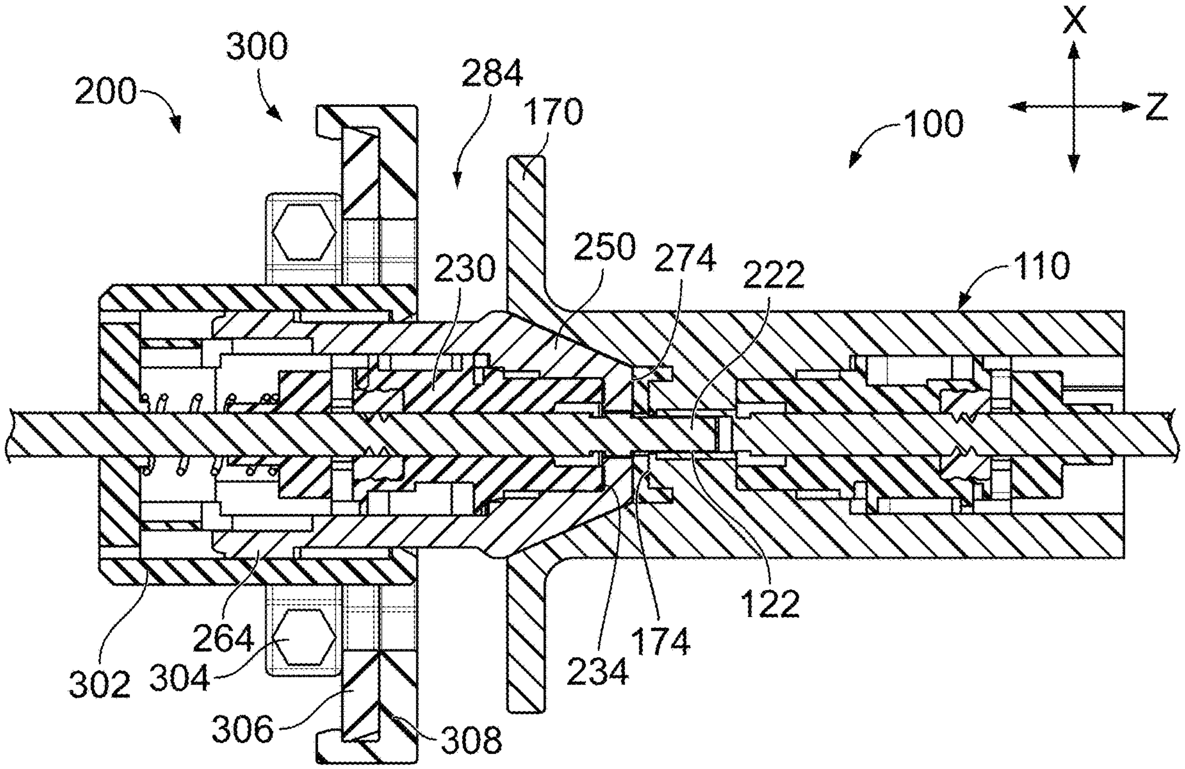
FIG. 45 illustrates the connector assemblies further mated in accordance with an exemplary embodiment.
Figure 46:
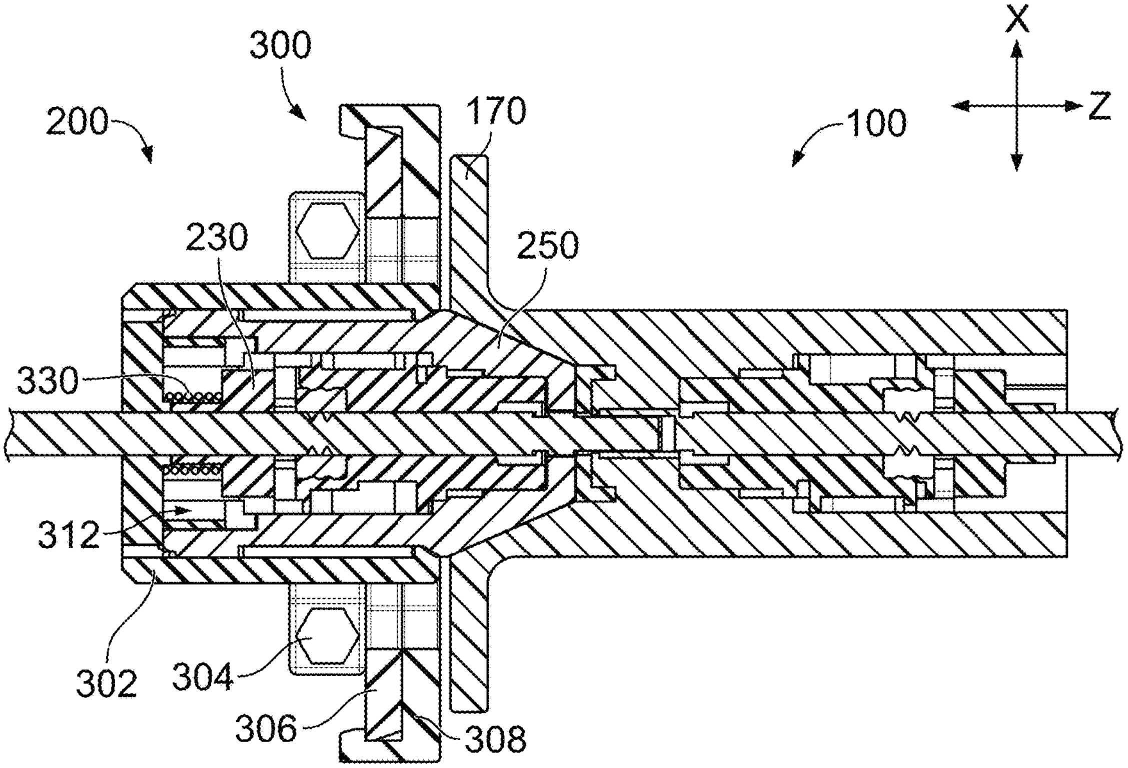
FIG. 46 illustrates the connector assemblies fully mated in accordance with an exemplary embodiment.

FIGS. 43-46 illustrate a mating sequence of the first and second connector assemblies 100, 200 in accordance with an exemplary embodiment. FIG. 43 illustrates the connector assemblies 100, 200 poised for mating. FIG. 44 illustrates the connector assemblies 100, 200 partially mated. FIG. 45 illustrates the connector assemblies 100, 200 further mated. FIG. 46 illustrates the connector assemblies 100, 200 fully mated.

In an exemplary embodiment, the connector assemblies 100, 200 are designed for blind mating. For example, the connector assemblies 100, 200 include self aligning features having a tolerance range that allow self aligning of the mating interfaces of the connector assemblies 100, 200 during mating. In various embodiments, the connector assemblies 100, 200 may be mated by an automated mating process using robots or machines to mate the connector assemblies 100, 200.

In an exemplary embodiment, the second connector assembly 200 is equipped with features that allow it to move or float during mating to align with the first connector assembly 100 during the mating process. For example, the second connector assembly 200 may float in one or more axial directions to align with the first connector assembly 100. The second connector assembly 200 may float in one or more angular directions to align with the first connector assembly 100. In an exemplary embodiment, the second connector assembly 200 is equipped with features that allow it to move with six mechanical degrees of freedom relative to the first connector assembly 100. For example, the second connector assembly 200 has axial float in the X, Y, and Z directions as well as rotational float about a central pivot point in the yaw, pitch, and roll directions. The connector assemblies 100, 200 are able to compensate for some misalignment in virtually all orientations due to positional in physical variations (for example, tolerances). For example, the connector assemblies 100, 200 accommodate for X, Y, and Z tolerances as well as three angular tolerances in the X-Y, X-Z, and Y-Z planes to accommodate the blind mate. The connector float in all axial and angular degrees of freedom ensures that the terminated cables of the connector assemblies 100, 200 can be successfully mated without sacrificing signal integrity. For example, the second connector assembly 200 is equipped with features that allow axial and rotational float such that the misalignment of the modules will not adversely affect the ability of the connector halves to mate, and subsequently, the terminated cables to align and transmit the quality RF signal.

During mating, the mating end 212 of the electrical connector 210 is generally aligned with the mating end 112 of the electrical connector 110 (FIG. 43). The nose cone 270 is generally aligned with the funnel 154. The funnel 154 has an enlarged area to receive the nose cone 270. For example, the size of the opening to the funnel 154 is larger than the tip of the nose cone 270 to gather the nose cone 270 and guide the nose cone 270 into the funnel 154. Any axial or angular misalignment may be accommodated by the support bracket 300. For example, the electrical connector 210 may be moved in any of the X direction, the Y direction, or the Z direction and/or the electrical connector 210 may be moved in any of the yaw direction, the pitch direction, or the roll direction to properly align the electrical connectors 210, 110 during the mating sequence. For example, the pivot frame 304 may accommodate rotation of the electrical connector 210 in any of the rotational directions. The connector mount 302, the X carriage 306, and the Y carriage 308 may accommodate translation of the electrical connector 210 in any of the axial directions. The guide surfaces 272 of the nose cone 270 engage the lead in surfaces 172 to guide the nose cone 270 into proper alignment within the receptacle 152. The connector assemblies 100, 200 are mated along the mating axis until the end wall 274 bottoms out against the base wall 174 (FIG. 44) and/or the interface seal 194 at the base wall 174.

During initial mating, the TPA device 250 is in the preset or forward position (FIG. 44). The TPA device 250 covers the contacts 222 to avoid damaging the contacts 222 during mating. After the end wall 274 bottoms out against the base wall 174, further mating of the connector assemblies 100, 200 causes the TPA device 250 to move rearward to the second position (FIG. 45). The latching features 264 of the TPA device 250 move from the forward retention latches 318 to the rearward retention latches 318. The end wall 274 is moved toward the housing 230. Optionally, in the set position, the end wall 274 abuts against the front 234 of the housing 230. When the TPA device 250 is moved to the set position, the mating ends of the contacts 222 protrude forward of the end wall 274 and are received in the electrical connector 110 and mated with the contacts 122. For example, the contacts 222 are pin contacts and the contacts 122 are socket contacts, wherein the pin contacts are received in the socket contacts to make electrical connection between the first and second connector assemblies 100, 200.

In an exemplary embodiment, the second connector assembly 200 may accommodate further mating (for example, over mating) in the mating direction. For example, when the first and second connector assemblies 100, 200 are initially mated (FIG. 45) a gap 284 may exist between the flange 170 and the support bracket 300. Further mating may close the gap until the flange 170 bottoms out against the support bracket 300 (FIG. 46). The electrical connector 210 is movable in the Z direction to accommodate the closing of the gap 284. For example, the TPA device 250 may slide rearward along the connector mount 302. The housing 230 may move rearward in the cavity 312 and compress the biasing elements 330. The biasing element 330 are compressed, the biasing elements 330 impart a larger spring force in a forward direction against the housing 230, which presses the contacts 222 forward into the contacts 122 to maintain a reliable electrical connection and RF signal between the contacts 222, 122.

Figure 47:
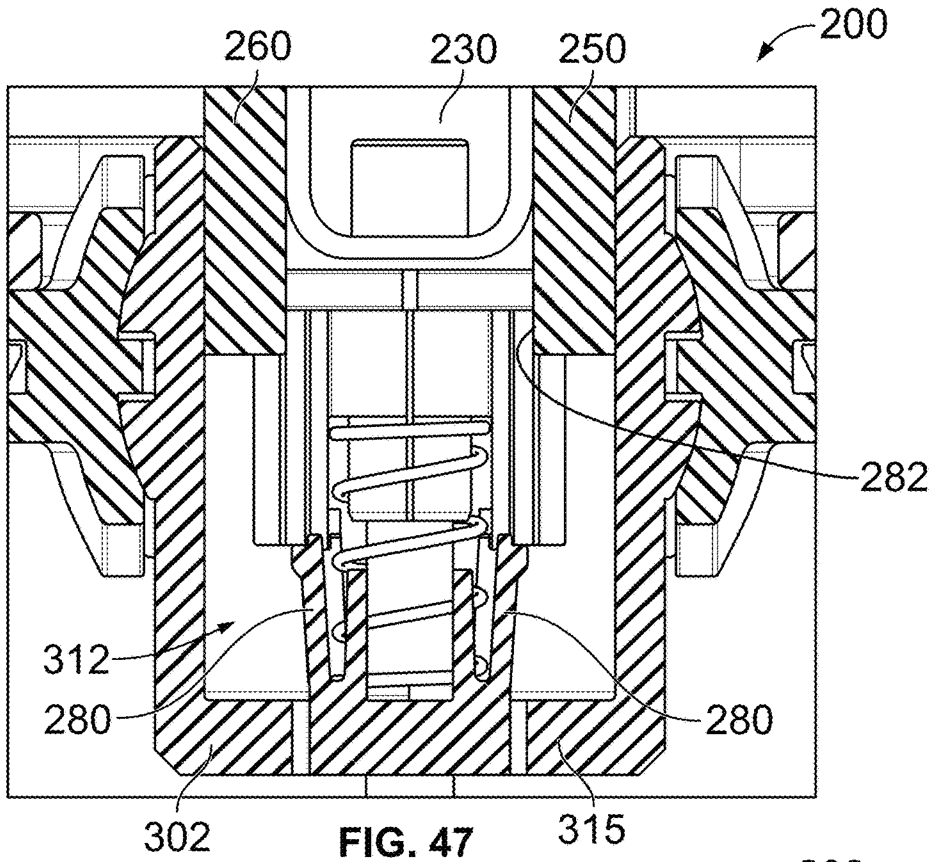
FIG. 47 is a cross-sectional view of the connector assemblies in a partially mated state corresponding to FIG. 45 in accordance with an exemplary embodiment.
Figure 48:
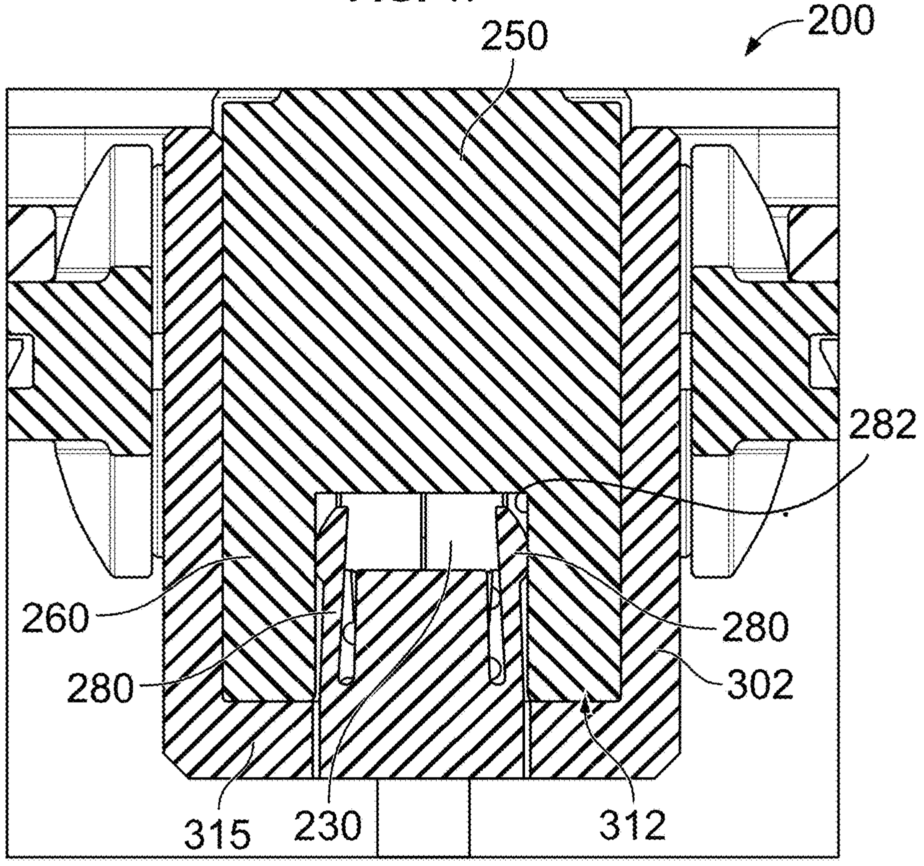
FIG. 48 is a cross-sectional view of the connector assemblies in a fully mated state corresponding to FIG. 46 in accordance with an exemplary embodiment.

FIG. 47 is a cross-sectional view of the connector assemblies 100, 200 in a partially mated state corresponding to FIG. 45. FIG. 48 is a cross-sectional view of the connector assemblies 100, 200 in a fully mated state corresponding to FIG. 46. The connector mount 302 includes the retention latches 280, which extend from the end wall 315 into the cavity 312. The retention latches 280 are used to position the housing 230 within the cavity 312. When the retention latches 280 engage the housing 230, the retention latches 280 hold the housing 230 at an extended or forward position. The retention latches 280 are configured to be released from the housing 230 to allow the housing 230 to move in the Z direction, such as rearwardly further into the cavity 312. In an exemplary embodiment, the retention latches 280 are movable between latched positions and unlatched positions. The retention latches 280 support the housing 230 in the extended position when in the latched positions. The housing 230 is able to move from the extended position to the released position when the retention latches 280 are in the unlatched positions. In an exemplary embodiment, the shroud 260 of the TPA device 250 includes release elements 282 used to release the retention latches 280. For example, when the TPA device 250 is pressed rearwardly into the cavity 312, the release elements 282 at the rear end of the shroud 260 engage the retention latches 280 and press the retention latches 280 inward to release the retention latches 280 from the housing 230.

Figure 49:
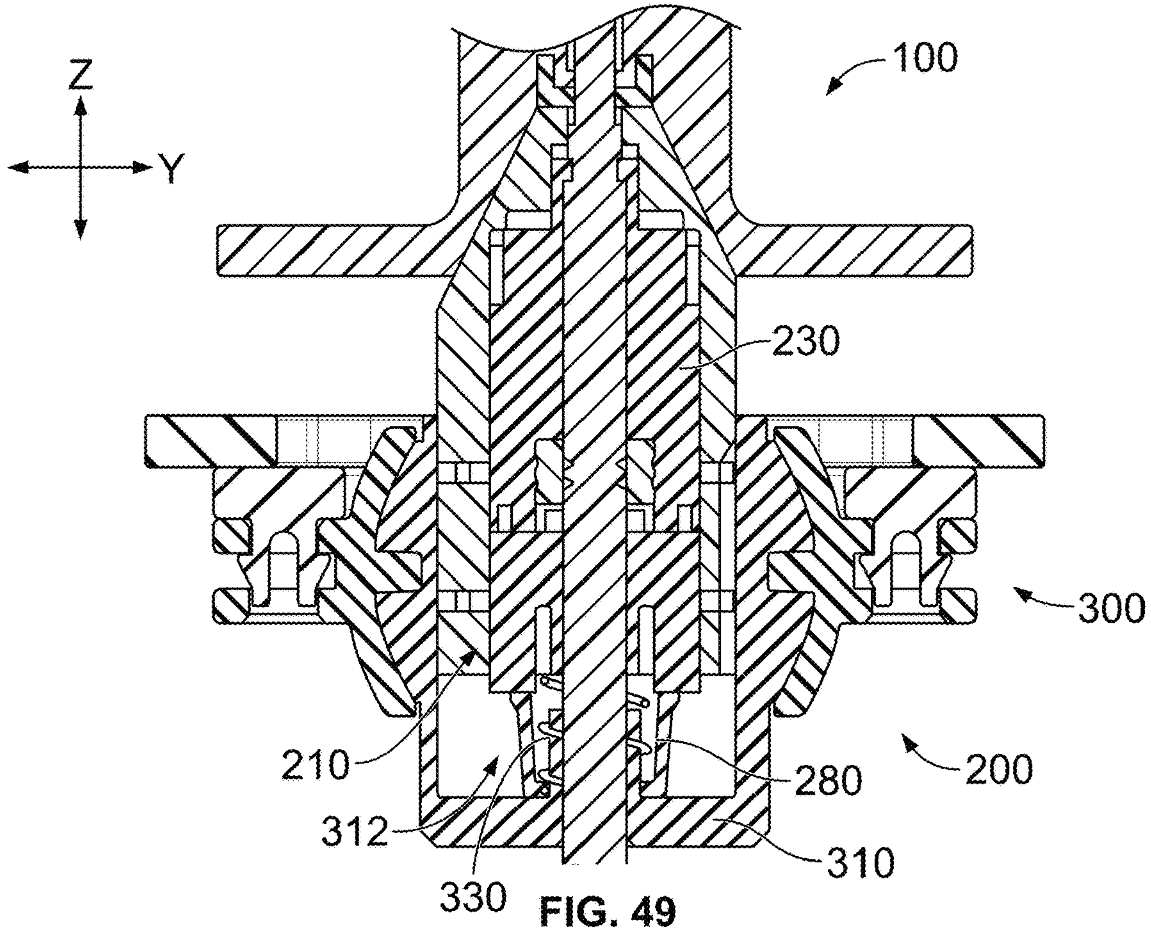
FIG. 49 is a cross-sectional view of the connector assemblies in a partially mated state corresponding to FIG. 45 in accordance with an exemplary embodiment.
Figure 50:
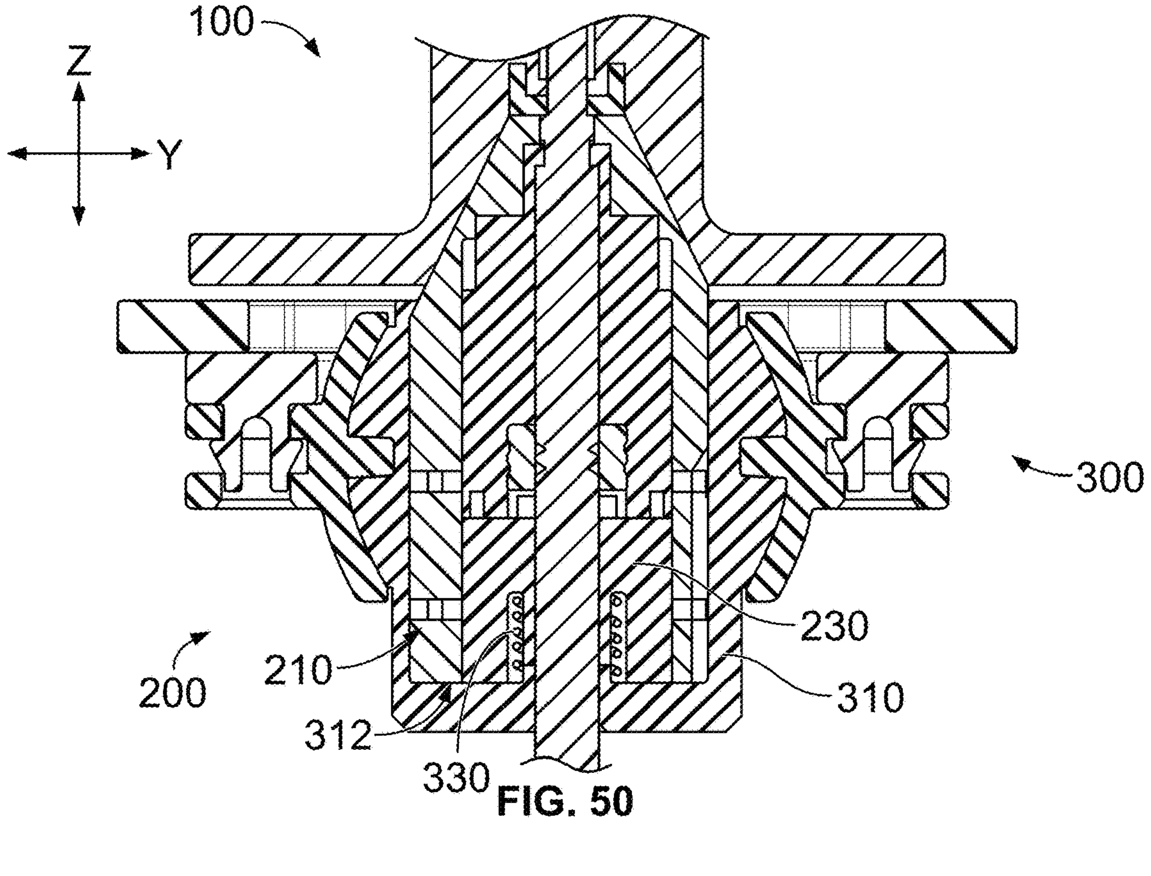
FIG. 50 is a cross-sectional view of the connector assemblies in a fully mated state corresponding to FIG. 46 in accordance with an exemplary embodiment.

FIG. 49 is a cross-sectional view of the connector assemblies 100, 200 in a partially mated state corresponding to FIG. 45. FIG. 50 is a cross-sectional view of the connector assemblies 100, 200 in a fully mated state corresponding to FIG. 46. FIGS. 49 and 50 illustrate the retention latches 280 between the housing 230 and the shell 310 that hold the housing 230 in an extended position relative to the shell 310. The housing 230 is unable to move rearward into the cavity 312 when the retention latches 280 are engaged. In the illustrated embodiment, the retention latches 280 are part of the shell 310 and are configured to engage or seat on a portion of the housing 230.

The retention latches 280 are releasable to allow the housing 230 to move into the cavity 312 in the Z direction, which is parallel to the mating direction. FIGS. 49 and 50 show movement of the electrical connector 210 relative to the support bracket 300 in the Z direction. For example, FIG. 49 shows the electrical connector 210 in a forward position relative to the support bracket 300 and FIG. 50 shows the electrical connector 210 in a rearward position relative to the support bracket 300. In an exemplary embodiment, with the retention latches 280 released, when the electrical connector 210 is mated with the first connector assembly 100, the electrical connector 210 may be pushed rearward and the housing 230 may be moved rearward in the cavity 312 against the spring bias of the biasing elements 330.

Figure 51:
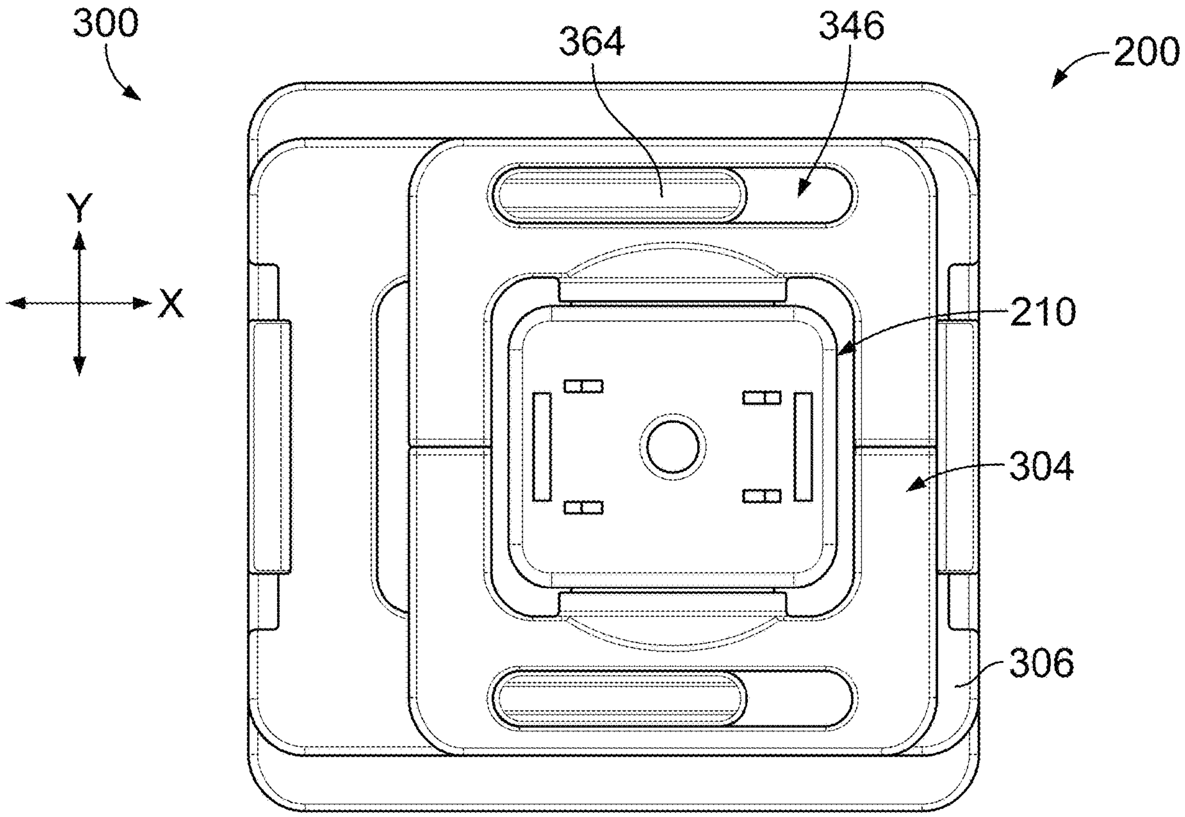
FIG. 51 illustrates axial movement of the electrical connector relative to the support bracket in the X direction in accordance with an exemplary embodiment.
Figure 52:
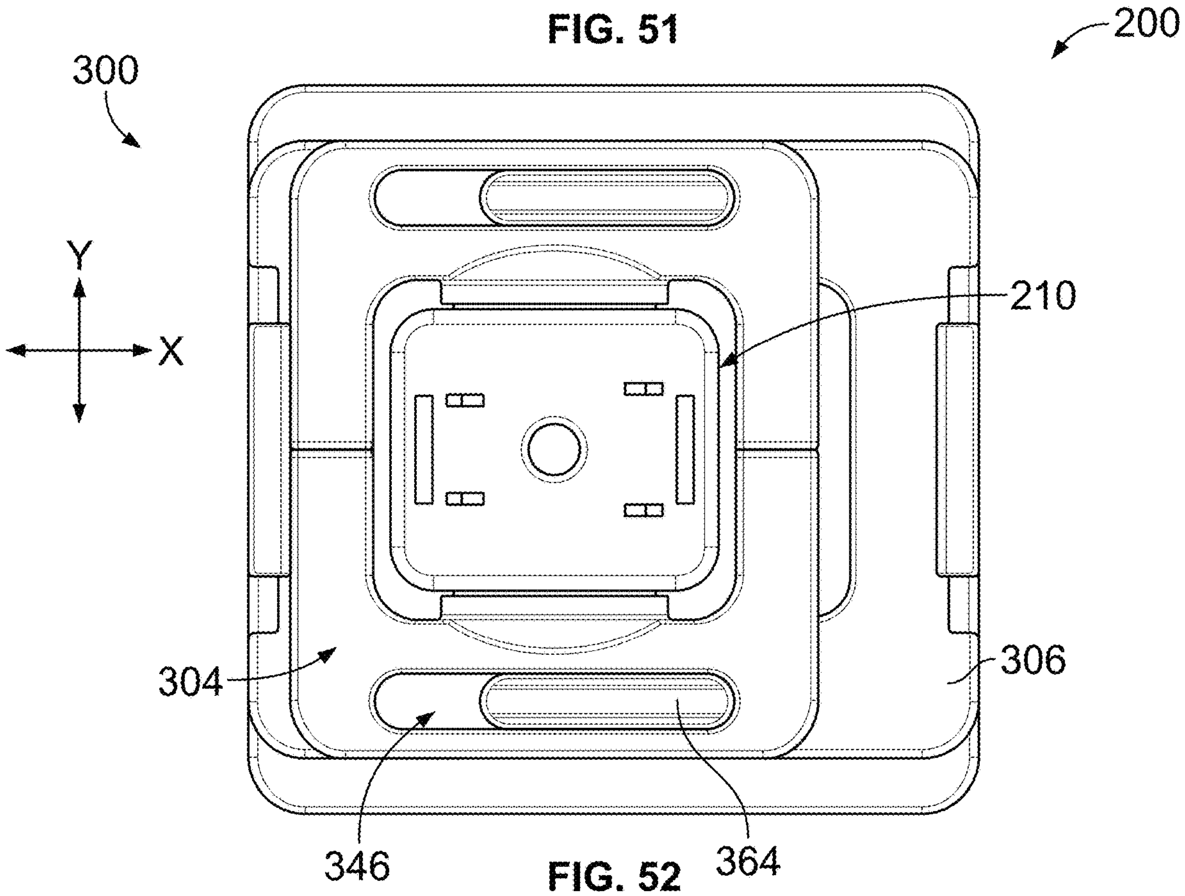
FIG. 52 illustrates axial movement of the electrical connector relative to the support bracket in the X direction in accordance with an exemplary embodiment.

FIGS. 51 and 52 illustrate axial movement of the electrical connector 210 relative to the support bracket 300 in the X direction. For example, FIG. 51 shows the electrical connector 210 shifted to the right relative to the support bracket 300 and FIG. 52 shows the electrical connector 210 shifted to the left relative to the support bracket 300. The X carriage 306 accommodates the movement of the electrical connector 210 in the X direction. For example, the flanges 364 are configured to move axially within the slots 346 of the pivot frame 304 to allow movement in the X direction.

Figure 53:
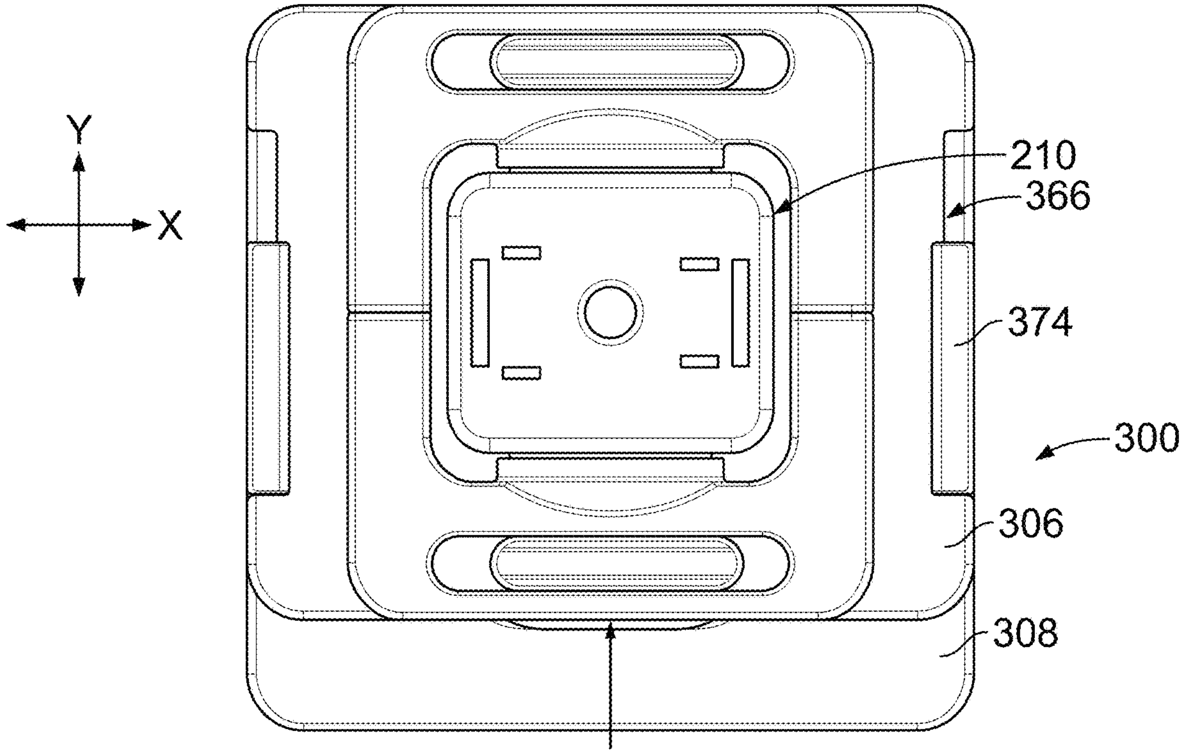
FIG. 53 illustrates axial movement of the electrical connector relative to the support bracket in the Y direction in accordance with an exemplary embodiment.
Figure 54:
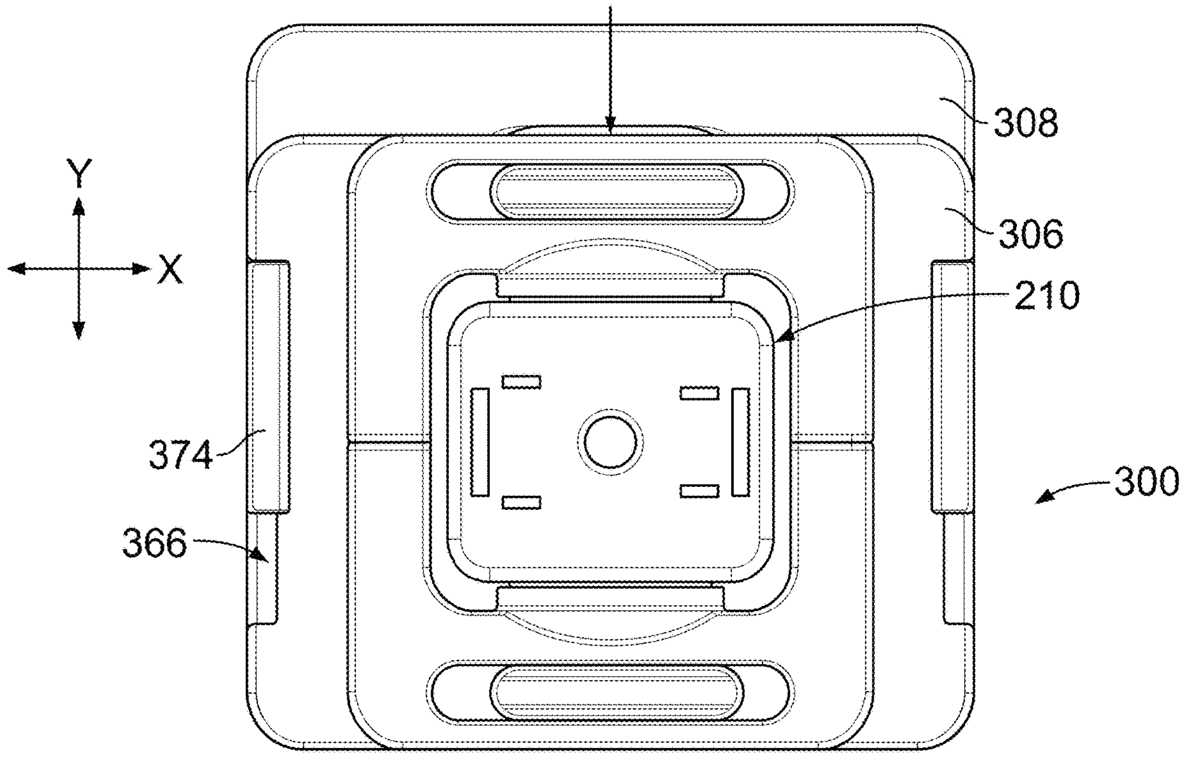
FIG. 54 illustrates axial movement of the electrical connector relative to the support bracket in the Y direction in accordance with an exemplary embodiment.

FIGS. 53 and 54 illustrate axial movement of the electrical connector 210 relative to the support bracket 300 in the Y direction. For example, FIG. 53 shows the electrical connector 210 shifted upward relative to the support bracket 300 and FIG. 54 shows the electrical connector 210 shifted downward relative to the support bracket 300. The Y carriage 308 accommodates the movement of the electrical connector 210 in the Y direction. For example, the flanges 374 are configured to move axially within the slots 366 of the X carriage 306 to allow movement in the Y direction.

Figure 55:
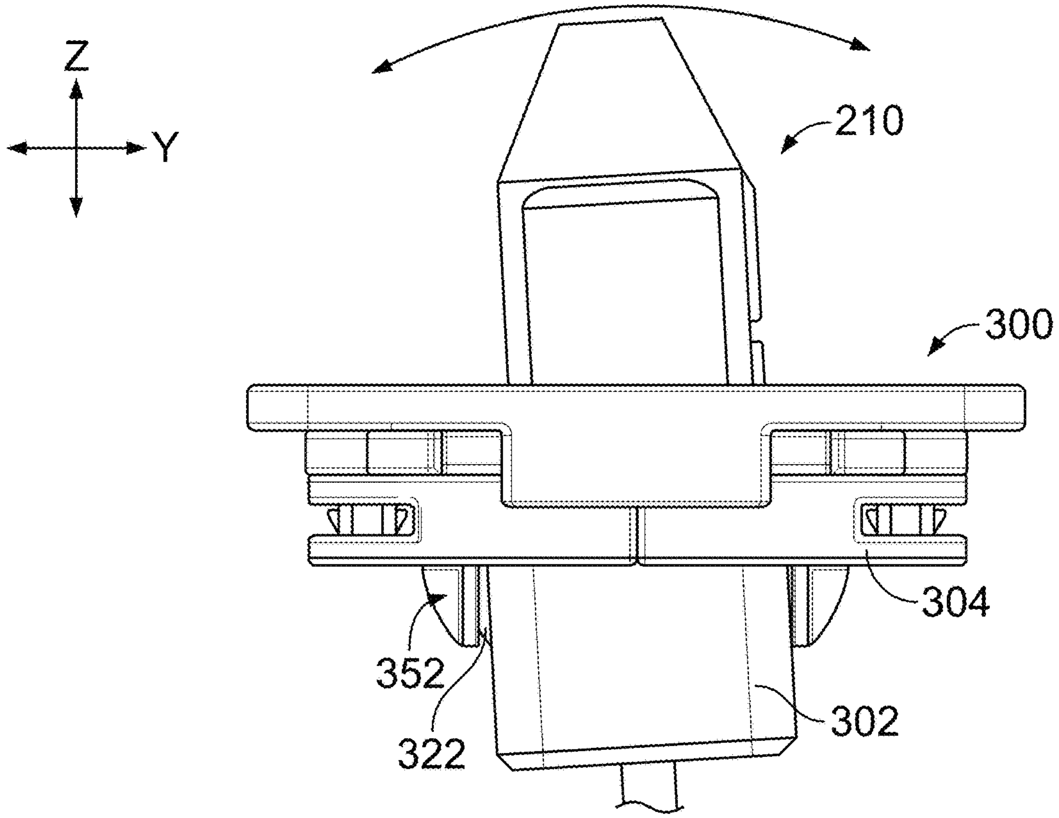
FIG. 55 illustrates rotation of the electrical connector relative to the support bracket in the yaw direction in accordance with an exemplary embodiment.
Figure 56:
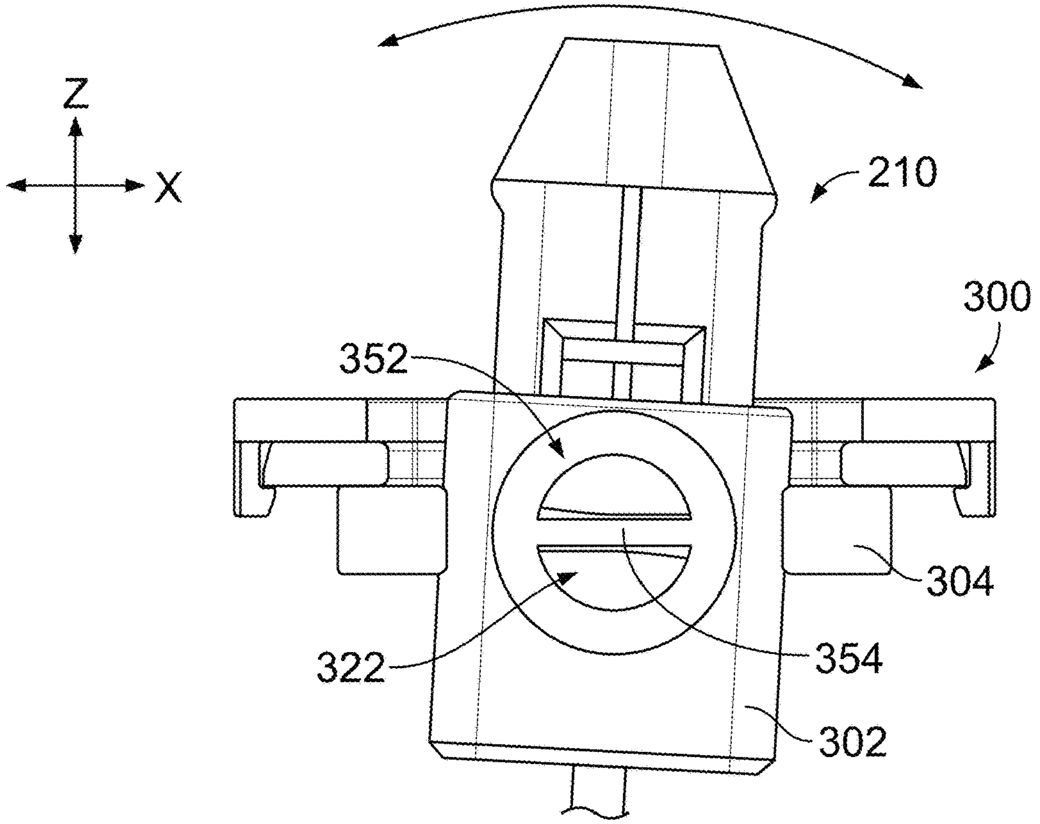
FIG. 56 illustrates rotation of the electrical connector relative to the support bracket in the pitch direction in accordance with an exemplary embodiment.
Figure 57:
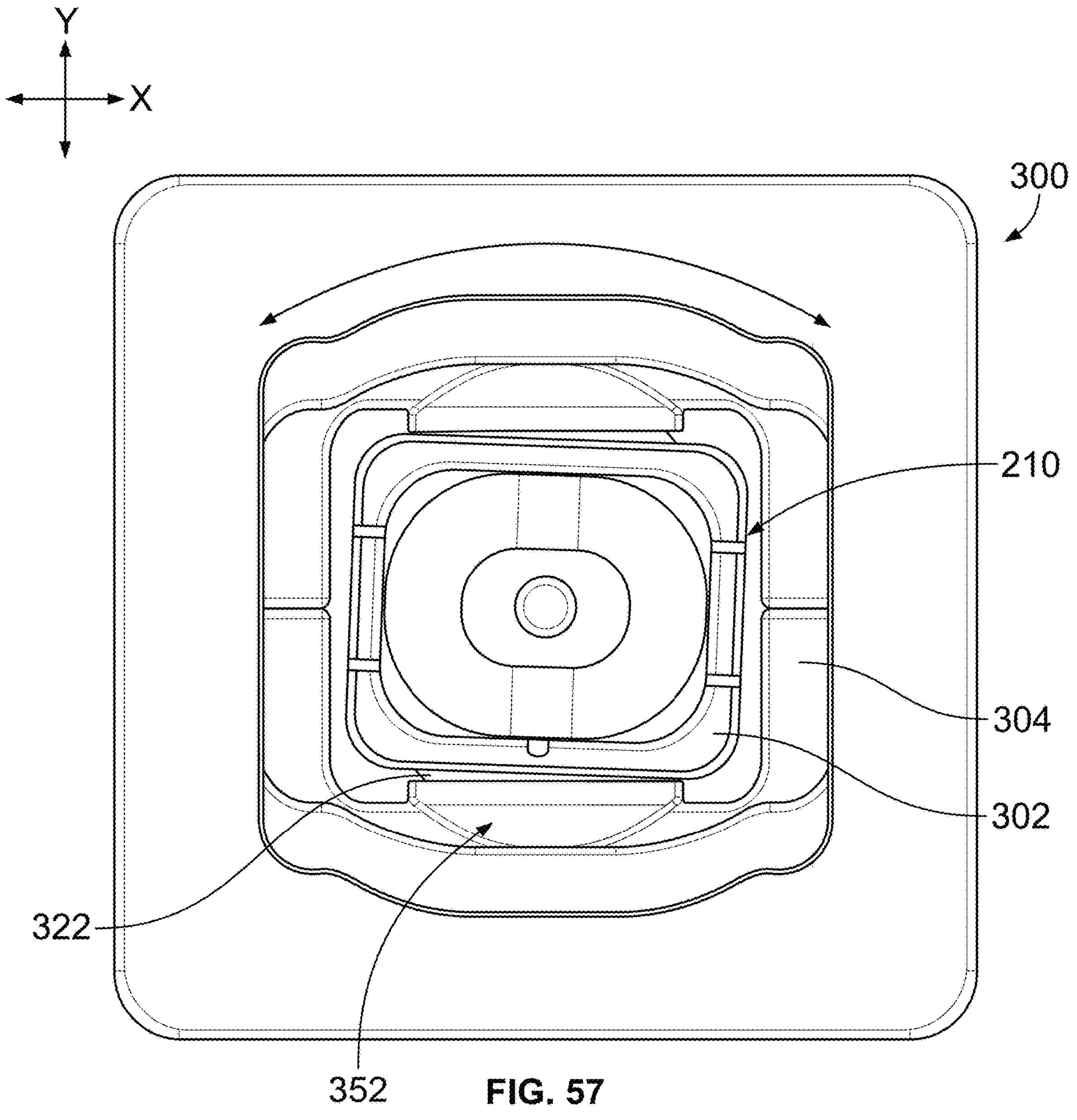
FIG. 57 illustrates rotation of the electrical connector relative to the support bracket in the roll direction in accordance with an exemplary embodiment.

FIGS. 55-57 illustrate rotation of the electrical connector 210 relative to the support bracket 300 at a pivot point. FIG. 55 illustrates rotation of the electrical connector 210 relative to the support bracket 300 in the yaw direction. FIG. 56 illustrates rotation of the electrical connector 210 relative to the support bracket 300 in the pitch direction. FIG. 57 illustrates rotation of the electrical connector 210 relative to the support bracket 300 in the roll direction. The pivot frame 304 accommodates the movement of the electrical connector 210 in the angular directions. For example, the semispherical protrusion 322 is able to pivot or rotate in the semispherical socket 352. The connector mount 302 may bottom out against the pivot frame 304 to limit the amount (for example, angle) of rotation (for example, nose up or down, nose side-to-side, or body rotation). For example, the control rib 354 may limit the amount of rotation (see, for example, FIG. 56). The sides or walls of the connector mount 302 may limit the amount of rotation when engaging the pivot frame 304 (see, for example, FIGS. 55 and 57).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A connector assembly comprising:

an electrical connector including a housing having a contact channel and a contact held in the contact channel, the contact being terminated to an end of a cable, the cable extending from the housing, the electrical connector including a terminal position assurance (TPA) device coupled to the housing and operably assuring proper positioning of the contact in the contact channel, the electrical connector including a mating end; and a support bracket configured to support the electrical connector, the support bracket including an opening, wherein the electrical connector is suspended from the support bracket and received in the opening with the mating end forward of the support bracket for mating with a mating electrical connector;

wherein the electrical connector has six mechanical degrees of freedom relative to the support bracket.

2. The connector assembly of claim 1, wherein the support bracket allows a limited amount of floating axial movement in an X direction, the support bracket allowing a limited amount of floating axial movement in a Y direction, the support bracket allowing a limited amount of floating axial movement in a Z direction, the support bracket allowing a limited amount of floating rotational movement in a yaw direction, the support bracket allowing a limited amount of floating rotational movement in a pitch direction, and the support bracket allowing a limited amount of floating rotational movement in a roll direction.

3. The connector assembly of claim 1, wherein the support bracket includes at least one pivot joint to allow rotational movement of the electrical connector in at least one angular direction.

4. The connector assembly of claim 1, wherein the housing includes a primary latch configured to be latchably coupled to the contact to hold the contact in the contact channel, the TPA being movable between a preset position and a set position, the primary latch being deflectable when the TPA is in the preset position, the TPA blocking the primary latch in the set position to block deflection of the primary latch.

5. The connector assembly of claim 1, wherein the support bracket includes a connector mount, a pivot frame, an X carriage, and a Y carriage, the connector mount holding the electrical connector, the pivot frame including an opening that receives the connector mount and the electrical connector with the mating end forward of the pivot frame for mating with the mating electrical connector, the pivot frame holding the connector mount, the X carriage holding the pivot frame, the Y carriage holding the X carriage;

wherein the housing is axially movable relative to the connector mount in a Z direction parallel to a mating axis with the with the mating electrical connector;

wherein the connector mount is rotatably movable relative to the pivot frame in a yaw direction, a pitch direction, and a roll direction, the yaw, pitch and roll directions being mutually exclusive;

wherein the pivot frame is axially movable relative to the pivot frame in an X direction perpendicular to the Z direction; and wherein the X carriage is axially movable relative to the Y carriage in a Y direction perpendicular to the X direction and perpendicular to the Z direction.

6. The connector assembly of claim 5, wherein the connector mount includes a shell having a cavity, the housing being received in the cavity and movable in the cavity in a direction parallel to a mating axis, wherein a biasing element is coupled between the shell in the housing, the biasing element being compressible along the mating axis to forward bias the housing toward the mating electrical connector.

7. The connector assembly of claim 6, further comprising a retention latch between the shell and the housing to hold the housing and the shell at an extended position, the TPA releasing the retention latch to allow the housing and the shell to move to a compressed position.

8. The connector assembly of claim 5, wherein the connector mount includes a pivot element, the pivot frame including a pivot element interfacing with the pivot element of the connector mount to control the rotational position of the electrical connector relative to the support bracket in at least one rotational degree of freedom.

9. The connector assembly of claim 8, wherein the pivot elements control the rotational position of the electrical connector relative to the support bracket in all 3 rotational degrees of freedom.

10. The connector assembly of claim 8, wherein the pivot element of the connector mount includes a semispherical protrusion, the pivot element of the pivot frame including a semispherical socket receiving the semispherical protrusion.

11. The connector assembly of claim 10, wherein the pivot element of the pivot frame includes a control rib extending into the semispherical socket, the pivot element of the connector mount including a control slot in the semispherical protrusion that receives the control rib, the control rib being able to move in the control slot a limited amount to control an amount of angular movement of the connector mount relative to the pivot frame.

12. The connector assembly of claim 5, wherein the X carriage includes a panel having an opening and a flange extending from the panel, the opening receiving the electrical connector, the flange being coupled to the pivot frame, the pivot frame movable relative to the X carriage in an axial direction.

13. The connector assembly of claim 12, wherein the pivot frame includes a slot receiving the flange, the flange movable in the slot in the axial direction.

14. The connector assembly of claim 5, wherein the Y carriage includes a panel having an opening and a flange extending from the panel, the opening receiving the electrical connector, the flange being coupled to the X carriage, the X carriage movable relative to the Y carriage in an axial direction.

15. The connector assembly of claim 1, wherein the contact is one of a plurality of contacts held by the housing.

16. The connector assembly of claim 1, wherein the TPA includes a mating interface configured to interface with the mating electrical connector at the mating end of the electrical connector, the mating interface including lead in surfaces defining a lead-in mating window in at least two non-parallel directions.

17. A connector assembly comprising:

an electrical connector including a housing having a contact channel and a contact held in the contact channel, the contact being terminated to an end of a cable, the cable extending from the housing, the electrical connector including a terminal position assurance (TPA) device coupled to the housing and operably assuring proper positioning of the contact in the contact channel, the electrical connector including a mating end configured to be mated to a mating electrical connector; and a support bracket configured to support the electrical connector, the support bracket including a connector mount, a pivot frame, an X carriage, and a Y carriage, the connector mount holding the electrical connector, the pivot frame including an opening that receives the connector mount and the electrical connector with the mating end forward of the pivot frame for mating with the mating electrical connector, the pivot frame holding the connector mount, the X carriage holding the pivot frame, the Y carriage holding the X carriage;

wherein the housing is axially movable relative to the connector mount in a Z direction parallel to a mating axis with the with the mating electrical connector;

wherein the connector mount is rotatably movable relative to the pivot frame in a yaw direction, a pitch direction, and a roll direction, the yaw, pitch and roll directions being mutually exclusive;

wherein the pivot frame is axially movable relative to the pivot frame in an X direction perpendicular to the Z direction; and wherein the X carriage is axially movable relative to the Y carriage in a Y direction perpendicular to the X direction and perpendicular to the Z direction.

18. The connector assembly of claim 17, wherein the support bracket allows a limited amount of floating axial movement in an X direction, the support bracket allowing a limited amount of floating axial movement in a Y direction, the support bracket allowing a limited amount of floating axial movement in a Z direction, the support bracket allowing a limited amount of floating rotational movement in a yaw direction, the support bracket allowing a limited amount of floating rotational movement in a pitch direction, and the support bracket allowing a limited amount of floating rotational movement in a roll direction.

19. The connector assembly of claim 17, wherein:

the connector mount includes a shell having a cavity, the housing being received in the cavity and movable in the cavity in a direction parallel to a mating axis, wherein a biasing element is coupled between the shell in the housing, the biasing element being compressible along the Z direction to forward bias the housing toward the mating electrical connector;

wherein the X carriage includes a panel having an opening and a flange extending from the panel, the opening receiving the electrical connector, the flange being coupled to the pivot frame, the pivot frame movable relative to the X carriage in the X direction;

wherein the pivot frame includes a slot receiving the flange, the flange movable in the slot in the X direction; and wherein the Y carriage includes a panel having an opening and a flange extending from the panel, the opening receiving the electrical connector, the flange being coupled to the X carriage, the X carriage movable relative to the Y carriage in the Y direction.

20. The connector assembly of claim 17, wherein the connector mount includes a pivot element, the pivot frame including a pivot element interfacing with the pivot element of the connector mount to control the rotational position of the electrical connector relative to the support bracket in at least one rotational degree of freedom.

21. An electrical connector system comprising:

a first connector assembly including a first electrical connector including a first housing having a first contact channel and a first contact held in the first contact channel, the first contact being terminated to an end of a first cable, the first cable extending from the first housing, the first electrical connector including a first terminal position assurance (TPA) device coupled to the first housing and operably assuring proper positioning of the first contact in the first contact channel, the first electrical connector including a mating end, the first connector assembly including a support bracket configured to support the first electrical connector, the support bracket including an opening, wherein the first electrical connector is suspended from the support bracket and received in the opening with the mating end forward of the support bracket, a second connector assembly including a second electrical connector including a second housing having a second contact channel and a second contact held in the second contact channel, the second contact being terminated to an end of a second cable, the second cable extending from the second housing, the second electrical connector including a second TPA device coupled to the second housing and operably assuring proper positioning of the second contact in the second contact channel, the second electrical connector including a mating end;

wherein the first electrical connector has six mechanical degrees of freedom relative to the support bracket to align with the second electrical connector during mating of the first electrical connector and the second electrical connector.

* * * * *